(12) United States Patent
Farrell et al.

(10) Patent No.: US 6,659,700 B1
(45) Date of Patent: Dec. 9, 2003

(54) METAL PIERCING FASTENER

(75) Inventors: Mark A. Farrell, Conroe, TX (US); Michael E. Farrell, Murrieta, CA (US)

(73) Assignee: Evening Star International, Inc., Conroe, TX (US)

( * ) Notice: Subject to any disclaimer, the term of this patent is extended or adjusted under 35 U.S.C. 154(b) by 0 days.

(21) Appl. No.: 09/724,333

(22) Filed: Nov. 28, 2000

Related U.S. Application Data

(60) Provisional application No. 60/167,810, filed on Nov. 29, 1999.

(51) Int. Cl.[7] ................................................. F16B 15/06
(52) U.S. Cl. ........................ 411/450; 411/456; 411/477; 411/478
(58) Field of Search ................................ 411/446, 450, 411/456, 451.1, 451.3, 477, 478, 463, 462, 481

(56) References Cited

U.S. PATENT DOCUMENTS

| | | | |
|---|---|---|---|
| 1,338,988 A | * | 5/1920 | Kinoshita |
| 1,934,134 A | * | 11/1933 | McChesney |
| 2,110,959 A | | 3/1938 | Lombard |
| 2,155,893 A | * | 4/1939 | Fulton |
| 2,168,854 A | * | 8/1939 | Agnew |
| 2,319,058 A | * | 5/1943 | Hansman |
| 2,353,579 A | | 7/1944 | Miller |
| 2,382,474 A | * | 8/1945 | Gambo |
| 2,543,212 A | * | 2/1951 | Waara |
| 2,564,643 A | * | 8/1951 | Hall |
| 2,740,505 A | * | 4/1956 | Flora |
| 2,751,052 A | * | 6/1956 | Flora |
| 3,675,958 A | | 7/1972 | Duffy |
| 3,800,653 A | | 4/1974 | Barth et al. |
| 3,882,755 A | | 5/1975 | Enstrom |
| 3,973,295 A | * | 8/1976 | Janke |
| 3,983,779 A | * | 10/1976 | Dimas |
| 5,152,582 A | | 10/1992 | Magnuson |
| 5,597,280 A | | 1/1997 | Stern |
| 5,846,019 A | | 12/1998 | Kuhns |

\* cited by examiner

*Primary Examiner*—Flemming Saether
(74) *Attorney, Agent, or Firm*—Fulbright & Jaworski L.L.P.

(57) ABSTRACT

A metal piercing fastener for securing a light gauge sheet metal layer to metal/non-metal substrate layer(s) includes an elongated metal body having a crown at one end a sharpened and hardened tip at the other end defining a rigid metal penetrating region. The crown receives an impact blow from a tool for driving the rigid metal penetrating tip region in the substrates to be fastened. The metal body is equipped with one or more resilient tines each twisted at the base around its longitudinal axis and which can be integral or coupled to the metal body to optimize the gripping and clamping capability of the metal piercing fastener. The resilient tine may be equipped with protruding gripping and clamping elements on each side or with ribs on one of its outer surfaces to provide spring action gripping and clamping capability during fastening. The resilient tine is capable of deflection to conform to the physical constraints of the pierced substrate opening when passing through the pierced opening. The resilient tine is also capable of returning to its factory preset state of orientation when no longer constrained within the pierced substrate opening so as to grip and clamp the substrate layers being fastened between itself and the crown of the fastener.

24 Claims, 52 Drawing Sheets

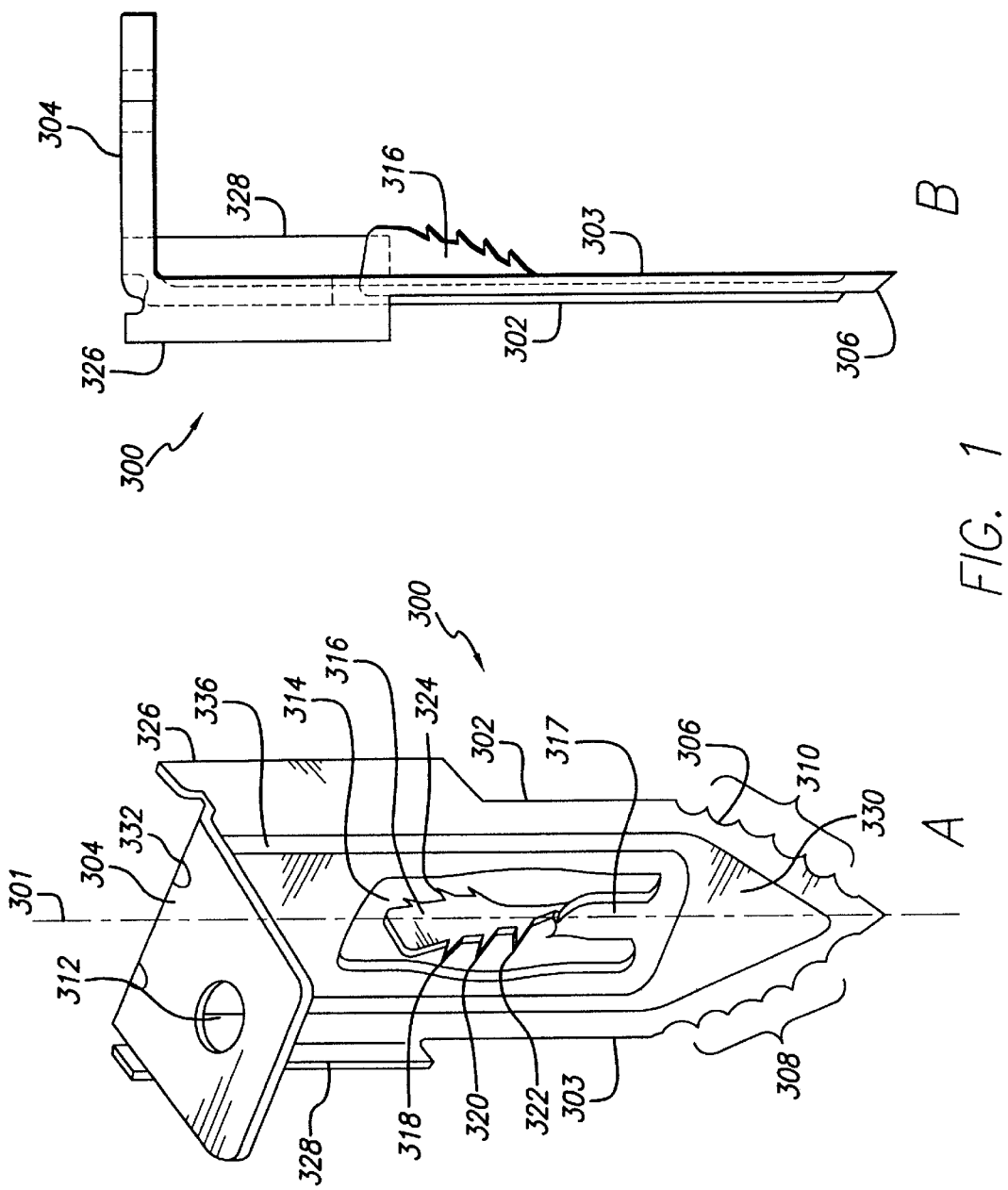

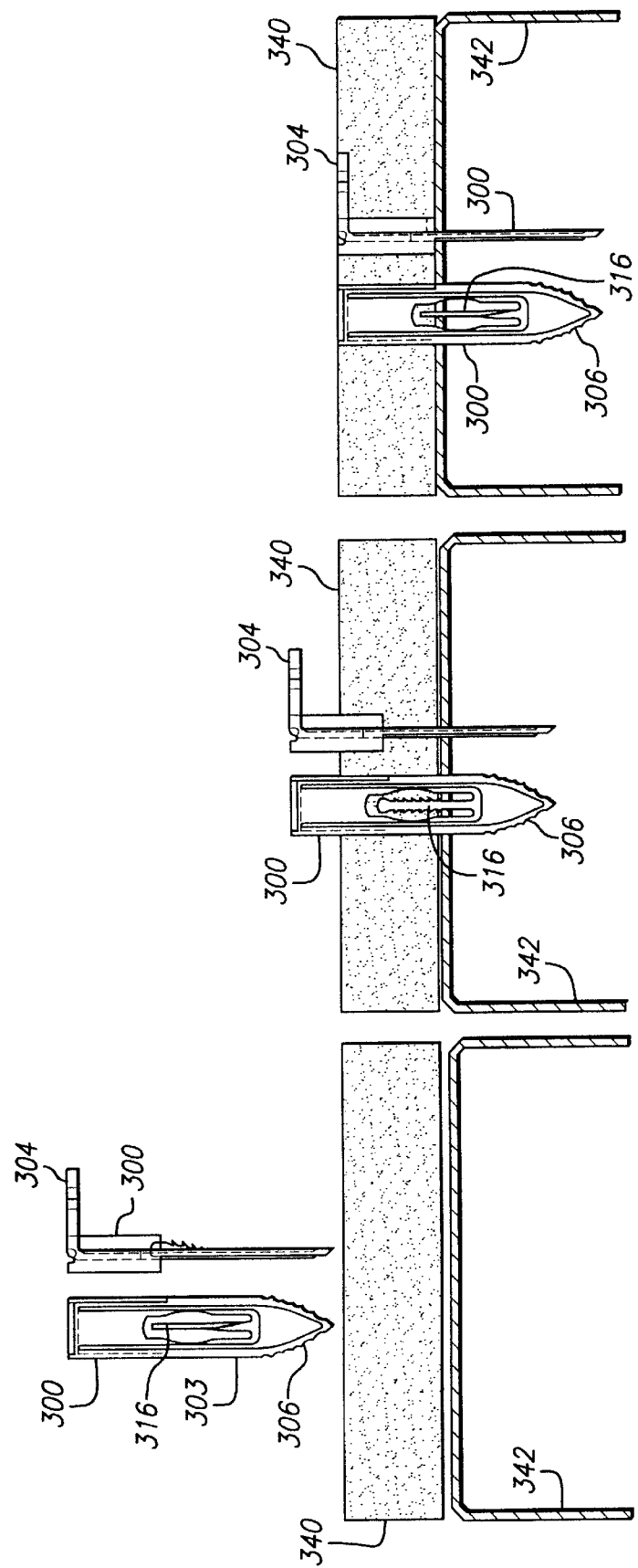

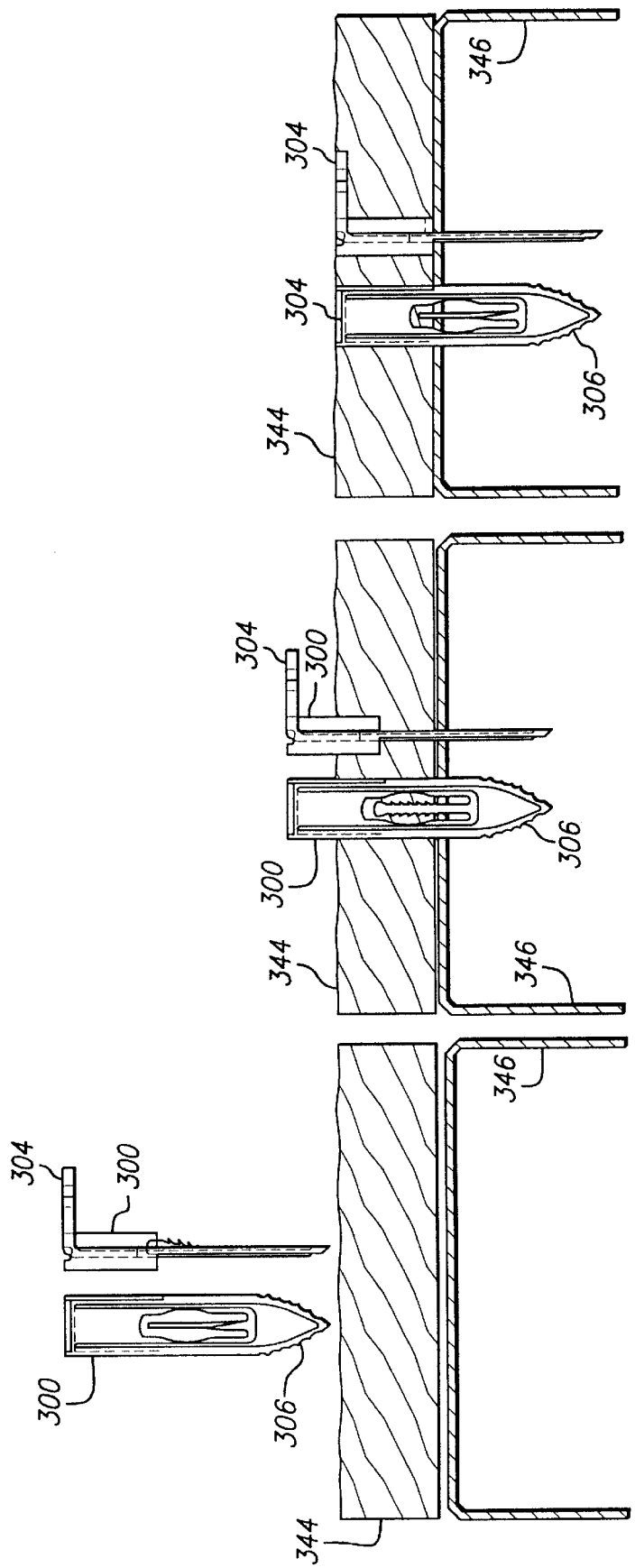

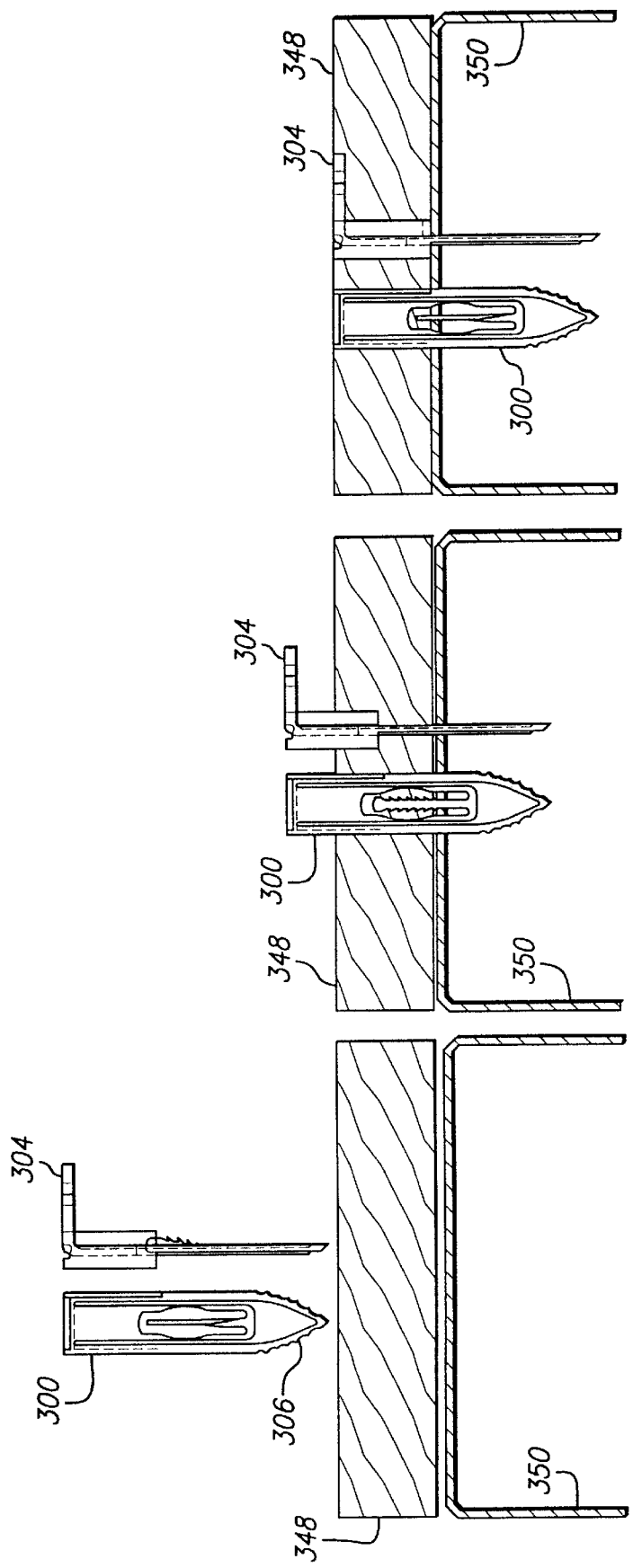

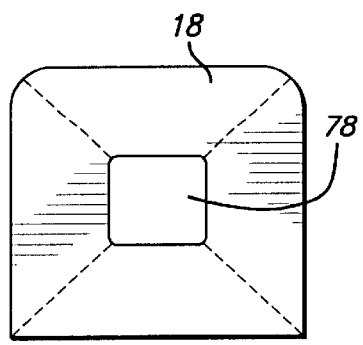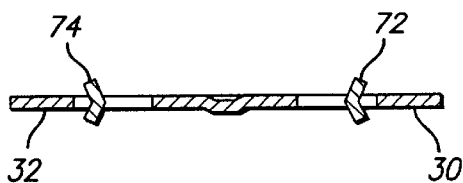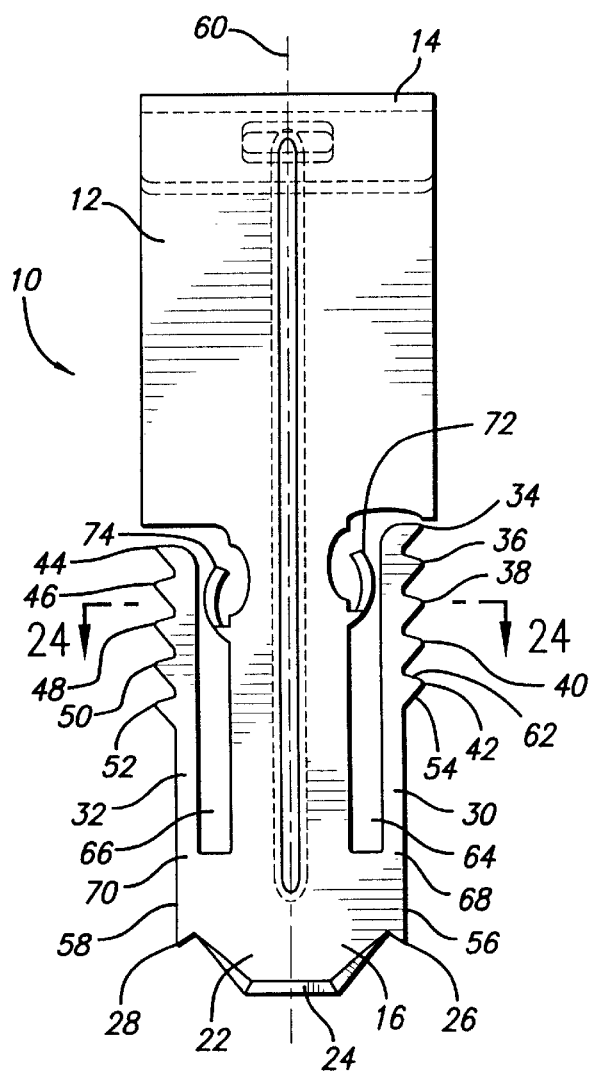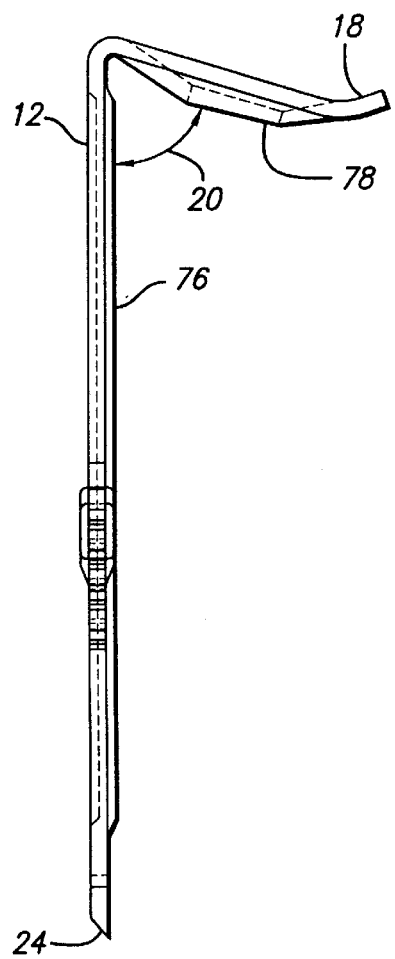
FIG. 23
FIG. 24
FIG. 21
FIG. 22

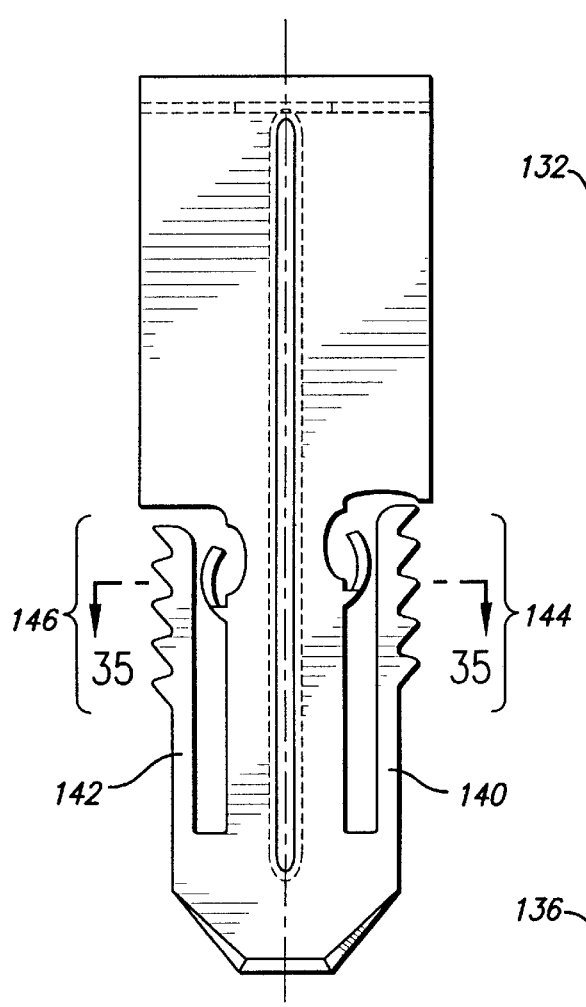
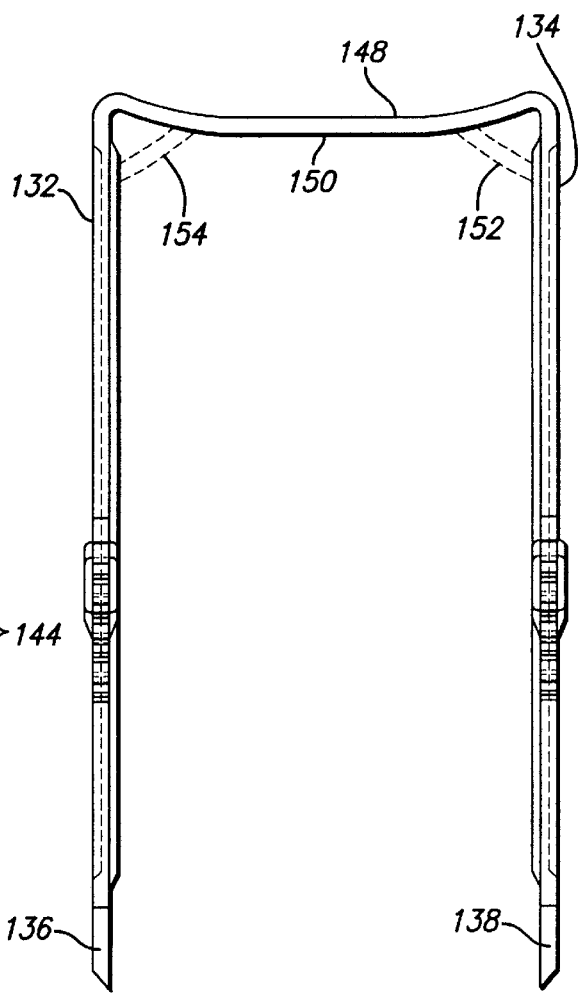
FIG. 32
FIG. 33
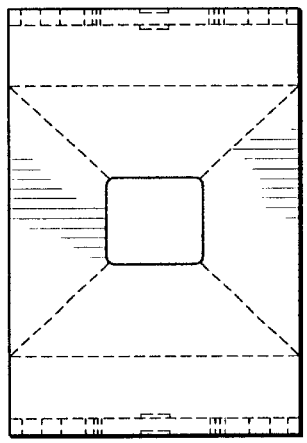
FIG. 34
FIG. 35

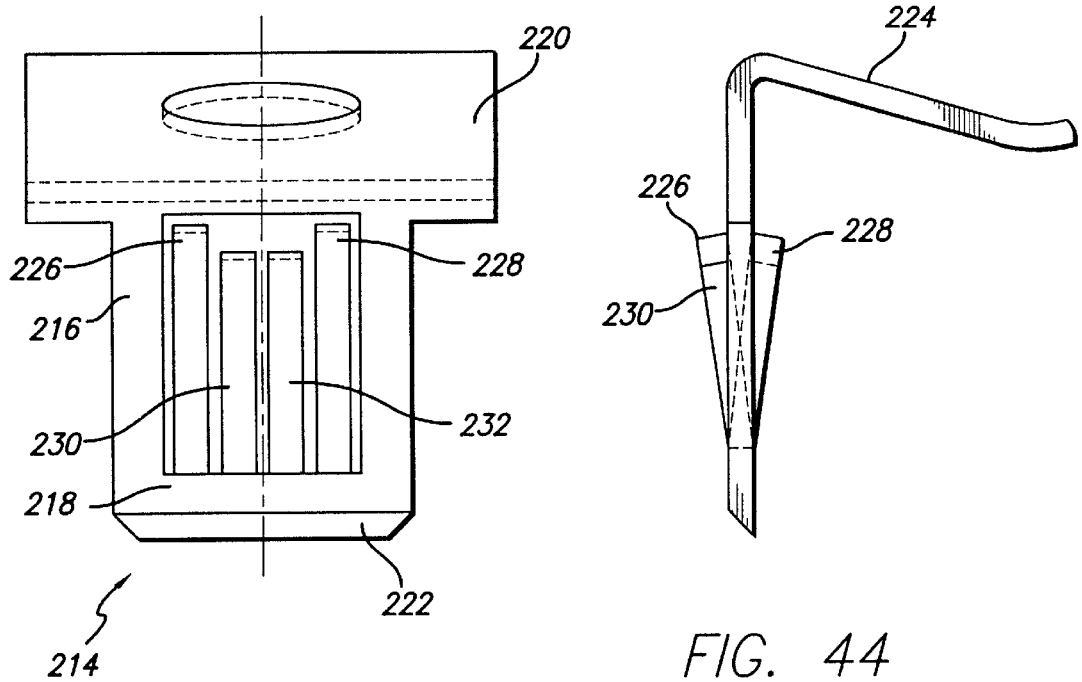
FIG. 43
FIG. 44
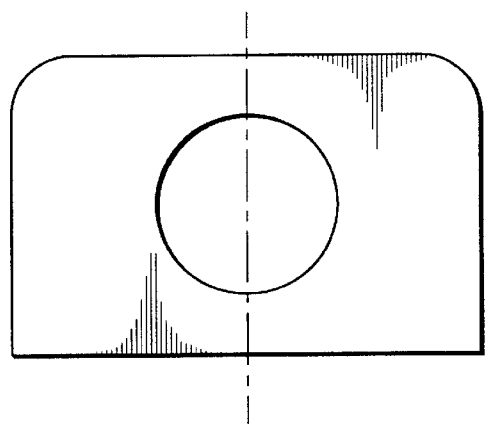
FIG. 45

POINTS ON FLAT STOCK

A ⊔ BLUNT

B ⎵ SPADE

C ∪ SEMI – ROUND (CONVEX)

D ∪ ELLIPTICAL (CONVEX)

E ⎣⌁⌁⌁⎦ SERRATED

F ∨ SPEAR

G ⌐⌐ GUILLOTINE

POINTS ON ROUND OR TUBE STOCKS

A ⋈ ∨ SYMMETRICAL TAPERS

B ○ ⟍ SINGLE, NON – SYMMETRICAL TAPER

C ⎣⌁⎦ ⎣⌁⎦ SERRATED

POINT EDGE

DOUBLE BEVEL     SINGLE BEVEL     BLUNT

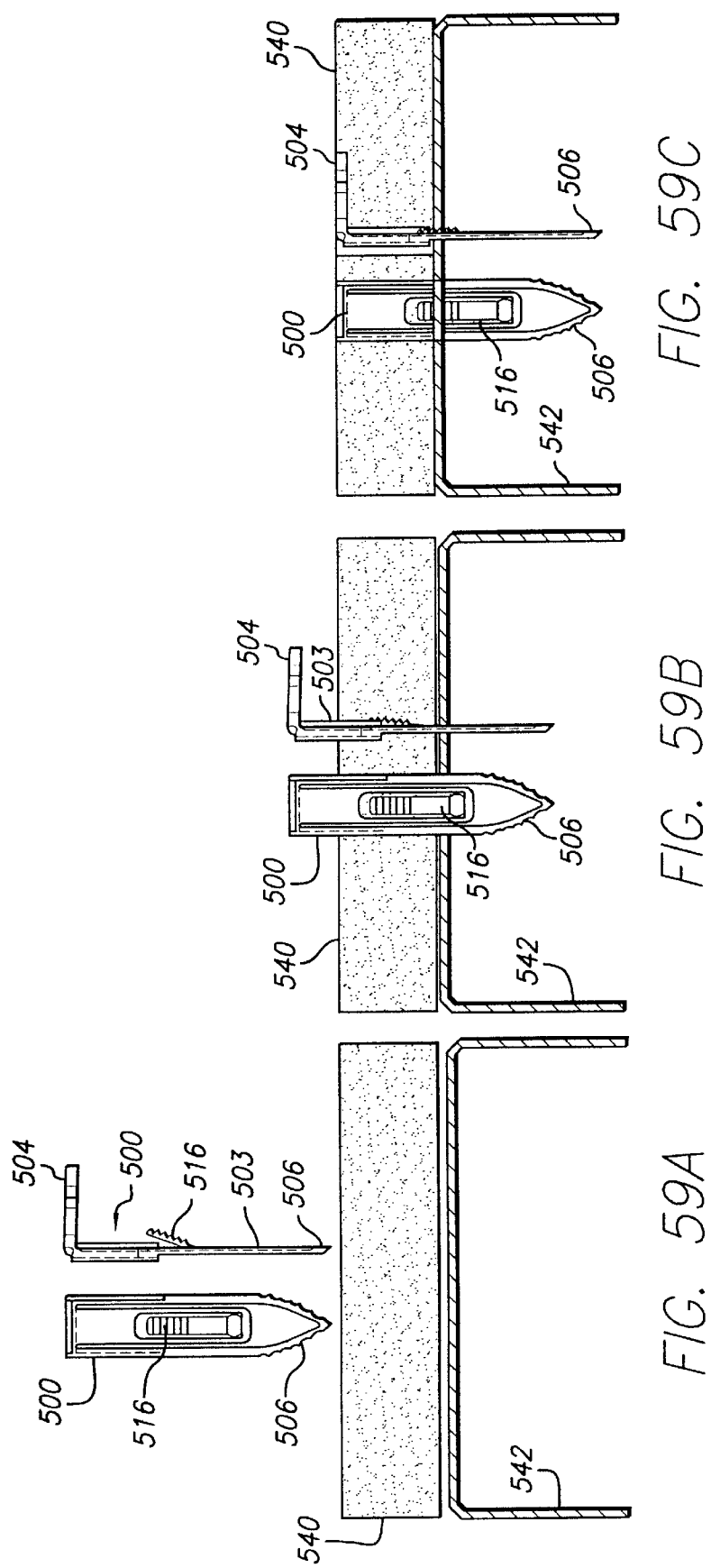

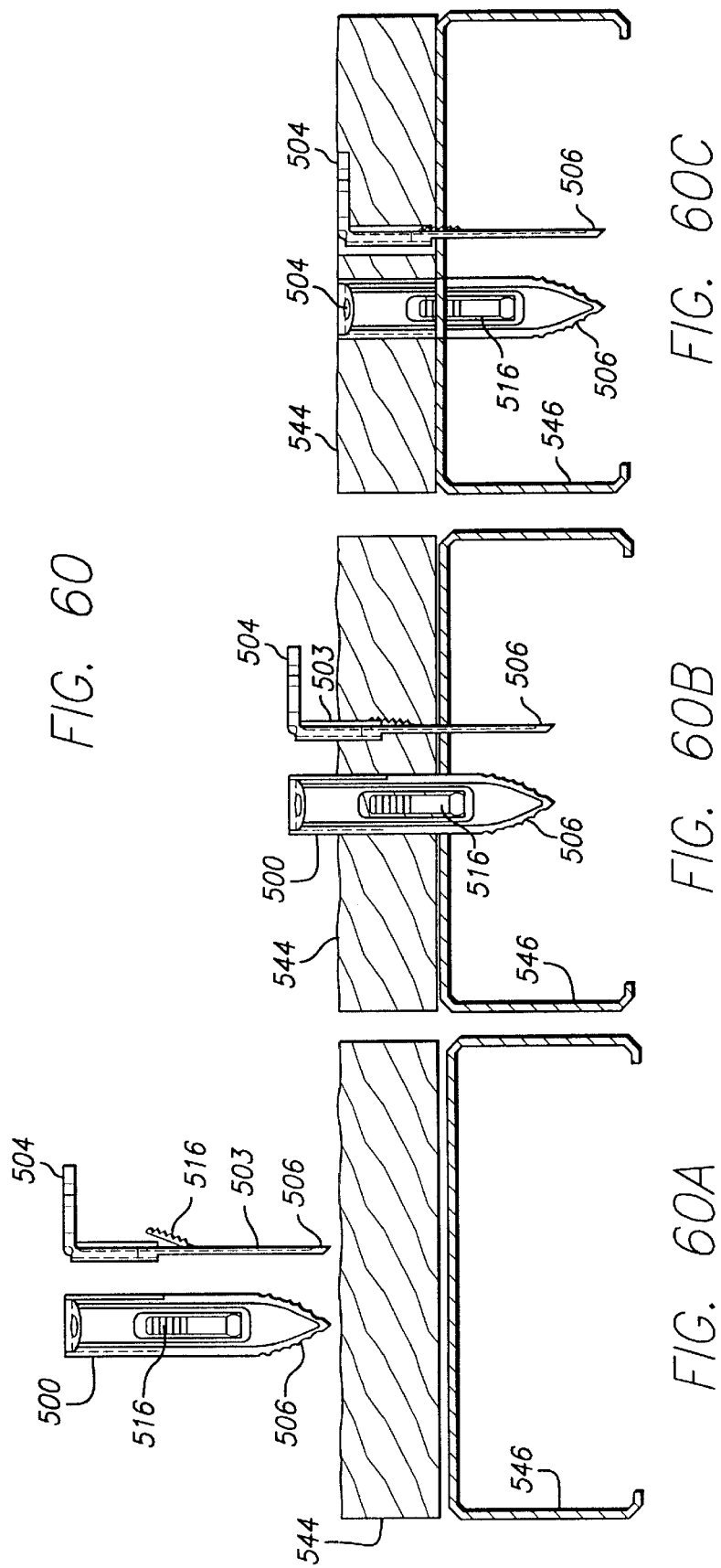

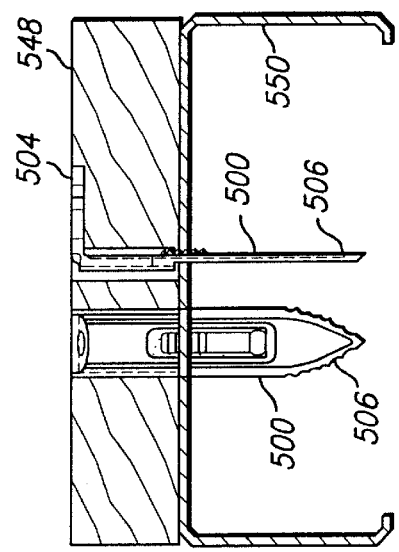
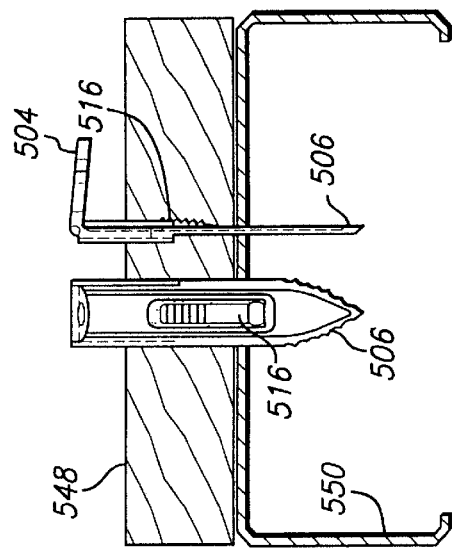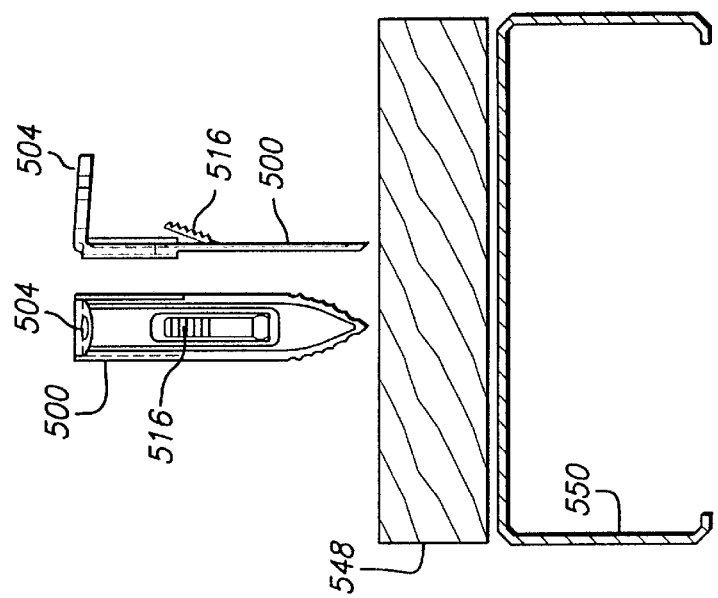

FIG. 63A
FIG. 63B
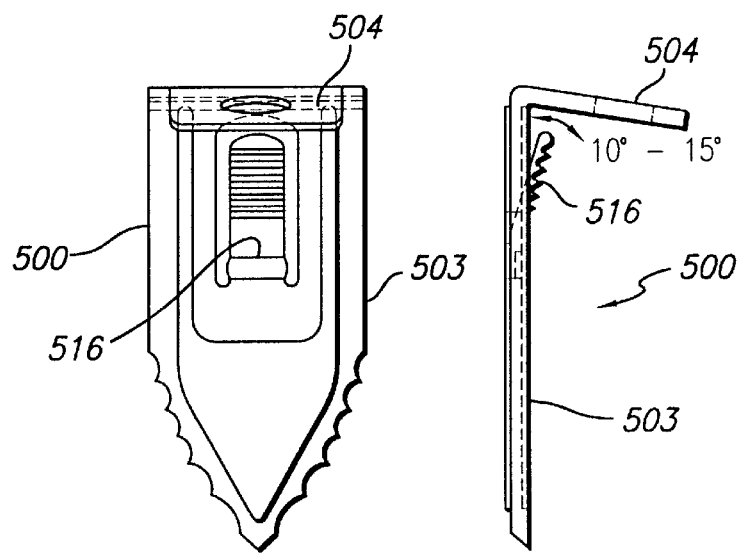
FIG. 64A
FIG. 64B
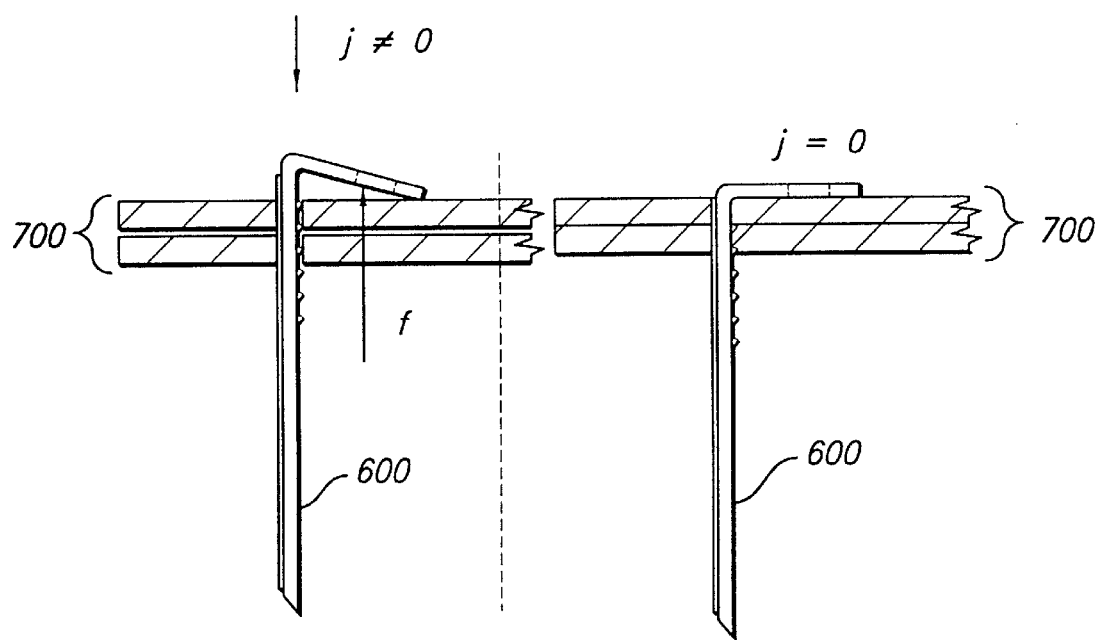

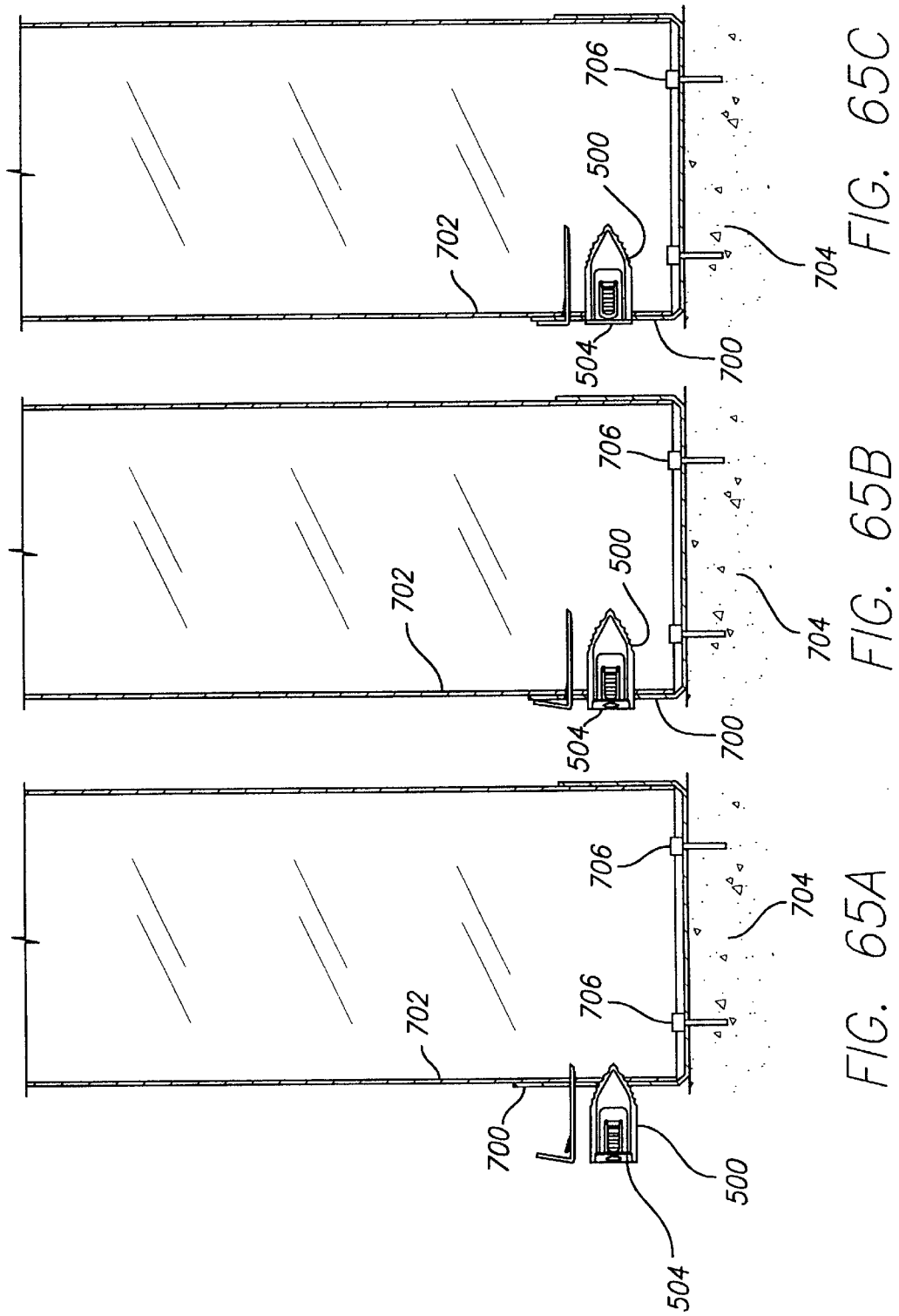

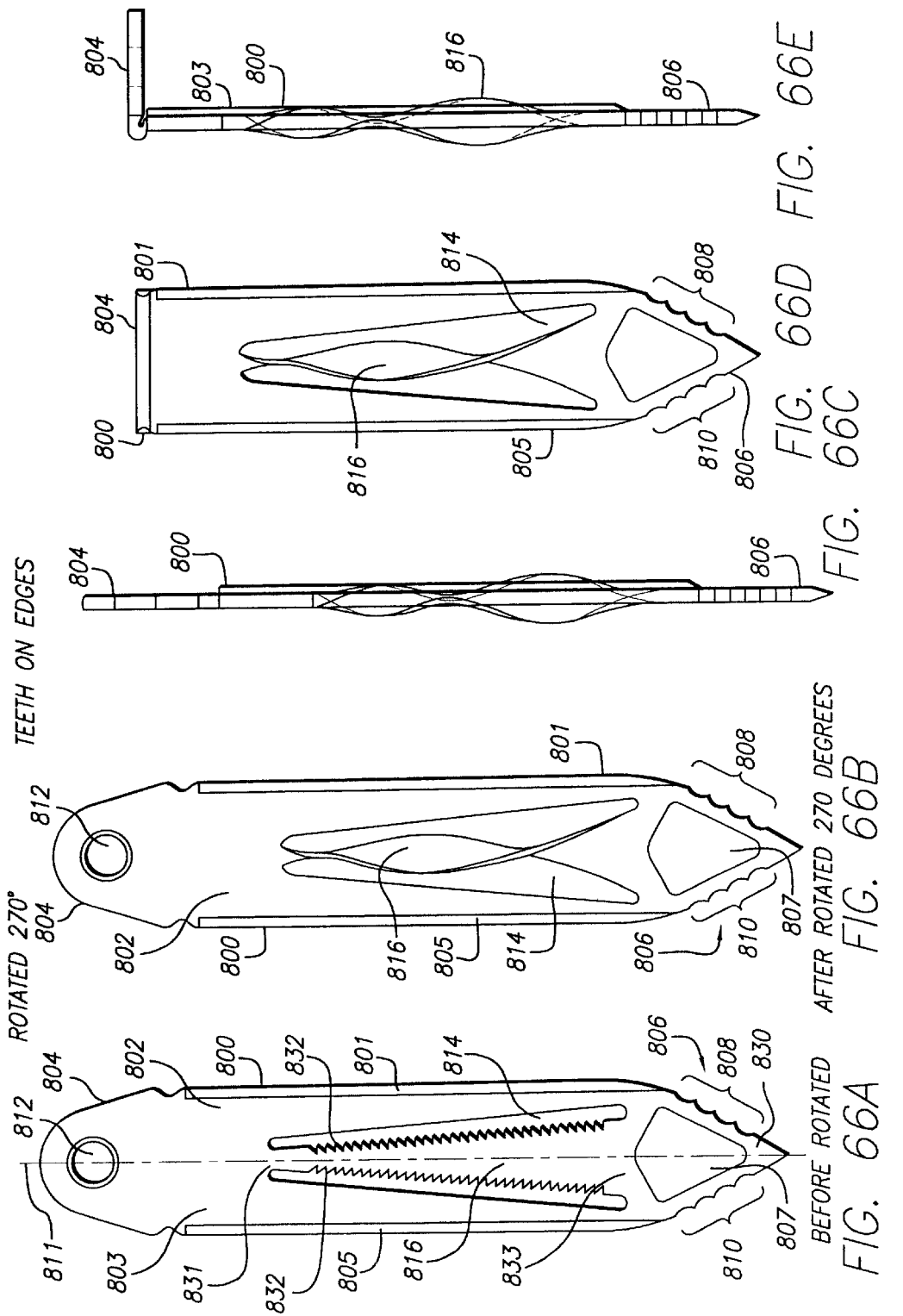

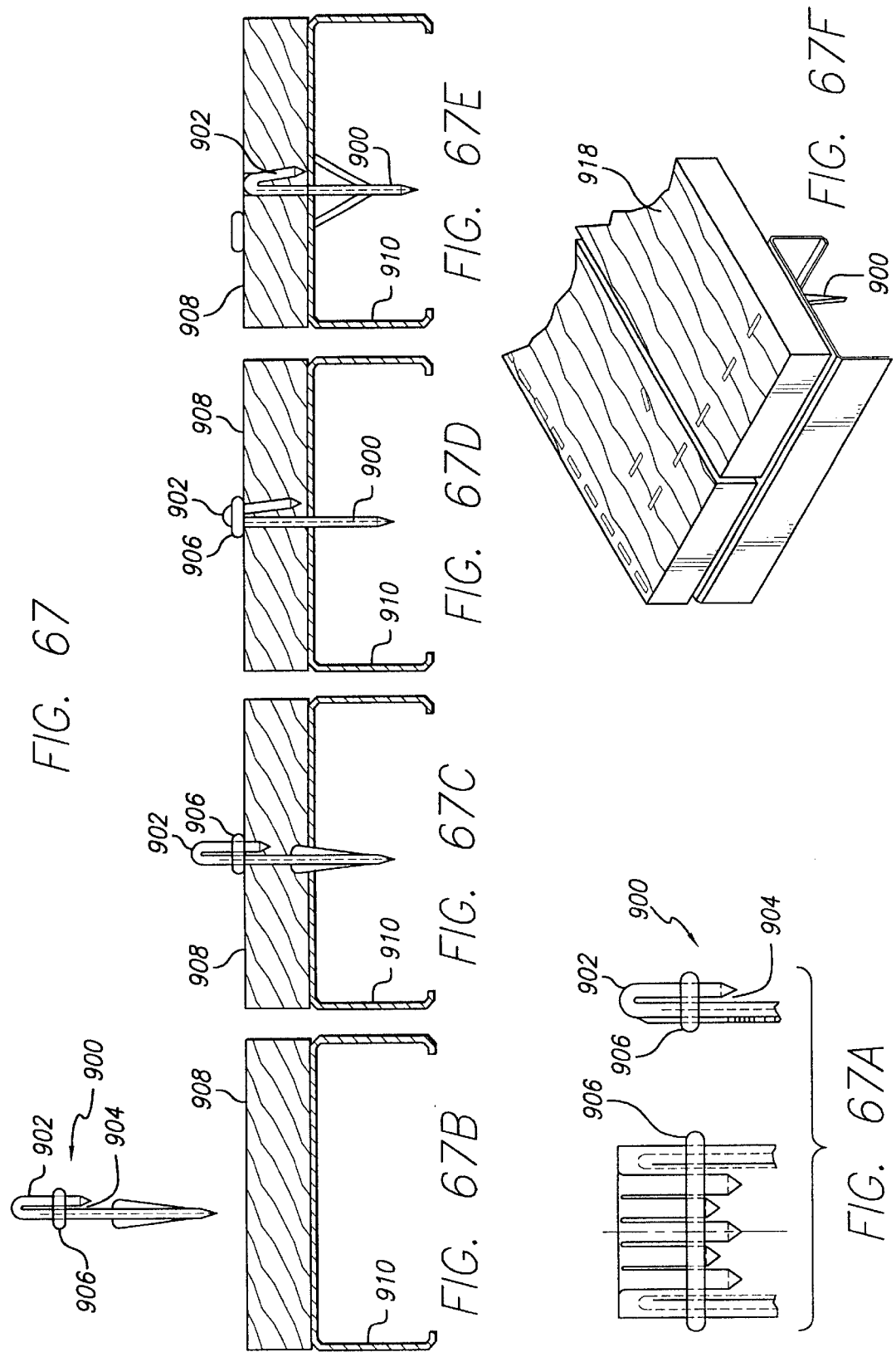

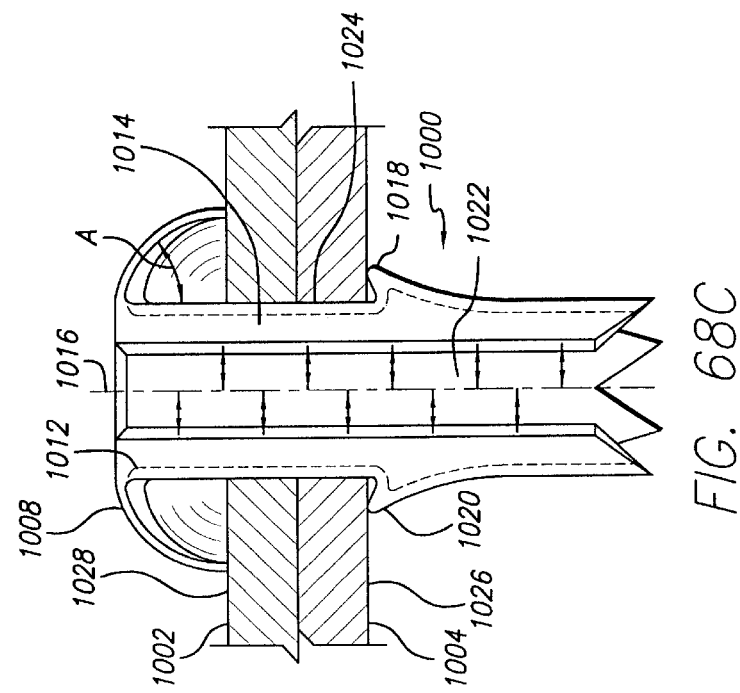
FIG. 68C
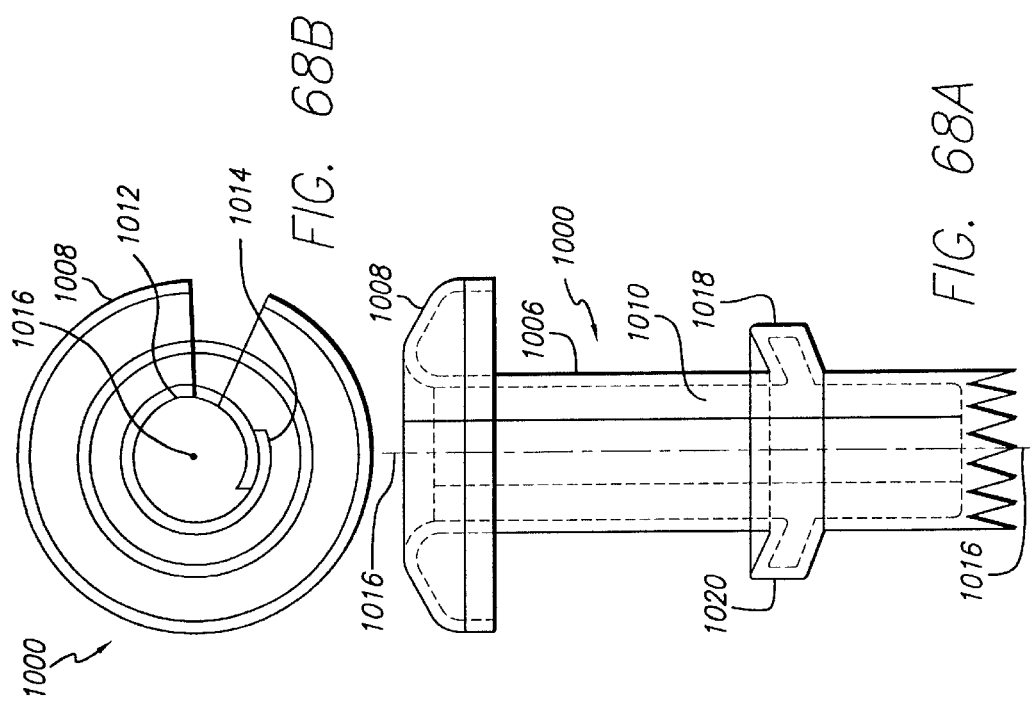
FIG. 68B
FIG. 68A

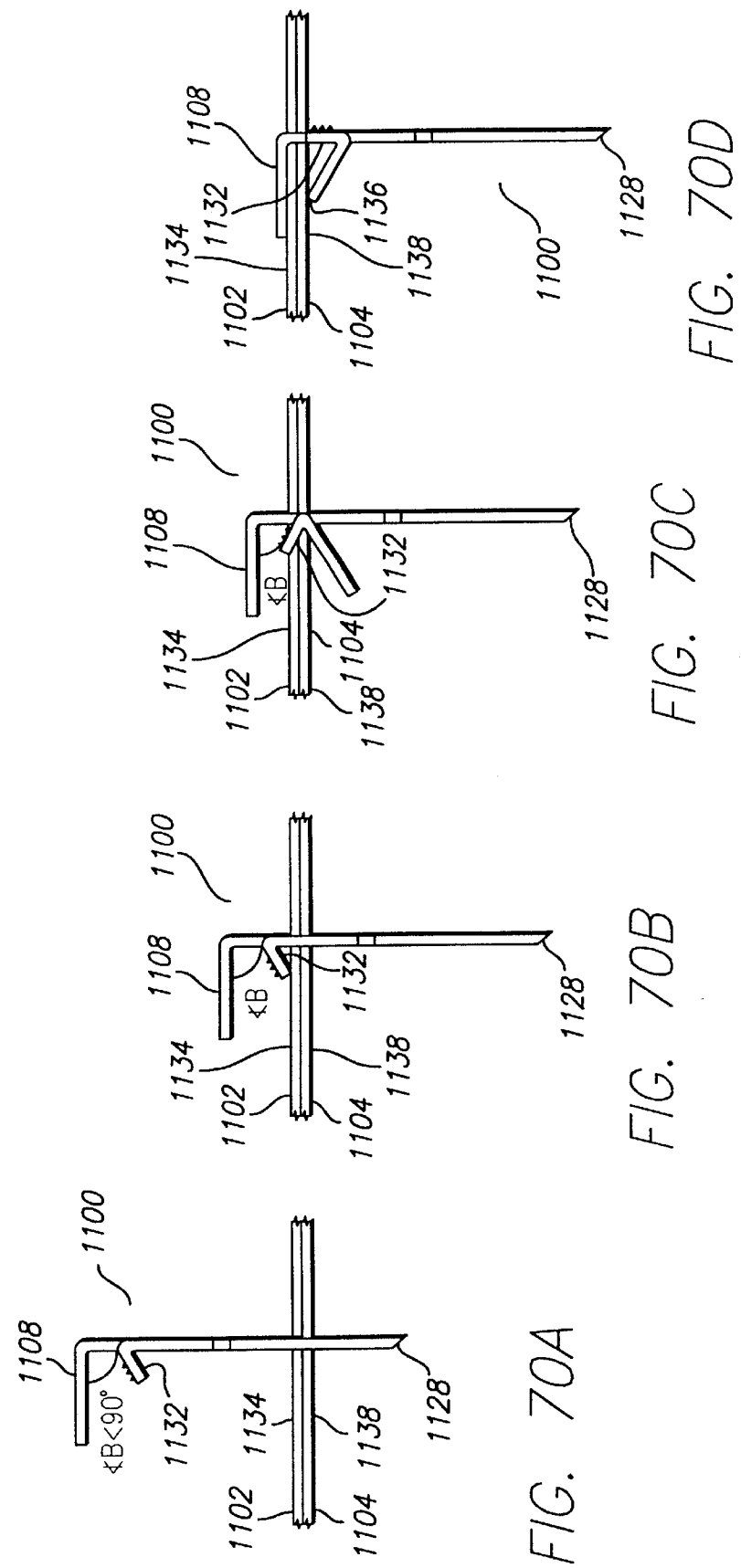

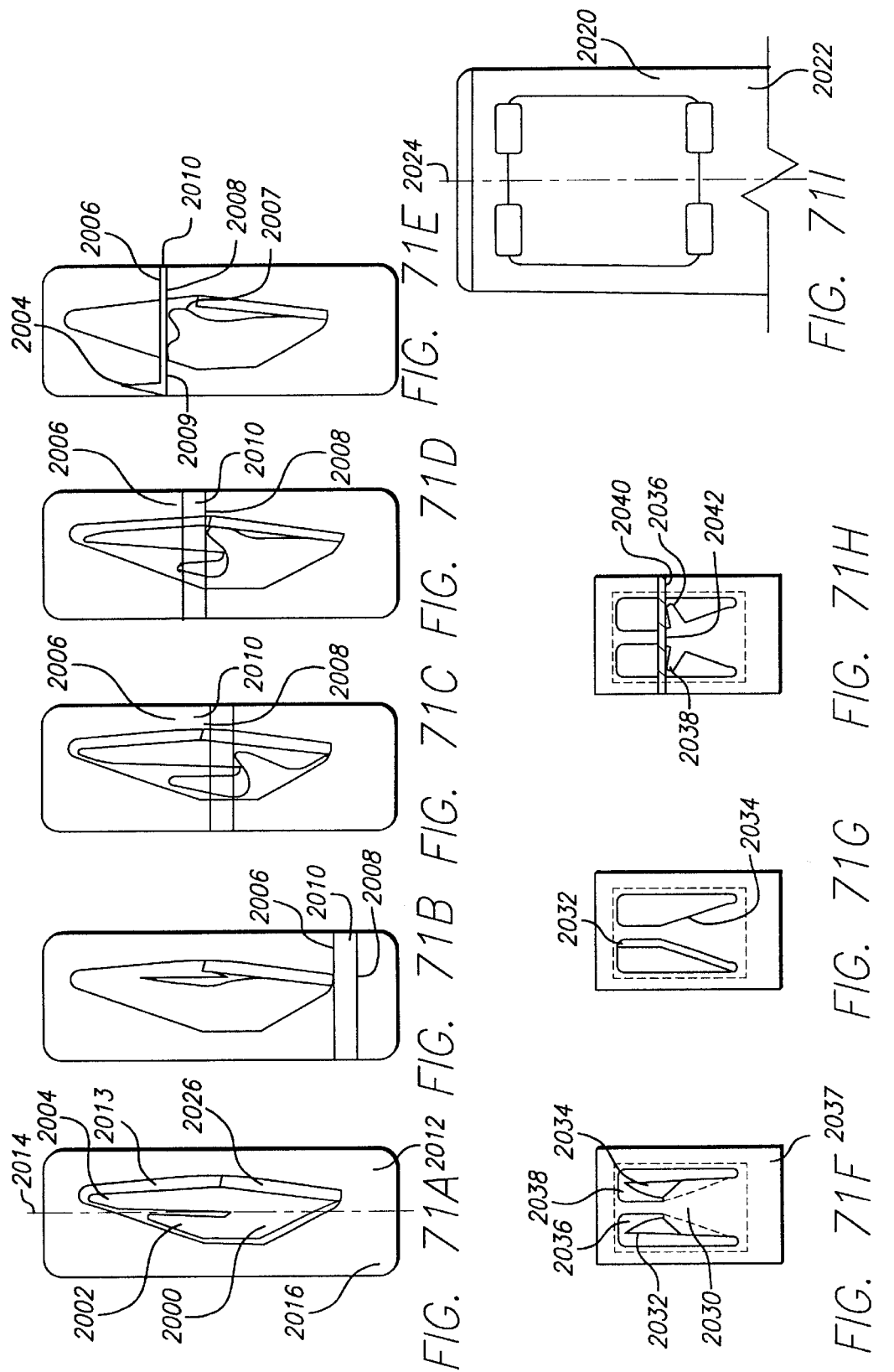

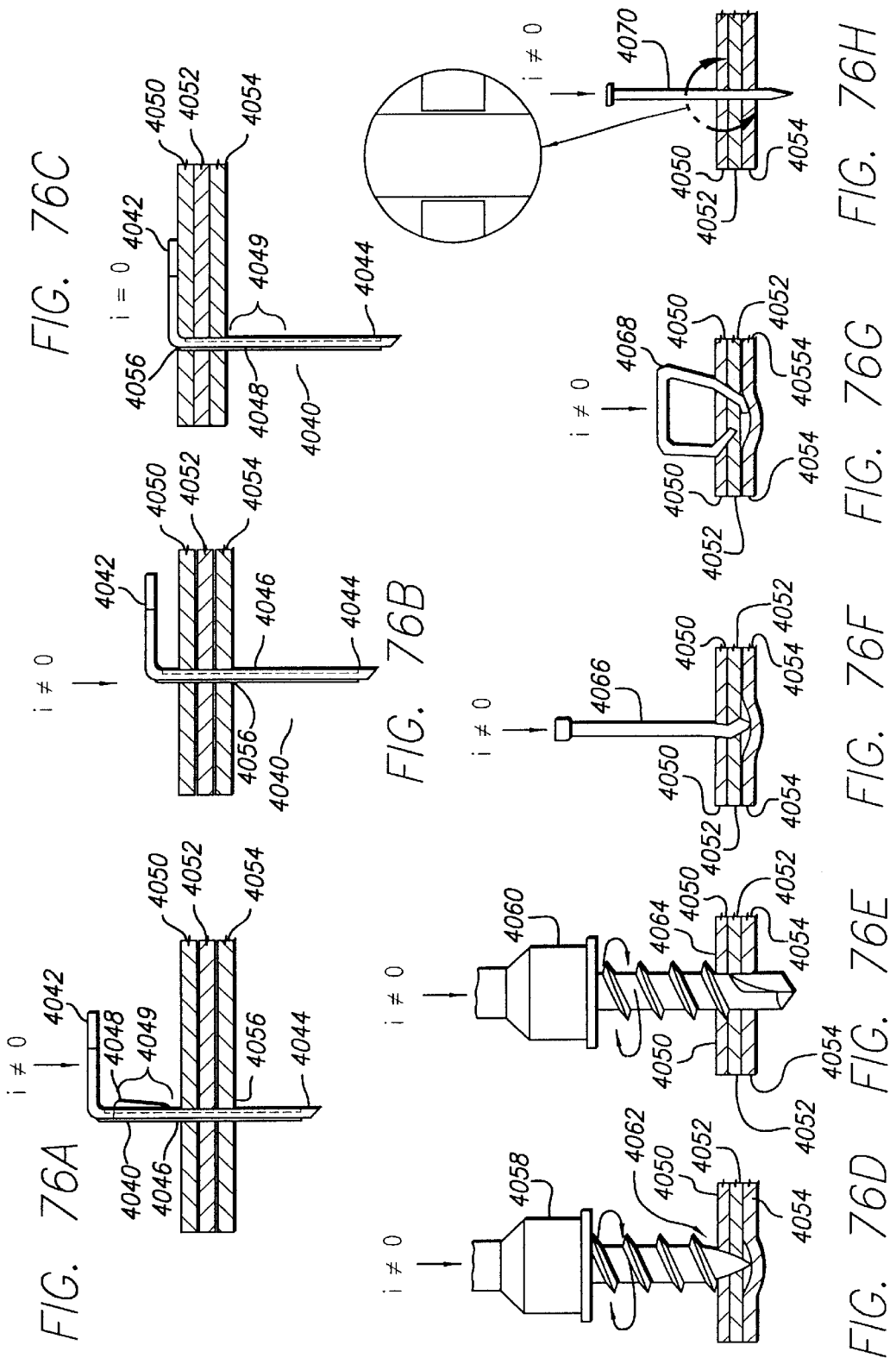

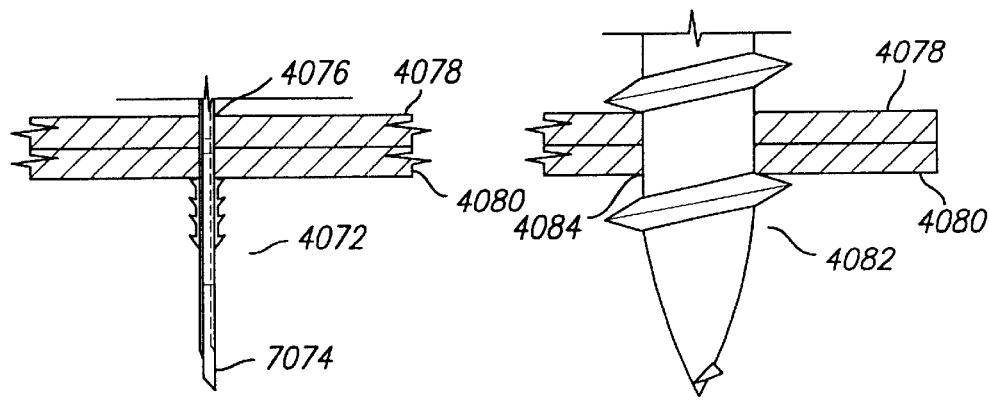
FIG. 77A
FIG. 77C
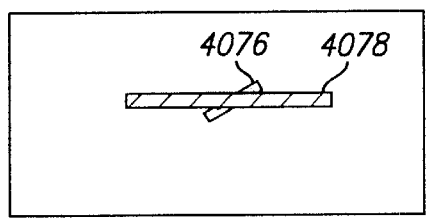
FIG. 77B
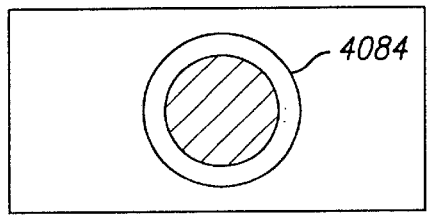
FIG. 77D

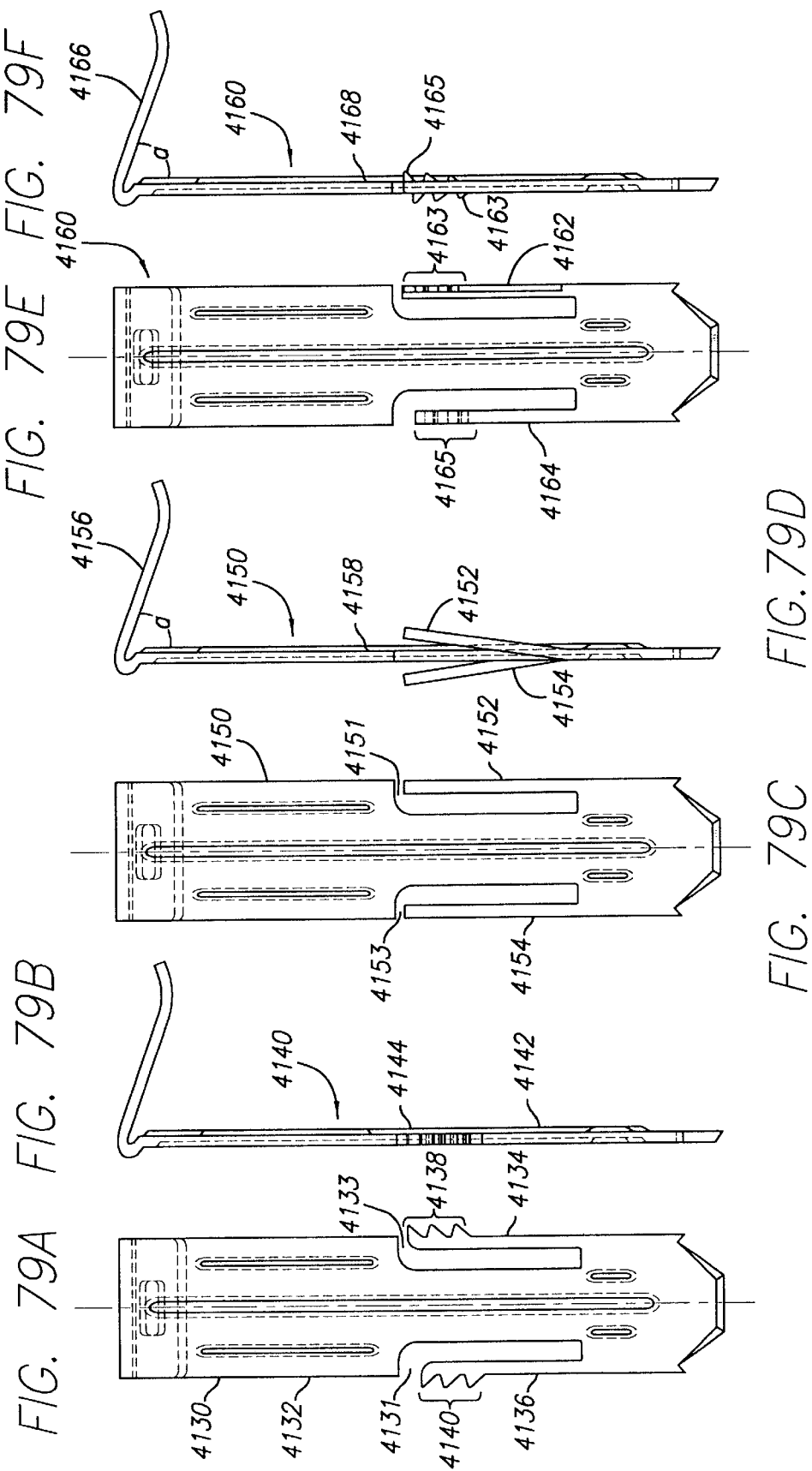

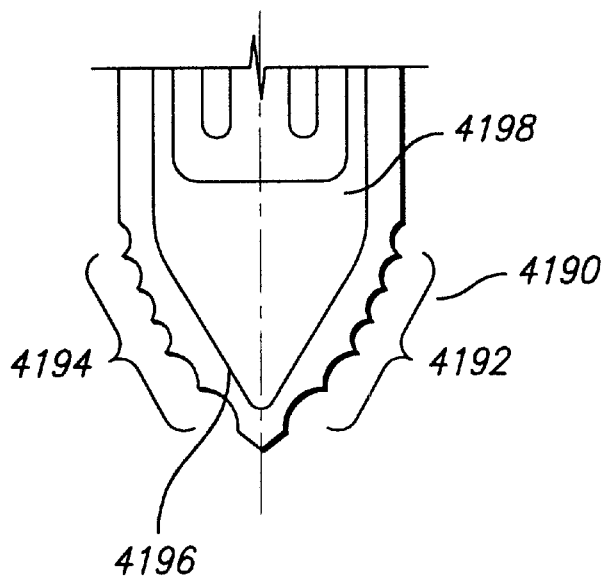
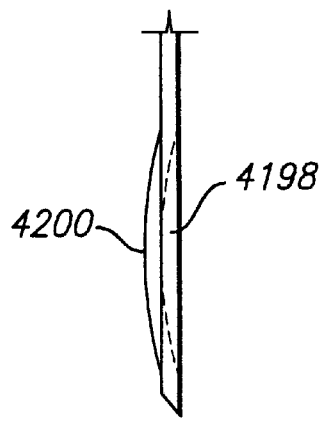
FIG. 81A
FIG. 81B
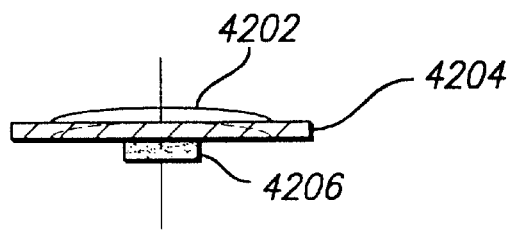
FIG. 81C

FIG. 84
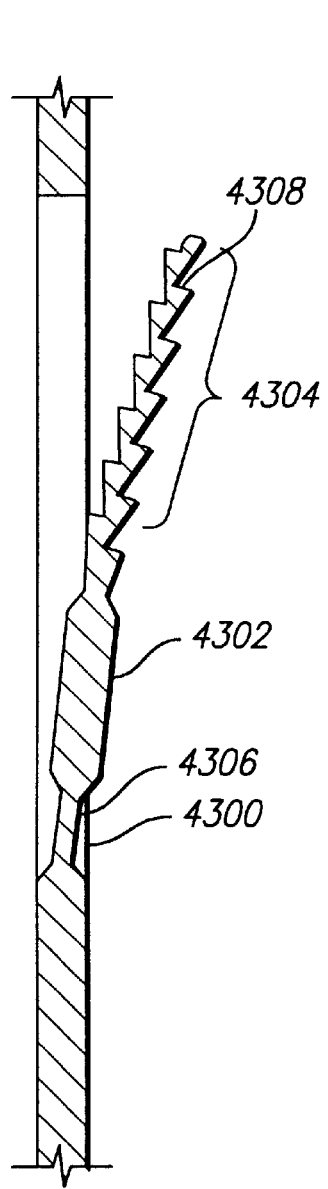
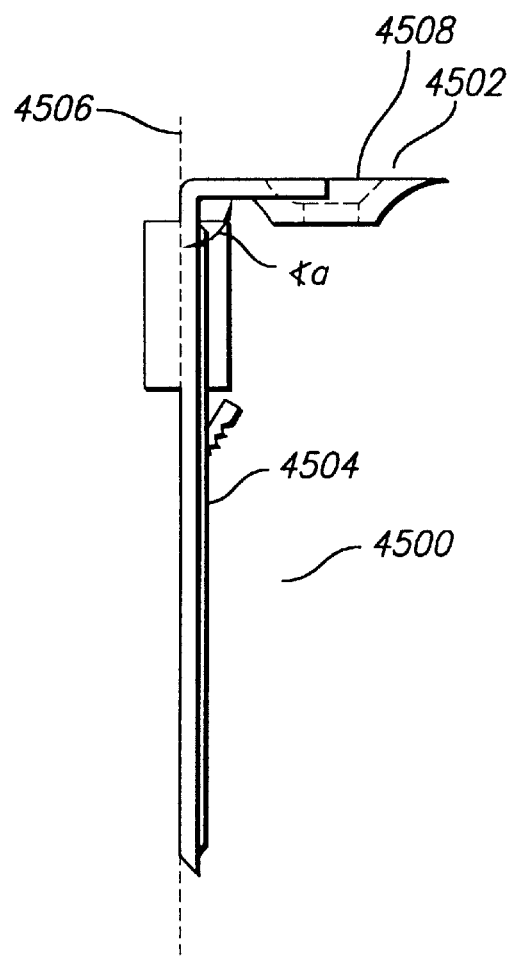
FIG. 86

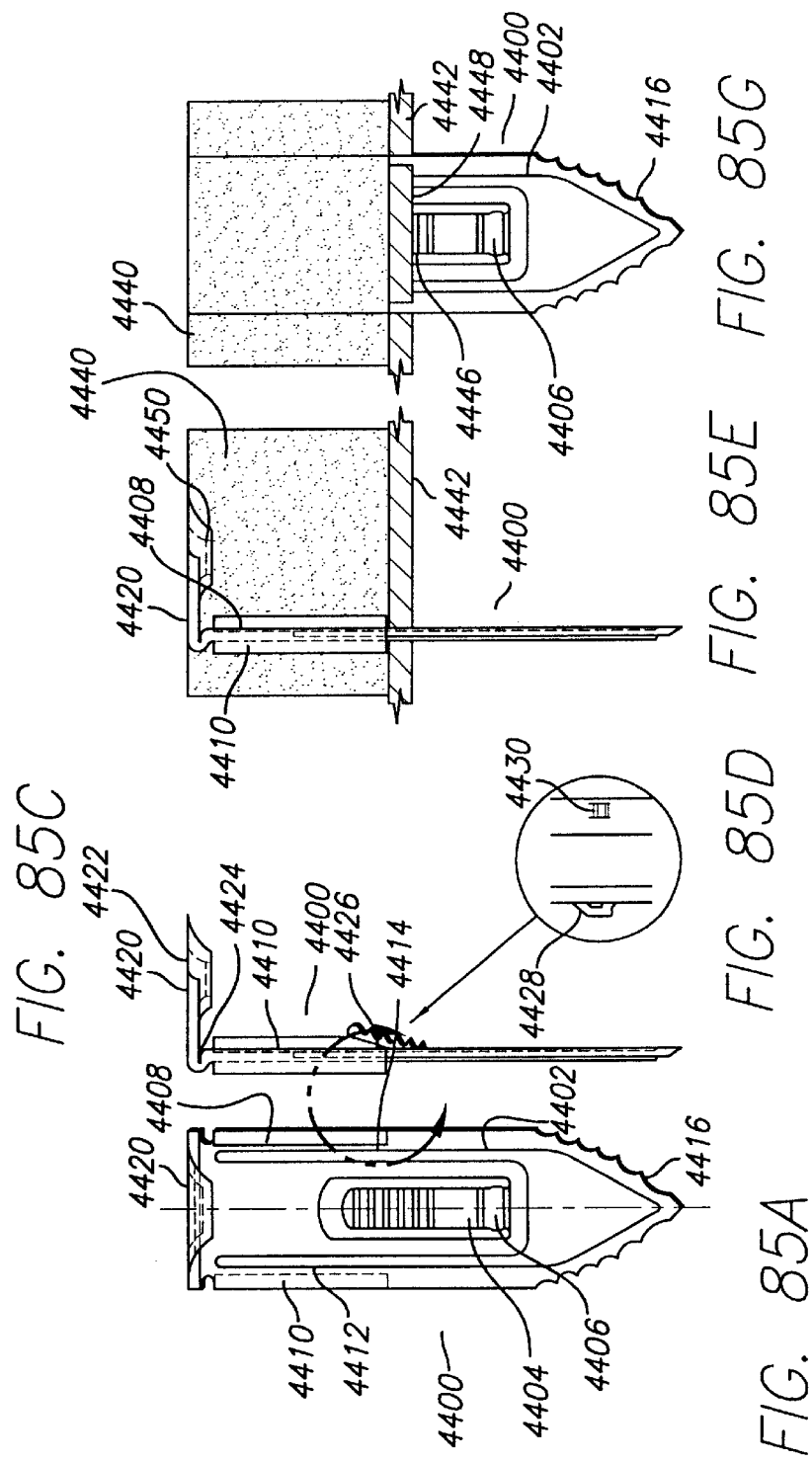

METAL PIERCING FASTENER

This application claims the benefit of United States Provisional Application Serial No. 60/167,810, filed Nov. 29, 1999, and entitled "Metal Penetrating Fasteners".

FIELD OF THE INVENTION

The present invention relates generally to fasteners and more particularly to a metal piercing fastener for securing one or more metal/non-metal layers to at least one metal layer and retaining the secured layers in their positions permanently under adverse conditions.

PRIOR ART

Many fastener designs exist in the prior art and generally these designs can be placed into two different categories. The first are fasteners used in an environment where the fastener is accessible from both sides of the work pieces being joined together, which include traditional nut and bolt or the like. The other group or category of fasteners are those which must operate in environments wherein the fastener is usually only accessible from one side of the work pieces and may be manipulated from one and only one of its ends to accomplish its fastening task. This is called "blind" fastening and the present invention is directed to fasteners in this category.

In this latter category, there are many varieties of such fasteners. Traditional examples of such fasteners, including those capable of penetrating sheet metal, can be grouped into two categories. The first grouping consists of self-piercing and self-drilling threaded screws. The second grouping consists of brads, staples, nails, drive pins and the like. In the first group of fastening devices, a high rpm electric screw gun is usually used for installation. In the second grouping, a pneumatically actuated tool is normally utilized to cause the fastener to penetrate the work pieces and secure them together. In many instances where U-shaped, staple-like fasteners, brads, nails, drive pins, and the like have been employed, such fasteners are provided in an elongated continuous member or 'stick' with the penetrating points all facing in a common direction. These sticks are inserted into the magazine of a tool. The tool is placed at a desirable position over one of the work pieces being fastened to the other, is activated and a driving element is forcibly driven against the end of the fastener on the end opposite the point driving the fastening element through the work pieces to secure the same together.

In the case wherein a metal self-piercing screw is utilized, the screw is secured into the end of a power-driven rotating chuck attached to an electric screw gun. The tool, upon being activated, rapidly rotates the screw at approximately 2500 to 4000 rpm. Upon application of significant physical force by the installer, the rotational friction of the screw against the work piece heats the metal to a softened state thereby allowing penetration of the work piece. The helical threads engage the metal pulling the fastener through and securing the work pieces together. In the case wherein a metal self-drilling screw is utilized, it is secured into a similar tool as is used with self-piercing screws except this type of electric screw gun rotates the self-drilling screw at approximately 1800 to 2500 rpm. Also, similar to self-piercing screws, application of a significant force by the installer is required to press the cutting flutes into the metal to achieve a drilling operation. After a hole is drilled, the fastener then engages helical threads to secure the work pieces together.

With these examples of prior art, it should be noted that the threaded fastener advancement rate for the piercing or drilling operation is slower than the advancement rate when the fastener threads are engaged. This not only implies that these types of 'blind' fasteners have much slower installation rates and require considerable force to be applied by the operator but their self-piercing or self-drilling function must be completed before any of their threads become engaged within the substrates.

When a non-metal work piece is to be attached to a light-gauge metal substrate or two or more pieces of metal are to be attached, the bottom sheet may be pushed away from the top piece to be attached before the penetration and fastening process is completed. In the construction trades and fastener arts, this phenomenon is termed "oil canning". Fastener "oil canning" is a function of fastener velocity, the metals' deflection properties and the ratio of the substrate mass being displaced to the fastener mass. The current state of art utilizes helical threads to pull the two separated sheets together. The lack of some mode of clamping component within nails, drive pins or staples precludes such fasteners from successfully tightening substrates to light gauge metal (s) or two or more light gauge metals together. Prior art metal penetrating fasteners and particularly metal penetrating and self-drilling screws demonstrate various disadvantages. Significant training and installation experience is required to bring the installer skill to an acceptable level.

For example, when attaching a work piece such as drywall, it is important that the work piece not be damaged and be properly clamped to the metal stud substrate without overdriving the fastener crown into the workpiece or tearing the work piece paper laminate. Use of such screws is labor intensive and requires physical pressure against the installation tool, both of which contribute to worker fatigue. Another disadvantage of conventional self-piercing and self-drilling threaded fasteners is that their threads achieve contact with the thin sheet metal base substrate at only one or two relatively small contact areas along the slanting helical threads. A single thread only touches the material on one side and a twin-lead thread will have just two contact points. This small area of contact (deemed "thread engagement") frequently contributes to a fastening failure mode referred to as "thread strip-out." This can occur when a slight over-torqueing of the fastener causes this relatively small contact point in the metal to rapidly fatigue resulting in the destruction of the mechanical interlock between the thread and metal substrate. In addition, there is an industry trend towards the use of even thinner metals which will acerbate this problem.

With other conventional fasteners, such as nails, drive pins or staples, there is no effective device or means to provide a gripping and clamping action on the backside of the bottom substrate being fastened. Therefore, adequate clamping of sheets is not always assured. Even more lacking is their withdrawal or 'pull-out' resistant values that are dependent on lateral friction forces between the fastener's contact points with the pierced holes. It has been determined that effective withdrawal or 'pull-out' values for these types of fasteners is not attained until the thickness of bottom substrate metal exceeds a thickness of 0.1250" or that of a 11 gauge metal sheet. In addition, prior to the fastener of this invention, only drive pins within this category of blind fasteners have been able to consistently pierce metals of this thickness. The failure of these types of blind fasteners during severe conditions such as hurricanes, tornadoes, and earthquakes to effectively hold fastened substrates together has resulted in many of these types of fasteners being de-certified for light gauge structural metal construction applications. Additions of non-resilient spiral threads, flutes, undercuts, barbs or teeth to these products tend to only increase the physical dimensions of the substrate penetration pattern by ripping or removing the actual metal required to provide adequate clamping and holding.

Another consequence of this low thread-engagement condition is the lack of requisite friction to increase "back-off" resistance. When a threaded fastener is subjected to vibration or withdrawal stresses this "back-off" resistance is the force which keeps the fastener in place. In such thin materials and with such minor thread engagement, the "back-off" resistance is minimal and the fastener frequently becomes loose, thereby sacrificing the integrity of the fastened joint.

Furthermore, with conventional nails, staples, or drive pins designs, such fasteners lack an effective method to clamp two or more pieces of materials together where the bottom material is made of light gauge metal. During high velocity installation, the mass of these fastener bodies pushes the second or base material away from the top materials (this was previously referred above to as "oil-canning.") Even if these different types of fasteners manage to penetrate the base material, they have no effective design feature to pull or clamp the two or more sheets tightly together. Attempts have been made to incorporate "spiral" threads onto certain types of these fasteners. However, with the thin gauges of sheet metals in use, the "spirals" achieve insufficient thread-engagement to function as an effective and consistent clamping mechanism. Additionally, when the fastener thread is already engaged in top sheets, subsequent sheets may be pushed away during initial penetration of the fastener. Basic mechanics disallow one "spiral" thread to pull against another thread on the same fastener. The result is that the metal sheets are not effectively clamped together.

Therefore, the need arises for a self-piercing fastener which may be fabricated from relatively thin, hardened and resilient material such as LGSM and which may be used with a power tool adapted to accommodate the fastener. The power tool user would require little or no training at all and would actuate the power tool by pulling a trigger, pushing a button or the like.

The need also arises for a novel fastener which may have a relatively low profile body equipped with a crown at one end and a piercing tip or point at the other end. Such a fastener should have high tensile and shear values as well as optimized gripping and clamping capability to provide high 'withdrawal' and 'back-out' resistant values. When the fastener is propelled, via a high velocity impact tool, it should be capable of effectively penetrating thin LGSM sheets with an insignificant occurrence of "oil canning". The fastener may be also provided with resilient gripping and clamping elements "tines" which can be integrally formed from the fastener body. A resilient tine may be deflected into a void either within the body of the fastener or a void created elsewhere by the fastener's penetration process. The deflection process may be invoked by a cam surface on that part of the tine, which will first contact the substrate or edges of the opening pierced by the fastener's piercing tip. The process of deflecting the tine, with its protruding gripping and clamping elements, into these voids, ensures they will not enlarge or remove any additional LGSM substrate than was pierced or cut by the fastener's tip/point. After passing through the LGSM substrate, the tine should be no longer restrained and capable of immediately attempting to spring-back to its original position. In doing so, it would move away from the fastener's body and underneath the base material being fastened. The gripping and clamping elements may be opposed by at least one or more spring-loaded members including the fastener's crown and driving stops on the fastener's body to provide the spring-back force needed to push against the gripping and clamping elements thereby effectively securing the work pieces together over the expected lifetime of the fastener. Through appropriate formation of the piercing tip of the fastener, the pierced LGSM substrate should be left with a clean opening of diameter less than the diameter of the fastener locking element to effectively clamp the work pieces together. Such a fastener may be utilized in securing drywall to LGSM studs, plywood to LGSM studs, cement fibreboard to LGSM studs, or any other non-metal material to a metal material, or two or more layers of sheet metal together.

SUMMARY OF THE INVENTION

The present invention meets the above needs and is directed to a fastener for securing a plurality of laminar work pieces together, at least one of the laminar work pieces being metal, the fastener comprising: a metal body having a first end and a second end; a crown formed at the first end of the metal body, the crown adapted for clamping the plurality of laminar work pieces together; a metal piercing region formed at the second end of the metal body for piercing the plurality of laminar work pieces; and a gripping and clamping member disposed between the first and second ends of the metal body to lock the pierced laminar work pieces together.

In accordance with one aspect of the present invention, a metal piercing fastener is described for securing laminar work pieces together, one of which is metal, the fastener comprising a body formed from sheet spring metal material and having first and second ends and first and second side edges; a crown formed at the first end; a metal piercing region at the second end; the first and second side edges and the metal piercing region being coined; and a resilient locking member attached at one end thereof to the body intermediate the first and second ends.

In accordance with another aspect of the present invention, a metal piercing fastener for securing a first member to a second metal member, the fastener comprising a blade having first and second ends and first and second side edges formed from sheet spring material having a uniform thickness and a width substantially greater than the thickness; a crown protruding from the first end of the blade, the second end of the blade defining a metal penetrating region, the crown being adapted to receive an impact blow from a tool to drive the metal penetrating region through the second metal member; the blade defining a slot spaced inwardly from the first side edge and terminating adjacent the second end to provide a freestanding separate resilient tine extending upwardly from the second end of the blade and terminating intermediate the first and second ends, the tine having an inboard edge and on outboard edge; and a plurality of protruding elements formed on the outboard edge, each protruding element having a cam surface facing toward the second end for engaging the second metal member to urge the tine into the slot as the fastener passes through the metal workpiece.

In accordance with still another aspect of the present invention, a metal piercing fastener for securing a first member to a second metal member, the fastener comprising a blade having first and second ends and first and second side edges formed from sheet spring material having a non-uniform thickness and a width substantially greater than the thickness; a crown protruding from the first end of the blade, the second end of the blade defining a metal penetrating region, the crown being adapted to receive an impact blow from a tool to drive the metal penetrating region through the second metal member; the blade defining a slot spaced inwardly from the first side edge and terminating adjacent the second end to provide a freestanding separate resilient tine extending upwardly from the second end of the blade and terminating intermediate the first and second ends, the tine having an inboard edge and on outboard edge; and a plurality of protruding elements formed on the outboard edge, each protruding element having a cam surface facing toward the second end for engaging the second metal member to urge the tine into the slot as the fastener passes through the metal workpiece.

In accordance with yet another aspect of the present invention, a method for securing a plurality of laminar work pieces together, one of the laminar work pieces being metal, comprising the steps of providing a metal fastener body having a crown at one and a rigid metal piercing point at the other end; providing at least one resilient tine on the metal fastener body adapted for securely gripping and clamping the laminar work pieces during fastening; impacting the fastener crown with a tool to drive the fastener metal body into the plurality of laminar work pieces; and gripping and clamping the pierced laminar work pieces with the resilient tine to lock the pierced laminar work pieces together between the crown and the resilient tine.

In accordance with a different aspect of the present invention, fastener for securing an expanded wire to at least one laminar work piece, the fastener comprising a metal body having a first end and a second end; a crown formed at the first end of the metal body, the crown adapted for clamping the expanded wire to the at least one laminar work piece; a metal piercing region formed at the second end of the metal body for passing through the expanded wire and piercing the at least one laminar work piece; and a gripping and clamping member disposed between the first and second ends of the metal body to lock the expanded wire to the at least one pierced laminar work piece.

These and other aspects of the present invention will become apparent from a review of the accompanying drawings and the following detailed description of the preferred embodiments of the present invention.

BRIEF DESCRIPTION OF THE DRAWINGS

FIG. 1 at sub-figures A–B shows a perspective view and a side view of a fastener constructed in accordance with the principles of the present invention and having a single axis;

FIG. 2 at sub-figures A–C shows a front elevational view and a side view of the fastener of FIG. 1 in the process of penetrating a plurality of substrates in accordance with the present invention;

FIG. 3 at sub-figures A–C shows a front elevational view and a side view of the fastener of FIG. 1 in the process of penetrating a different plurality of substrates in accordance with the present invention;

FIG. 4 at sub-figures A–C shows a front elevational view and a side view of the fastener of FIG. 1 in the process of penetrating another plurality of substrates in accordance with the present invention;

FIG. 21 is a front elevational view of one embodiment of a fastener constructed in accordance with the principles of the present invention and having a single axis;

FIG. 22 is a side view of the fastener shown in FIG. 21;

FIG. 23 is a top view of the fastener shown in FIG. 21;

FIG. 24 is a sectional view taken about the lines A—A of FIG. 21;

FIG. 32 is a front elevational view of an additional alternative embodiment of a fastener similar to that shown in FIG. 21 but having a dual axis;

FIG. 33 is a side view of the fastener illustrated in FIG. 32;

FIG. 34 is a top view of the fastener illustrated in FIG. 32;

FIG. 35 is a sectional view of one leg of the fastener illustrated in FIG. 32 taken about the lines A—A thereof;

FIG. 43 is a front elevational view of yet another alternative embodiment of a fastener constructed in accordance with the principles of the present invention;

FIG. 44 is a side view of the fastener illustrated on FIG. 43;

FIG. 45 is a top view of the fastener illustrated in FIG. 43;

FIG. 57 at sub-figures A through C thereof illustrate the edge which may be formed on the points constructed as shown in FIGS. 55 and 56;

FIG. 59 at sub-figures A–C shows a front elevational view and a side view of the fastener of FIG. 58 in the process of penetrating a plurality of substrates in accordance with the present invention;

FIG. 60 at sub-figures A–C shows a front elevational view and a side view of the fastener of FIG. 58 in the process of penetrating a different plurality of substrates in accordance with the present invention;

FIG. 61 at sub-figures A–C shows a front elevational view and a side view of the fastener of FIG. 58 in the process of penetrating another plurality of substrates in accordance with the present invention;

FIG. 63 at sub-figures A–B shows a front elevational view and a side view of a tine for use in the fastener of the present invention;

FIG. 64 at sub-figures A–B shows two side views illustrating the clamping force exhibited by a fastener of the present invention;

FIG. 65 at sub-figures A–C shows a front elevational view and a side view of the fastener of FIG. 58 in the process of penetrating a still different plurality of substrates in accordance with the present invention;

FIG. 66 at sub-figures A–E shows a front elevational view and a side view of a fastener for use in accordance with the present invention;

FIG. 67 at sub-figures A–F shows a front elevational view and a side view of a fastener of the present invention in the process of penetrating a plurality of substrates in accordance with the present invention;

FIG. 68 at sub-figures A–C shows a front elevational view and a top view of a fastener of the present invention;

FIG. 70 at sub-figures A–D shows a side view of the fastener of FIG. 69 in the process of piercing a plurality of substrates in accordance with the present invention;

FIG. 71 at sub-figures A–I shows a front elevational view of a tine for use with a modified fastener of the present invention;

FIG. 76 at sub-figures A–H shows a side view of a fastener of the present invention in the process of fastening a plurality of substrates in accordance with the present invention and side views of the pierced opening produced by conventional fasteners in the same application;

FIG. 77 at sub-figures A–D shows a side view of a fastener of the present invention in the process of fastening a plurality of substrates and a top view of the generated pierced opening in accordance with the present invention and a side view of a conventional threaded piercing fastener and a top view of the pierced opening produced by the conventional threaded piercing fastener in the same application;

FIG. 79 at sub-figures A–F shows in front and side elevational views three different fastener embodiments of the present invention;

FIG. 81 at sub-figures A–C shows in front and side elevational views a fastener with a coined nose constructed in accordance with the principles of the present invention;

FIG. 84 is a side view of a different tine configuration for use in the fastener of the present invention;

FIG. 85 shows at sub-figures A–G in front and side elevational views various driving stop embodiments for use with a fastener of the present invention;

FIG. 86 shows a front elevational view of a fastener of the present invention;

DETAILED DESCRIPTION OF THE PREFERRED EMBODIMENTS

Figures 5A, 5B:
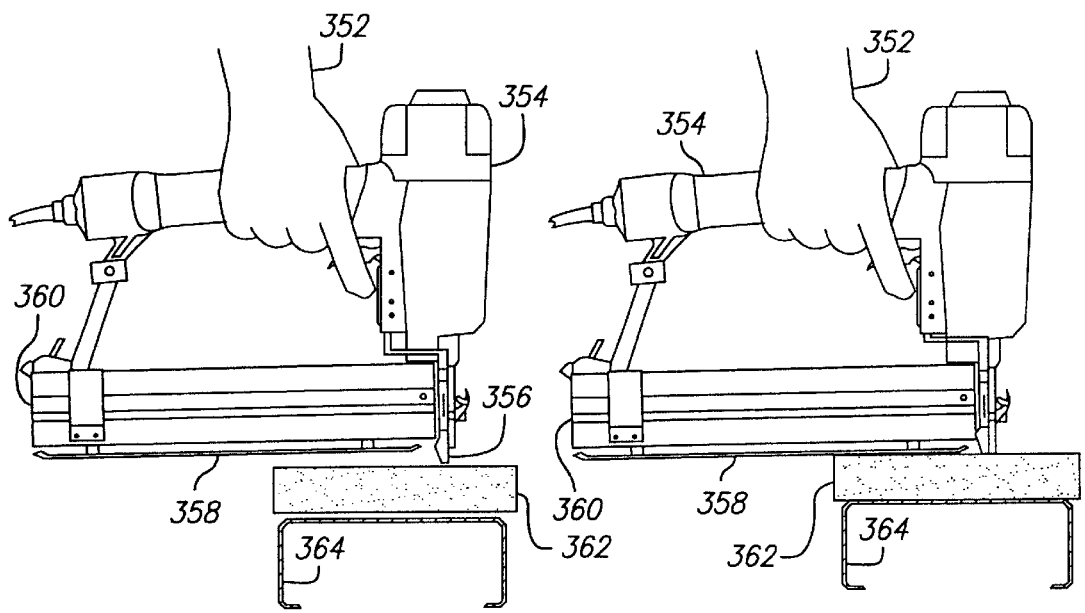
FIG. 5 at sub-figures A–C shows a front elevational view of a power tool for use with the fastener of the present invention.

Hereinafter, some preferred embodiments of the present invention will be described in detail with reference to the related drawings of FIGS. 1–90. Additional embodiments, features and/or advantages of the invention will become apparent from the ensuing description or may be learned by the practice of the invention.

In the figures, the drawings are not to scale and reference numerals indicate the various features of the invention, like numerals referring to like features throughout both the drawings and the description.

The following description includes the best mode presently contemplated for carrying out the invention. This description is not to be taken in a limiting sense, but is made merely for the purpose of describing the general principles of the invention.

The foregoing and other disadvantages of prior art fasteners are overcome with the fastener of the present invention. Specifically, the fastener of the present invention is a self-piercing fastener fabricated from a single sheet thickness of flat metal capable of having portions rendered resilient, is propelled through the work pieces by a power actuated tool specifically modified to accommodate the fastener. Using the inventive fastener to fasten a plurality of work pieces requires little training and can be rapidly accomplished in a non-fatiguing manner. The installer places the tool in a vertical orientation to the work piece and then pushes the tool's safety nosepiece device against the work piece, activates the power tool trigger and the novel fastener automatically penetrates, grips, and clamps all work pieces within two seconds. Once the appropriate air pressure setting is determined and the installation tool adjusted accordingly, each subsequent installation firing of the tool, if made into similar substrates and base materials, will provide a fastener set similar to the first one. The fastener can be formed from very thin, hardened material, thereby producing a low profile mass which is highly desirable for penetration of subject materials.

When the inventive fastener is propelled via high velocity impact tools, it is capable of effectively penetrating thin metal materials with an insignificant occurrence of "oil canning". Due to the fastener's metal properties and unique design, resilient protruding gripping and clamping elements can be formed from its body material. These elements are termed "tines". Resiliency of the tine is needed to allow it to be deflected into a void either within the body of the fastener or within one created elsewhere by the fastener penetration process. The deflection process is invoked by a cam surface on that part of the tine, which will first contact the substrate or edges of the opening pieced by the fastener point. The process of deflecting the tine and its protruding gripping and clamping elements to this void, ensures that there will be no enlargement of the pierced (by the fastener point) opening or unnecessary removal of any additional metal substrate other than the amount of material removed by the fastener point in generating the pierced opening. After passing through the metal substrate the tine is no longer restrained and immediately attempts to spring back to its original position. In doing so, it moves away from the fastener body and underneath the base material being fastened. In the case of "barbed" or "louvered" tines, the top surfaces of the louvers engage the underside of the base material. As the tine has still not reached its preset position, the tine is always providing adequate lateral forces to ensure that the tine or its protruding gripping and clamping elements stay firmly engaged under the base material.

The protruding gripping and clamping elements are opposed by at least one or possibly two spring loaded members which can be the fastener crown and/or the fastener body driving "stops", also known as "side stays", which provide the spring back force acting against the protruding gripping and clamping elements to thereby effectively secure the work pieces together.

In accordance with a preferred embodiment of the present invention, a metal piercing fastener, generally referred by a reference numeral 300, is disclosed for securing at least one metal layer to one or more metal/non-metal layers and retaining the secured layers in their positions permanently under adverse conditions (FIG. 1). The metal layer(s) may be galvanized steel substrate sheet metal layers with gauges 16 GA (0.0598"), 18 GA (0.0478"), 19 GA (0.0418"), 20 GA (0.0359"), 22 GA (0.0299"), 25 GA (0.0209"), 28 GA (0.0149") and 30 GA (0.0120"). Fastener 300 may be used, for example, to secure gypsum drywall board to metal studs, plywood to metal studs, cement fiberboard to metal studs or any other non-metal material to a metal material. In general, the preferred use of fastener 300 is in fastening light gauge sheet metal (LGSM) layers ranging from 14 GA–30 GA. Fastener 300 may also be used with metals of different gauges or even to fasten low density materials such as wood to wood.

Fastener 300 can be fabricated from a single piece of strip steel having a single axis with the strip steel capable of being rendered resilient. The sheet metal is preferably carbon spring steel such as ASTM C1045 to C1085 or a fully hardened spring stainless steel such as 300 or 400 series stainless steel. In either instance, the metal is capable of being rendered resilient which is needed to securely fasten the work pieces together.

As shown in FIGS. 1A–1B, fastener 300 includes a generally elongated metal body 302 having a longitudinal axis 301, a crown portion 304 at one end for receiving the force of impact from an appropriately configured tool used for driving fastener 300 through the work pieces and a spade-type tip or point portion 306 sharpened at the end for layer penetration. Crown 304 is preferably disposed at an acute angle to longitudinal body axis 301 passing through an elongated portion 303 of body 302 and includes an aperture 312 to allow for part indexing during manufacturing and can be used to allow, for example, drywall plaster to bond to the top substrate in the area under crown 304. For the purposes of the present invention, a crown-to-body bend angle referred to hereinbelow is to be understood to be the angle measured between the bottom surface of the crown and the longitudinal body axis.

Elongated body portion 303 may be provided with a 'coined' pattern 336 (FIG. 1A) along its entire length to increase its rigidity and stability. When fully seated against a LGSM layer a slight upward taper (about less than 1 degree) due to the coining process serves to optimize the vertical stability of fastener 300. Coining is a fabrication term meaning to compress the metal in a certain manner. Crown 304 is formed by bending the upper portion of elongated body portion 303 forward (FIG. 1A) and may be provided with a pair of gussets 332, 334 to prevent undesirable 'spring back' of crown 304 when it is forced against the top work piece substrate. Crown 304 may be shaped (e.g. rectangular with or without radiused corners, oval, square, etc.) or bent relative to elongated body portion 303 in a variety of ways and aperture 312 may be circular or of any other configuration suitable for practicing the present invention.

Tip 306 is preferably equipped on each side with scalloped or serrated cutting edges 308, 310, respectively, having beveled surfaces adapted for easily piercing the work pieces (metal and non-metal) that need to be fastened. Top surface 330 of tip 306 is preferably concave to increase rigidity of tip 306 so that tip 306 is sufficiently strong to pierce a 16 GA LGSM substrate with little or not "tip curl". The concave shape of top surface 330 is formed through 'coining' to ensure that tip 306 will cut or slice through a metal substrate without causing crushing or excessive dimpling of the top surface of the substrate.

Figure 7:
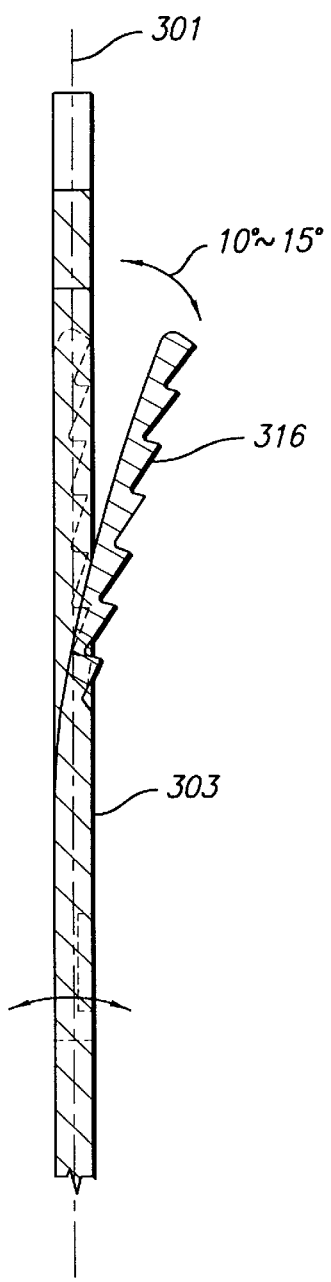
FIG. 7 is a side view of a tine for use in the fastener of the present invention.

Elongated body portion 303 is preferably provided somewhat centrally with a void 314 for accommodating a generally resilient tine 316 formed as an integral part of body 302. The width of void 314 is preferably somewhat larger than the width of tine 316 in accordance with the general principles of the present invention. Tine 316 can be stamped thinner than body portion 303 and twisted to a certain extent at its base 317 around its longitudinal axis (not shown) to ensure resiliency for tine 316. Resilient tine 316 is also generally elevated in a vertical plane intersecting body axis 301 at an acute angle (about 10–15 degrees, see also FIG. 7) relative to body axis 301 so as to protrude out of void 314 facing the underside of crown 304 as shown in FIGS. 1A–1B. Tine 316 is provided on each side with a plurality of protruding gripping and clamping elements such as, for example, protruding gripping and clamping elements 318, 320, 322, 324, etc. to enhance the gripping and clamping action of fastener 300 after layer penetration. The location of each protruding gripping and clamping element and the spacing between protruding gripping and clamping elements is designed to accommodate different grip range requirements. The bottom (facing toward tip 306) surface of each protruding gripping and clamping element is shaped, i.e. cut at a radius so as to allow it to "cam" over the sharp top edge of a pierced (by tip 306) slot/opening. The top (facing toward the underside of crown 304) surface of each protruding gripping and clamping element is shaped to allow it to function as a leaf spring. During penetration of the work pieces, tine 316 is deflected (unwound) backwards, i.e. towards axis 301. The "caming" action of the bottom surfaces of the protruding gripping and clamping elements allows tine 316 to easily penetrate through an LGSM layer. When portions of the protruding gripping and clamping elements on tine 316 are no longer constrained by the LGSM layer, tine 316 tends to return (re-winds) to its preset elevated orientation in which case the top surfaces of the protruding gripping and clamping elements are rotated outwardly (away from axis 301). At the end of the piercing process, tine 316 is disposed approximately parallel to axis 301 pressing against the inner surface of the work piece slit (pierced by tip 306), i.e. acting as a spring to fully grip and clamp body 302 of fastener 300 via its gripping and clamping protruding gripping and clamping elements inside the work pieces being fastened.

Fastener 300 is also preferably provided in its upper (near crown 304) portion with a pair of stiffeners 326, 328 on each side of elongated body 303, respectively. Stiffeners 326, 328 lend a considerable degree of strength to the upper portion of elongated body 303 and transfer most of the impact forces along axis 301 away from crown 304. Each stiffener is formed by bending a portion of elongated body 303 sideways approximately 90 degrees whereby stiffener 326 is oriented opposite from the orientation of stiffener 328 with the angles of bending/orientation being approximately equal and opposite in direction as shown in FIG. 1. Furthermore, the oppositely oriented stiffeners serve to restrict fastener 300 from leaning or rocking backwards or forwards with the length of each stiffener designed to allow for precise control or countersinking of crown 304 into the top work piece substrate.

FIG. 2 depicts fastener 300 in three stages (FIGS. 2A–2C) of penetrating a work piece made up of a top gypsum drywall board 340 loosely set against a 25 GA interior galvanized non-load bearing LGSM stud 342. Tine 316 is coupled at its base to elongated body 303 and is preset or twisted at the base around its longitudinal axis (not shown) and elevated in a vertical plane intersecting body axis 301 at an acute angle (about 10–15 degrees, see also FIG. 7) relative to body axis 301 to ensure resiliency of tine 316. As shown in FIGS. 2B–2C, fastener 300 penetrates and exits drywall board 340 without causing excessive 'spalling' of its back surface, yet easily slicing LGSM stud 342 to provide a firm bond between the two layers.

FIG. 3 depicts fastener 300 in three stages (FIGS. 3A–3C) of penetrating a work piece made up of a top (approximately ⁷⁄₁₆" thick) exterior wood grain plank style embossed cement fiberboard substrate 344 loosely set against a 16 GA exterior galvanized load bearing LGSM stud 346. Substrate 344 is a composite material of Portland Cement and cellulose without a top paper laminate providing a denser (than the gypsum board in FIG. 2) top surface layer. In this particular configuration, crown 304 is bent at an acute angle relative to elongated body portion 303, with most of its inner area removed except for an inverted 'V' (not shown in FIG. 3A), rectangular frame around its outer edges, to allow optimal countersinking and pull over resistance required for this type of relatively dense material. FIG. 3B shows fastener 300 pulling cement fiberboard substrate 344 forward as it penetrates LGSM stud 346. FIG. 3C shows fastener 300 in a fully clamped mode with its crown 304 seated almost flush with the top surface of dense cement fiberboard substrate 344.

FIG. 4 depicts fastener 300 in three stages (FIGS. 4A–4C) of penetrating a work piece made up of a top (approximately ½" thick) exterior plywood shear panel 348 loosely set against a 16 GA exterior galvanized load bearing LGSM stud 350. FIG. 4B shows fastener 300 pulling panel 348 forward as it penetrates LGSM stud 350. FIG. 4C shows fastener 300 in a fully clamped mode with its crown 304 seated almost flush with the top surface of plywood panel 348, both layers securely fastened.

Figure 5C:
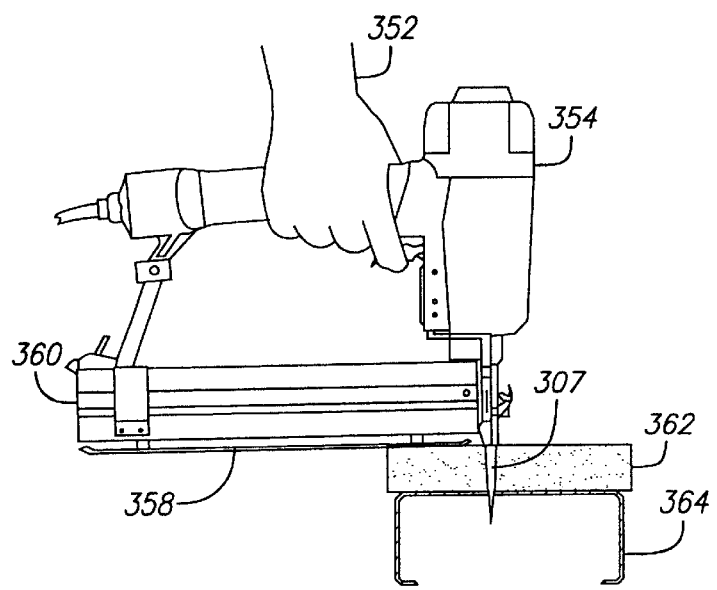

FIG. 5 depicts in three stages (FIGS. 5A–5C) an installer 352 positioning a power tool 354 over an area 356 where the fastener of the invention is to be driven. Of special significance is the power tool's urethane protective guard 358 attached to its nozzle and a urethane coated support and vertical alignment stand to ensure proper trajectory orientation of the tool to the work piece and to allow the installer to slide the tool over the work piece's top surface without marring or scratching the same. The fasteners of the present invention are packaged together in a so-called 'collated stick' configuration (shown in FIG. 6, described hereinbelow) which is loaded into a rear-loading magazine 360. A pusher spring (not shown) within magazine 360 and positioned behind the 'stick' of novel fasteners advances the fasteners into the 'ready position' for firing into the work pieces to be fastened which in this configuration, as shown in FIGS. 5A–5C, are gypsum drywall board 362 and LGSM stud 364. Power tool 354 is preferably designed to fire in a sequential mode. In order for the trigger to be enabled, the power tool's nosepiece must be depressed against the work piece until a compression spring is collapsed. This setup ensures correct compression of all substrates to the bottom LGSM substrate. FIG. 5C shows a fastener 307 of the type described hereinabove in a fully installed state fastening firmly the two layers. As further shown in FIGS. 5A–5C, total elapsed time for the entire operation is about 1.6 seconds which is a significant improvement over prior art fastening methods described heretofore.

Figure 6:
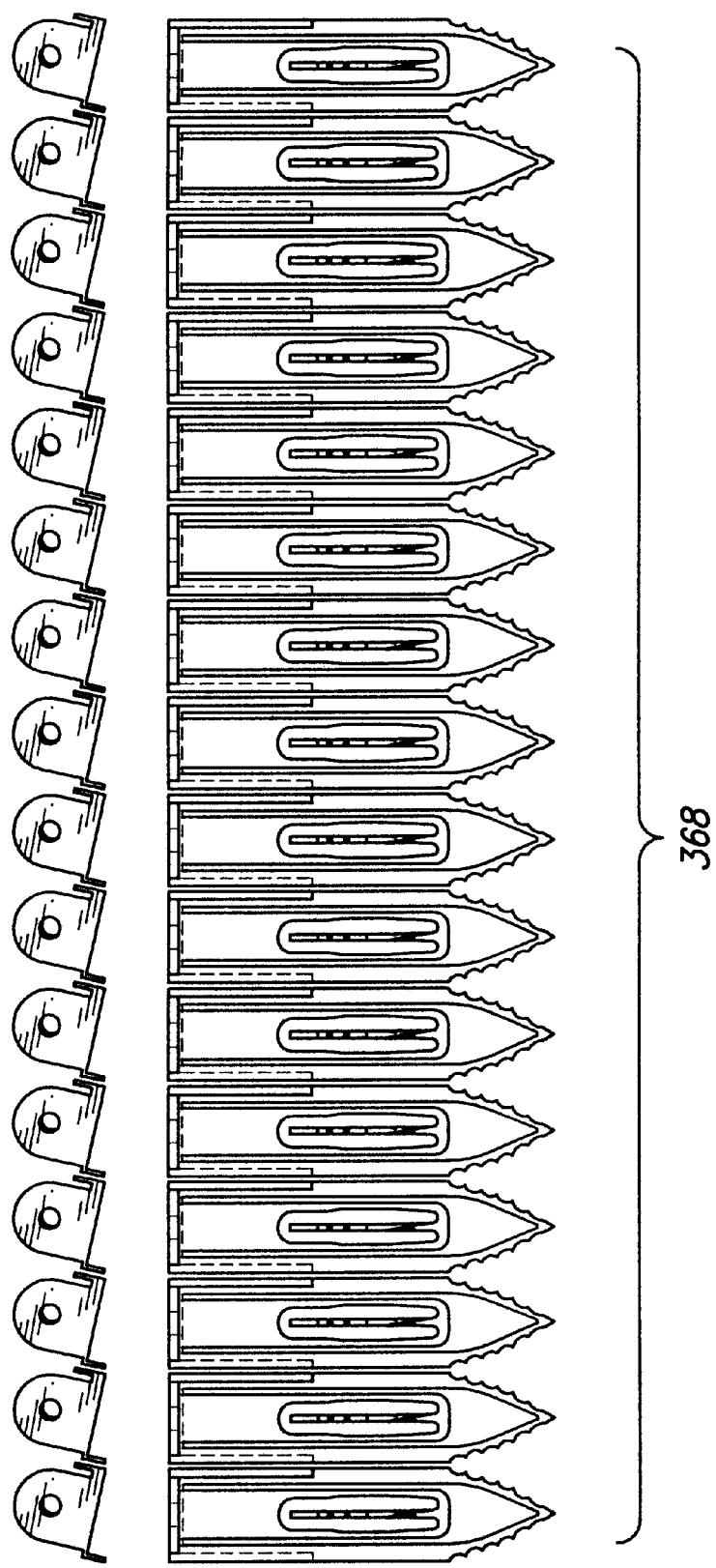
FIG. 6 shows a front elevational view of a collated stick of fasteners prepared for use with the power tool of FIG. 5.

FIG. 6 depicts a plurality of fasteners 368 in a 'collated stick' configuration in accordance with the present invention. Fasteners 368 are preferably bonded together side by side using an elastomeric styrene polymer bonding agent. The collated stick has been found to demonstrate shear values which ensure its integrity during shipping and loading into a power tool of the type shown in FIG. 5, yet exhibits low shear to allow fastener separation during operation of the power tool.

Figure 8A:
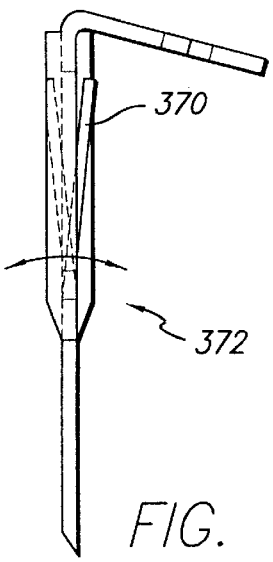
FIG. 8 at sub-figures A–C shows a side view of a different tine configuration for use in the fastener of the present invention.
Figure 8B:
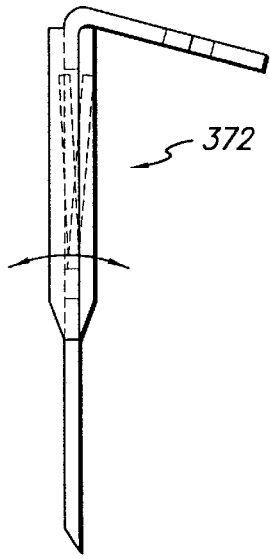
Figure 8C:
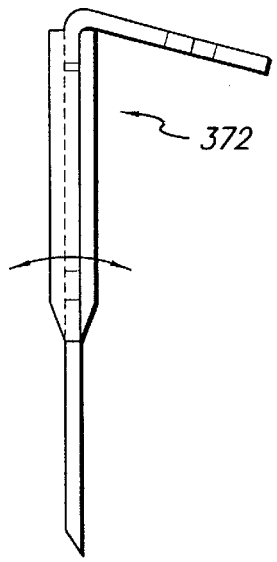

FIG. 8 illustrates an alternative tine configuration which may be used to practice the present invention. Specifically, a smooth surfaced resilient tine 370 of a fastener 372 is shown without the protruding gripping and clamping elements of FIG. 1. As shown in FIGS. 8B–8C, tine 370 may deflect either in forward or backward direction during substrate penetration depending on which side tine 370 was originally oriented.

Figure 9:
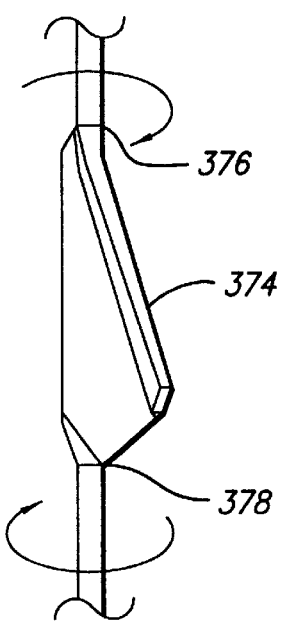
FIG. 9 is a side view of another tine configuration for use in the fastener of the present invention.

FIG. 9 illustrates another alternative tine configuration, i.e. a smooth edged tine 374 sloping in a generally downward (toward the fastener tip—not shown) direction. Tine 374 is attached to or is formed integrally with its fastener's body at the top and bottom ends 376, 378, respectively, with the two ends (376, 378) acting as torsion bar springs which rotate when tine 374 is deflected during substrate penetration. When top and bottom ends 376, 378 are not constrained, top and bottom ends 376, 378 tend to spring back to their original preset orientation. Each end rotates in an opposite direction as shown in FIG. 9. This type of configuration grips and clamps substrates at any appropriate point along its downward sloping edge and thus may be used to fasten work pieces which exhibit significant variations in substrate thickness. Alternatively, a pair of tines of this type may be positioned in an opposing configuration to allow them to grip and clamp against each other (not shown).

Figure 10:
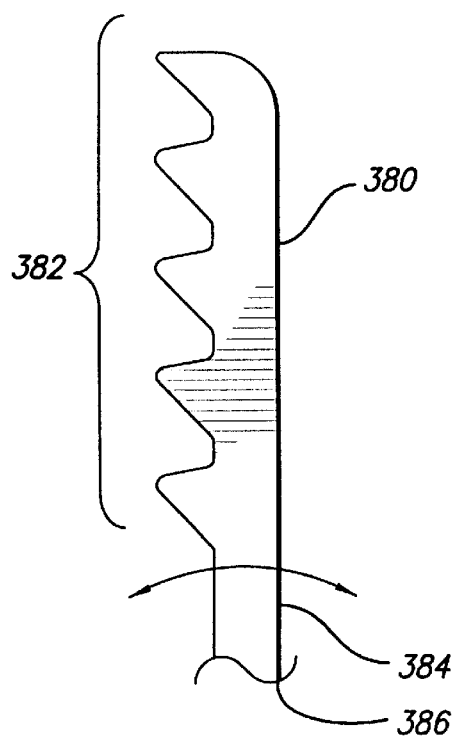
FIG. 10 is a side view of yet another tine configuration for use in the fastener of the present invention.

FIG. 10 shows a resilient tine 380 having relatively sharp protruding gripping and clamping elements, i.e. barbs 382 facing in one direction or in one set. Tine 380 has a resilient deflecting base end 384 attached or formed integrally (hereinafter attached for connection) at a single point 386 to the fastener's body (partially shown). This type of tine configuration is suitable for fastening LGSM layer(s) to non-deciduous soft wood substrates or other similar types of materials which are fibrous, yet not too dense or hard. An example would be Douglas Fir in either cut piece stock or in plywood form.

Figure 11:
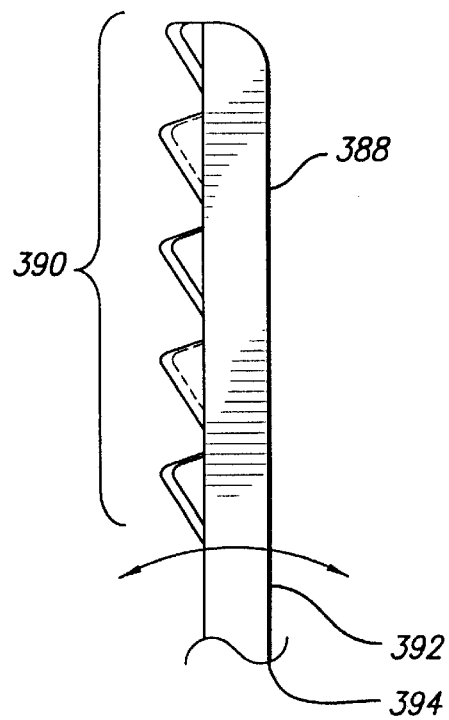
FIG. 11 is a side view of still another tine configuration for use in the fastener of the present invention.

FIG. 11 depicts a resilient tine 388 with relatively sharp protruding gripping and clamping elements or barbs 390 fabricated in an alternating 'offset' manner. Tine 388 has a resilient deflecting base end 392 attached at a single point 394 to the fastener's body (partially shown). This type of configuration is suitable for fastening LGSM layer(s) to deciduous hardwood substrates or others similar types of materials which are fibrous, tough and exhibit relatively high natural oil content.

Figure 12:
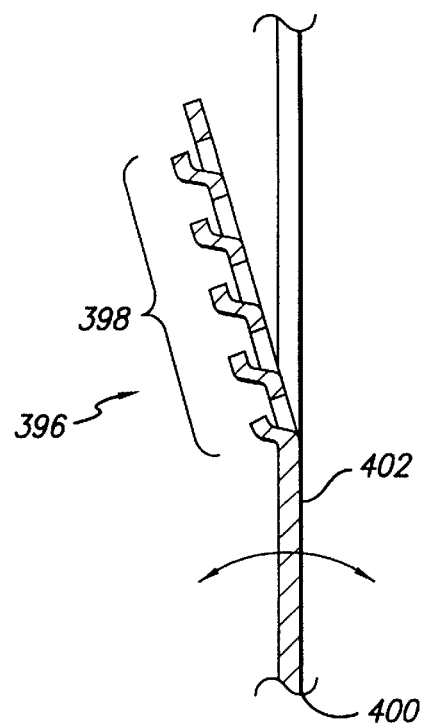
FIG. 12 is a side view of a different tine configuration for use in the fastener of the present invention.

FIG. 12 depicts a resilient tine 396 with louver-shaped protruding gripping and clamping elements 398 fabricated using a blanking and drawing-down process. This type of fabrication provides longer die life, yet requires wider metal widths. Tine 396 has a resilient deflecting base end 400 attached to a fastener body 402 and is thus capable of deflection in two opposing directions (FIG. 12).

Figure 13:
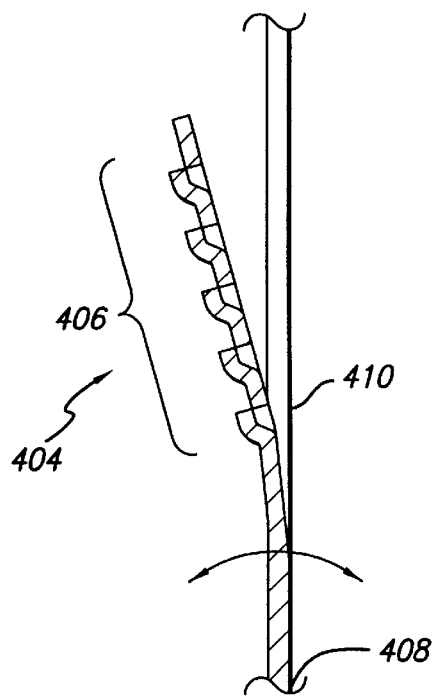
FIG. 13 is a side view of still different tine configuration for use in the fastener of the present invention.

FIG. 13 depicts an alternative resilient tine 404 with louver-shaped protruding gripping and clamping elements 406 fabricated using a lance piercing and drawing-down process. This type of fabrication allows use of smaller metal widths, however, die life is shorter. Tine 404 has a resilient deflection base end 408 which serves as the connection point to a fastener body 402 and is thus capable of deflection in two opposing directions (FIG. 13).

Figure 14:
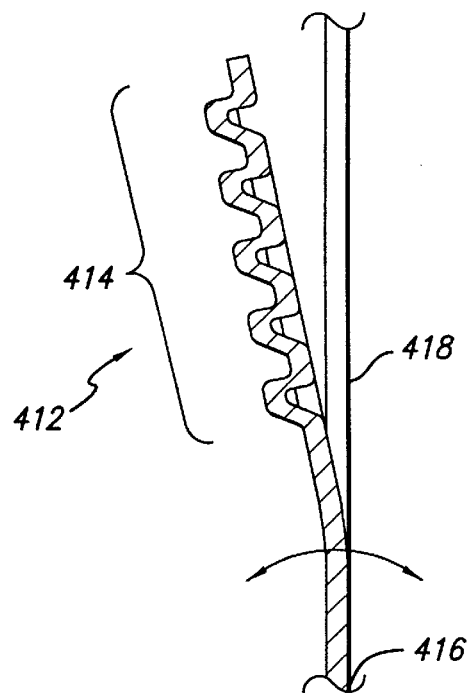
FIG. 14 is a side view of another still different tine configuration for use in the fastener of the present invention.

FIG. 14 depicts another alternative resilient tine 412 with louver-shaped protruding gripping and clamping elements 414 fabricated using a swaging die. This type of fabrication is used when base metals have relatively higher ductility. Tine 412 has a resilient deflection base end 416 which serves as the connection point to a fastener body 418 and is thus capable of deflection in two opposing directions (FIG. 14).

Figure 15:
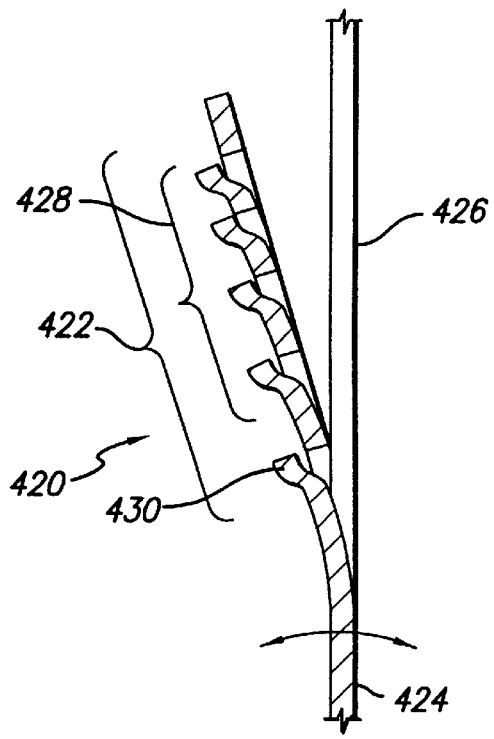
FIG. 15 is a side view of an alternative tine configuration for use in the fastener of the present invention.

FIG. 15 depicts yet another alternative resilient tine 420 with louver-shaped protruding gripping and clamping elements 422. In this setup, several upper louver-shaped protruding gripping and clamping elements 428 and a bottom louver-shaped protruding gripping and clamping element 430 are set at different spaced intervals to allow one fastener of this type to be used in different fastening operations. Tine 420 has a resilient deflection base end 424 which serves as the connection point to a fastener body 426 and is thus capable of deflection in two opposing directions (FIG. 15).

Figure 16:
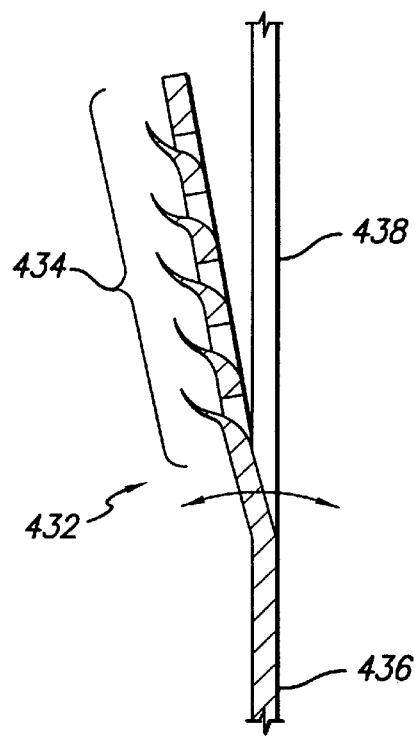
FIG. 16 is a side view of another alternative tine configuration for use in the fastener of the present invention.

FIG. 16 depicts a resilient tine 432 with louver-shaped protruding gripping and clamping elements 434 fabricated using a modified lance piercing and drawing-down process to produce a relatively thin, elongated and quite flexible louver-shaped protruding gripping and clamping elements. Tine 432 has a resilient deflection base end 436 which serves as the connection point to a fastener body 438 and is thus capable of deflection in two opposing directions (FIG. 16). This configuration may be used when both the tine's connection point to the fastener body and each of the individual protruding gripping and clamping elements must be very resilient.

Figure 17:
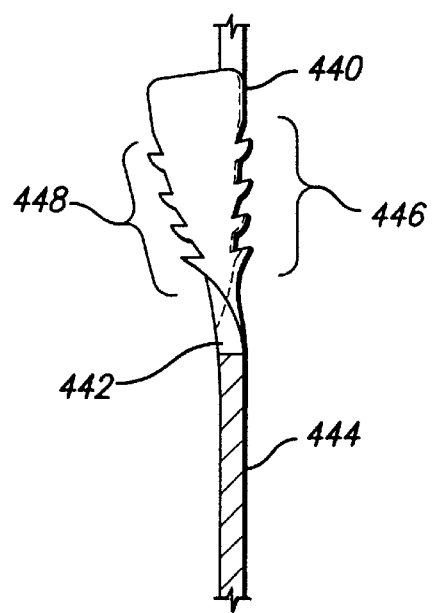
FIG. 17 is a side view of a tine configuration similar to the tine configuration of FIG. 1 for use in the fastener of the present invention.

FIG. 17 illustrates a resilient tine 440 which has been found to be most effective when fastening into a LGSM which is similar in shape to tine 300 depicted in FIG. 1. Tine 440 is usually attached at its base 442 (but can be also attached at its top end or at both ends) to a fastener body 444. Tine 440 is preset or twisted at base 442 around its longitudinal axis (not shown) in a 'right-handed' or 'left-handed' configuration. Most of the time, resilient tine 440 is configured on each side with 'leaf spring' type protruding gripping and clamping elements 446, 448, respectively, which allow improved LGSM gripping and clamping capability. Tine 440 is forced to unwind when passing through a pierced slot in the LGSM layer but immediately recoils when no longer constrained by the LGSM layer. During recoil, some of the protruding gripping and clamping elements are rotated under the LGSM layer. Since the protruding gripping and clamping elements are resilient, the protruding gripping and clamping elements push upwards (much as a leaf spring does) to attain their preset position.

Figure 18:
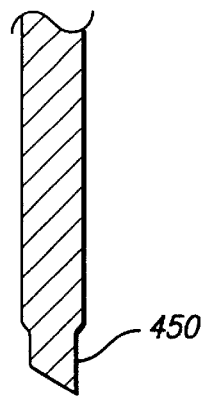
FIG. 18 is a side view of a hardened tip of a fastener of the present invention.

FIG. 18 depicts a 'coined' (embossed or hardened) tip or point 450 for use with a fastener of the present invention. A hardened tip of this kind would ensure significantly improved (compared to prior art methods) penetration of LGSM layer(s) as described hereinabove.

Figure 19A:
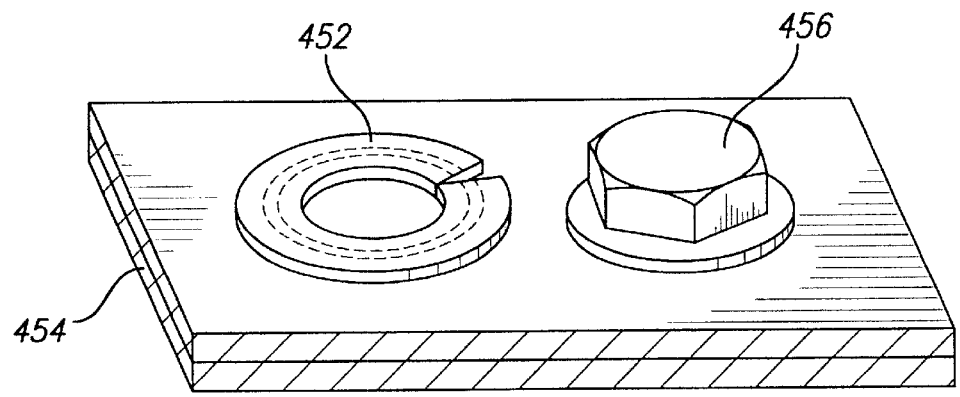
FIG. 19 at sub-figures A–B is a perspective view and a side view of a crown of a fastener of the present invention and a conventional hex-washer head seated in a plurality of substrates.
Figure 19B:
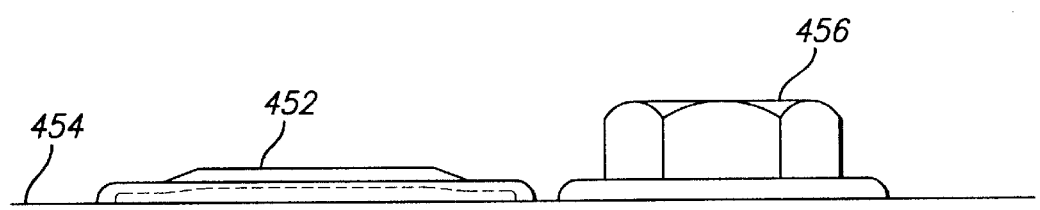

FIG. 19 illustrates a significantly lower profile crown 452 of a fastener (not shown) of the present invention seated in a plurality of substrate materials 454 as compared to a conventional high profile hex-washer head 456 also seated in plurality of substrate materials 454.

Figure 20A:
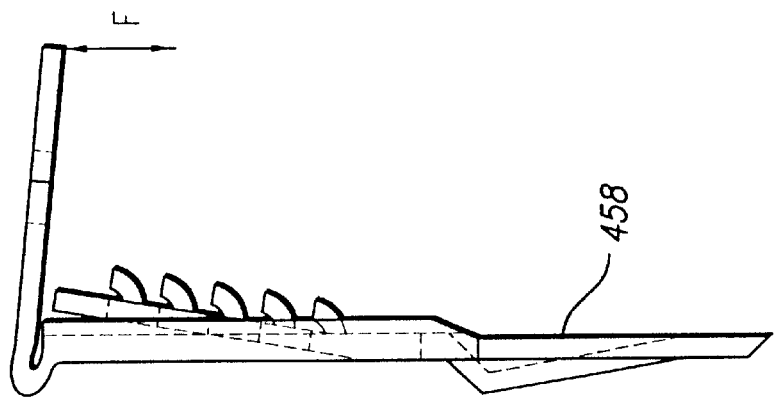
FIG. 20 at sub-figures A–C shows a side view of various crown-to-body angle configurations for a fastener of the present invention.
Figure 20B:
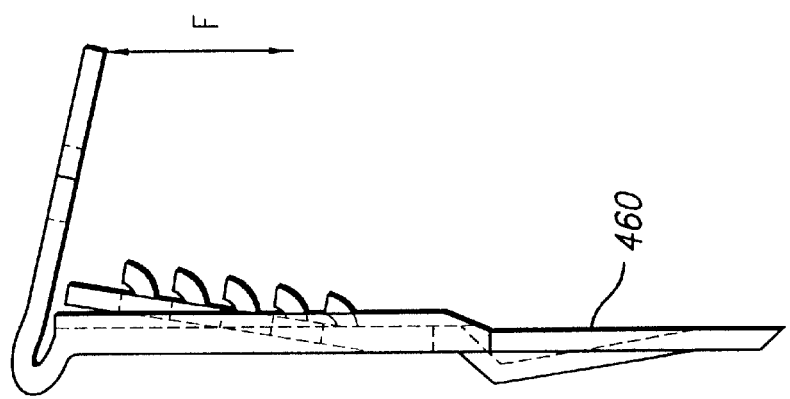
Figure 20C:
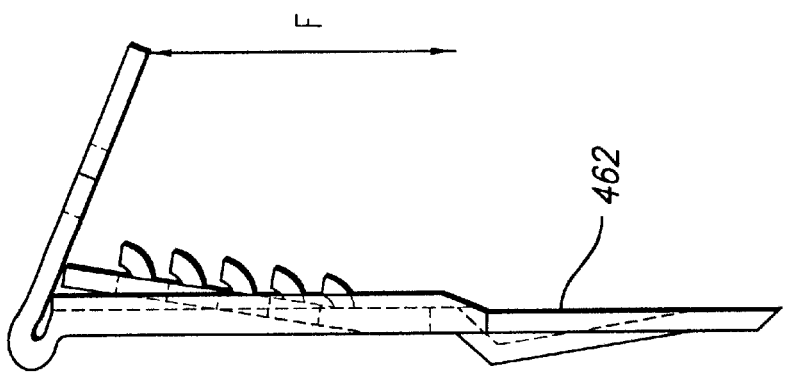
Figure 27:
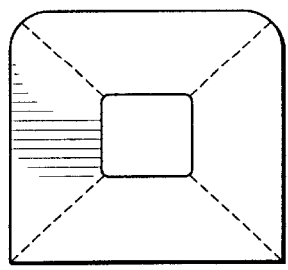
FIG. 27 is a top view of the fastener illustrated in FIG. 25.

FIG. 20 illustrates three different crown-to-body angle configurations whereby "f" stands for the clamping force exhibited by a fastener 458, 460 and 462, respectively. Specifically, as shown in FIG. 20, as the crown-to-body angle decreases (becomes more acute), the clamping force "f" increases. The varying acute angle between the crown and body as illustrated here may be incorporated in the fastener configurations described and illustrated herein above depending on the particular application.

In accordance with another preferred embodiment of the present invention and as shown particularly in reference to FIGS. 21–23, there is illustrated a fastener, shown generally by reference numeral 10, which can be fabricated from a single piece of sheet metal having a single axis with the sheet metal capable of being rendered resilient. The sheet metal is preferably carbon spring steel such as 1045 to 1085 or a fully hardened spring stainless steel such as 300 or 400 series stainless steel. In either instance, the metal is capable of being rendered resilient which is useful in the locking operation of the fastener in securing the work pieces together. Fastener 10 includes a body 12 having a first end 14 and a second end 16. Disposed at the first end 14 of the body 12 is a crown 18 which receives the force of the impact from an appropriate tool used to drive the fastener through the work pieces. The crown 18 is disposed at an angle of less than 90 degrees with respect to the body 12 as shown by the arrow 20. The exact angle 20 may vary depending upon the application for which the fastener is being used. Generally, the angle should be preferably between 60 and 85 degrees. The purpose of the crown being angularly disposed as discussed is that when the fastener is driven through the work pieces and is locked in position as will be described hereinafter the crown 18 flattens, that is, it assumes a substantially 90-degree position with regard to the body 12 and since the metal from which the fastener is formed is capable of being rendered resilient, a spring load is applied by the crown engaging the top of the work piece and induces a significant pullback force which forcefully seats the locking portion of the fastener against the metal substrate.

The opposite end 16 of the body 12 is formed in such a manner as to be able to easily pierce and penetrate the work pieces including the metal substrate. As illustrated in FIG. 21, there is provided a spade type point 22 having a single bevel edge 24. Guillotine points are provided at 26 and 28 on the end 16. Through the utilization of these cutting surfaces and points on the end 16, the fastener is easily driven through the work pieces including the metal substrate and will punch a pre-determined size waste slug from the metal substrate. Typically, the metal substrate will be hot-dipped, galvanized-coated, hot-rolled or cold-rolled mild steel sheets having metal gauge thicknesses ranging from 28 gauge to 14 gauge or alternatively it may be multiple combinations of such sheet metal whose total thickness does not exceed 0.0780 inches. Extending upwardly from the end 16 and formed as an integral part of the body 12 are a pair of tines 30 and 32. Tine 30 has a plurality of protruding gripping and clamping elements 34 through 42 extending outwardly therefrom. The tine 32 also has a plurality of protruding gripping and clamping elements 44 through 52 extending outwardly therefrom. It should be noted that each of the protruding gripping and clamping elements 34 through 52 includes a slanted lower surface, for example, as shown at 54 on protruding gripping and clamping element 42. This lower surface affords a camming function against the opening generated by the cutting portion of the end 16 in the metal substrate. That is, as can be seen, the metal will be cut leaving an opening which has the same width as the width of the end 16 between the outer edges 56 and 58. As the fastener continues to protrude through the metal substrate, the end of that opening will contact the lower portion of the camming surface 54 causing the tine 30 to rotate inwardly toward the longitudinal axis 60 of body 12. As indicated above, each of the protruding gripping and clamping elements 34 through 52 are formed to provide this camming surface. On the opposite side of each of the protruding gripping and clamping elements 34 through 52, there is provided a second surface as illustrated at 62 with respect to the protruding gripping and clamping element 42 which has an angle which is substantially less with respect to the longitudinal axis 60 than is the surface 54. The surface 62 on each of the protruding gripping and clamping elements 34 through 52 provides a locking function for the fastener with respect to the work pieces.

Clearance slots 64 and 66 are provided between the tines 30 and 32, respectively, and the body 12 of the fastener. The clearance slots 64 and 66 provide room for the tines 30 and 32 to move inwardly toward the longitudinal axis 60 as the protruding gripping and clamping elements 42 through 52 have their camming surfaces 54 come into engagement with the ends of the opening which has been provided in the metal substrate by the end 16 cutting through the metal and generating the waste slug as above described. Since the material from which the fastener 10 is formed is spring steel the tines 30 and 32 are capable of being rendered resilient and will rotate about the spring area generally shown at 68 and 70, respectively. After the fastener has passed through the opening in the metal substrate, the resilient feature of the tines 30 and 32 will cause the tines to be urged outwardly away from the longitudinal axis 60 as viewed in FIG. 1 in such a manner that the surface 62 of the protruding gripping and clamping elements will engage the lower portion of the metal substrate and lock the fastener in position.

It should be noted that the position of the protruding gripping and clamping elements 34 through 42 on the tine 30 are vertically displaced from the protruding gripping and clamping elements 44 through 52 on the tine 32. The vertical displacement is such that the locking surfaces 62 on these protruding gripping and clamping elements are offset one from the other to accommodate variations in material thicknesses which may occur during the manufacture of the metal substrate or the positioning of such metal substrate during a construction project.

The resilient characteristics of the spring steel utilized to form the fastener 10 is usually sufficient to provide the locking feature provided by tines 30 and 32 as above described. However, under certain circumstances, it has been found that an additional spring force may be required. Under such conditions, the body 12 of the fastener 10 may be formed to provide additional spring elements 72 and 74 which are disposed within the slots 64 and 66, respectively. As noted, the additional spring elements 72 and 74 are formed integrally with the body 12 and thus also provide a spring effect because of the resilient characteristics of the metal from which the fastener 10 is formed. It can be seen that as the tines 30 and 32 are urged inwardly toward the longitudinal axis 60 by the force of the opening in the metal substrate against the cam surfaces 54 of the protruding gripping and clamping elements, the inner surface of the tines will engage the spring elements 72 and 74 thus providing an additional spring force urging the tines 30 and 32 to return to their outward positions once the forces applied against the camming surface 54 no longer exist. As above indicated, this additional spring force provided by the elements 72 and 74 is not necessary in all applications but is only appropriate in certain situations. The clearance slots 64 and 66 should be formed to have a sufficient space to provide appropriate movement of the tines 30 and 32 about the spring areas 68 and 70, respectively. The width of the slots 64 and 66 may vary. However, it has been found that the preferred dimension for the clearance slot is approximately 30% of the width of the body 12 from the longitudinal axis 60 to the outer surface such as shown at 56 or 58 of the lower portion of the body.

An additional important feature of the fastener constructed in accordance with the principles of the present invention is that the width of the end 16 of the body 12, that is, between the edges 56 and 58 thereof, is approximately equal to the width of the protruding gripping and clamping elements 34 through 52. It should however be recognized that the cutting tips of the guillotine points 26 and 28 may be angled outwardly away from the longitudinal axis 60 by some amount to provide a slightly larger opening through the metal substrate. It should however be recognized that that opening and thus the width provided by the outer edges of the tips 26 and 28 should not exceed approximately the mean width of the protruding gripping and clamping elements 34 through 52. If the width becomes significantly greater, then the locking feature provided by the surface 62 on the protruding gripping and clamping elements is diminished.

It should be noted that there is a stiffening rib 76 which is provided along the longitudinal axis 60 of the body 12. It should also be noted that the crown 18 is also stiffened by the inward depression 78 provided therein.

The fastener as illustrated in FIGS. 21 through 24 may be utilized for securing multiple work pieces together utilizing the functions of the fastener as above described. This fastener is specifically adapted for attaching any non-metal work piece to a metal substrate. For example, drywall to metal studs, wood to metal studs or cement fibreboard to metal studs are particularly well suited for utilizing the fastener shown in FIGS. 21 through 24.

Figure 28:
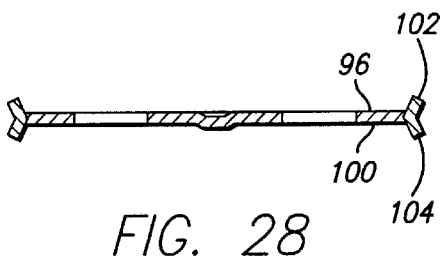
FIG. 28 is a cross-sectional view of the fastener at FIG. 25 taken about the lines A—A thereof.

Referring now more particularly to FIGS. 25 through 28, there is shown an alternative embodiment of a fastener constructed similarly to that illustrated in FIGS. 21 through 24 with the exception that the protruding gripping and clamping elements are formed differently and the added spring elements have been eliminated. The fastener as shown in FIGS. 25 through 28 is particularly adapted for utilization with wood substrate in that the particular orientation of the protruding gripping and clamping elements provide a superior locking function. In specific detail, the fastener 80 includes a body 82 having the first end 84 and second end 86. A crown 88 extends from the first end 84 and functions as above described in conjunction with FIGS. 21 through 24. The opposite end 86 is formed to penetrate the substrate in exactly the same manner as was above described. Tines 90 and 92, which are capable of being rendered resilient, are formed and function to move inwardly as the camming surface on the protruding gripping and clamping elements contacts the opening provided in the substrate by the cutting portion of the end 86. However, it should be noted that the protruding gripping and clamping elements are disposed in a manner that they are offset with every other protruding gripping and clamping element being bent outward in the opposite direction in a manner similar to that which is done with a saw blade. This configuration can best be appreciated by referring to FIGS. 25, 26 and 28. As is illustrated, the first protruding gripping and clamping element 94 is bent in a direction slightly displaced from the plane of the rear surface 96 of the body 82. The next protruding gripping and clamping element 98 is bent in a direction so that it is displaced slightly outwardly from a plane formed by the surface 100 of the body 82. This type of approach with alternate protruding gripping and clamping elements being bent in opposite directions is further illustrated as shown by the protruding gripping and clamping elements 102, 104 and 106 particularly with regard to FIGS. 25 and 26. It should also be recognized and as shown particularly in FIG. 28 that the protruding gripping and clamping elements, although they are bent in opposite directions as they are formed, they are bent only partially in the offset direction but still have a profile which functions to provide the camming operation with the surfaces such as shown at 108 and the locking operation with regard to the surfaces such as shown at 110 and as above described. In FIG. 28, this structure is better illustrated with respect to protruding gripping and clamping elements 102 and 104 illustrating that the protruding gripping and clamping element 102 is bent outwardly from the surface 96 while the protruding gripping and clamping element 104 is bent outwardly from the surface 100.

Figure 29:
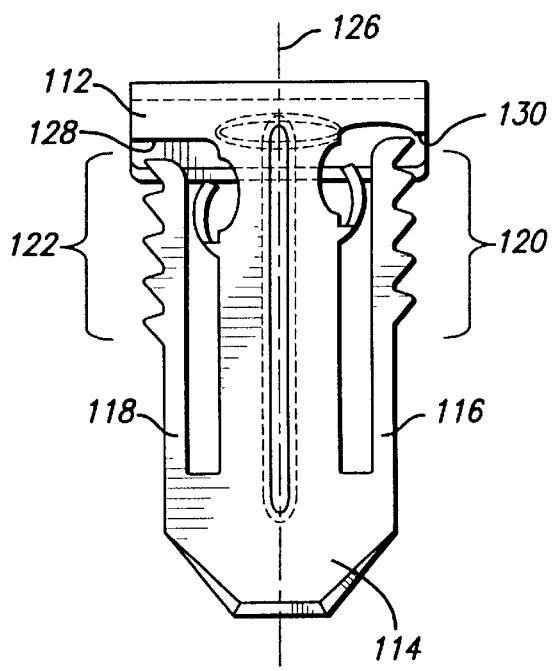
FIG. 29 is a front elevational view of another embodiment of a fastener similar to that shown in FIG. 21.
Figure 30:
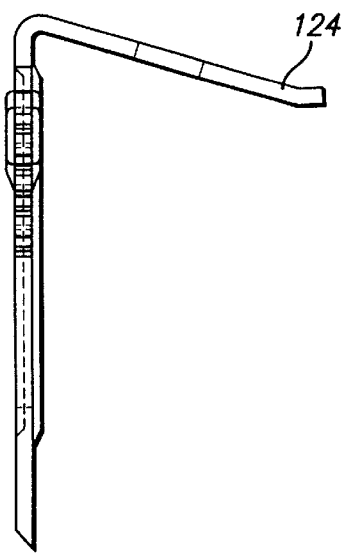
FIG. 30 is a side view of a fastener shown in FIG. 29.
Figure 31:
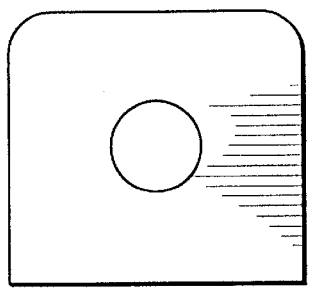
FIG. 31 is a top view of the fastener shown in FIG. 29.

Referring now to FIGS. 29 through 31, there is illustrated a fastener similar to that illustrated in FIGS. 21 through 24 with the exception that the body portion 12 of the fastener has been substantially reduced. As is illustrated, the body portion comprises essentially the cutting end 114 along with the resilient tines 116 and 118 having the plurality of protruding gripping and clamping elements 120 and 122, respectively, which function as described in conjunction with FIGS. 21 through 24. The crown 124 is also disposed angularly with respect to the body 112 for the purposes as above described. One of the major differences of the structure shown in FIGS. 29 through 31 is that the point on the flat stock is a spade point and that the guillotine points have been removed. The fastener as shown in FIGS. 29 through 31 is particularly suited for fastening a metal work piece to a metal substrate for any type of application. Such applications would include erecting studs and affixing them to the channels in high-rise commercial office build out, attaching metal straps to airconditioning ducts and the like. In any event, the fastener functions in precisely the same manner as above described. The cutting end 114 penetrates through the metal leaving a very clean and well-defined opening. As the fastener continues to extend through that opening, the camming surfaces on the protruding gripping and clamping elements 120 and 122 cause the tines 116 and 118 to move inwardly toward the longitudinal axis 126 until such a time that the stop surface 128 and 130 contact the work piece. At this point, the resilient tines 116 and 118 will return substantially to the position shown in FIG. 29 to securely fasten the work pieces together.

Referring now more particularly to FIGS. 32 through 35, there is illustrated yet another alternative embodiment of a fastener constructed in accordance with the principles of the present invention. As is illustrated, the fastener shown in FIGS. 32 through 35 is essentially the same as the fastener illustrated in FIGS. 21 through 24 with the exception that this fastener is provided with two legs thus forming two axes for penetrating the workpieces and provide duplicate tines two on each leg thus generating additional fastening capability. As is shown, there is provided first and second legs 132 and 134, each having the cutting ends 136 and 138, respectively. The leg 132 includes the resilient tines 140 and 142 with the protruding gripping and clamping elements 144 and 146 thereon respectively. The two legs 132 and 134 of the fastener are interconnected by a crown 148 which as illustrated is slightly depressed in its center portion 150 so as to provide the spring loaded clamping function as above described with regard to the crown as shown on the single arm or blade fasteners as above described. It should also be noted that the fastener particularly as shown in FIG. 33 has the crown slightly bent and as is illustrated in FIG. 34 is slightly conical in design. This configuration causes the crown when forcibly driven into the work piece to substantially flatten thereby loading the fastener inducing a significant pullback force on the tine protruding gripping and clamping elements 144 and 146 as they exist on each of the legs 132 and 134.

As illustrated particularly in FIG. 33 in the dashed lines 152 and 154 during the construction of the fastener there may be provided a gusset which is disposed between the crown 148 and the legs 134 and 132, respectively, which significantly increases the fastener's mechanical stability during piercing and clamping. The gusset 152 and 154 significantly reduces the number of "miss shots" and/or damaged work pieces.

The fastener constructed in accordance with the principles of the present invention thus far described and illustrated includes single or dual legs which are blade-like and are made from a single strip of spring steel which is progressed through a stamping press in such a manner that approximately 3,200 of the fasteners can be manufactured per minute. These fasteners having the features as above described and in the blade-like form provide superior holding characteristics along with ease of installation far superior to prior art fasteners.

Figure 36:
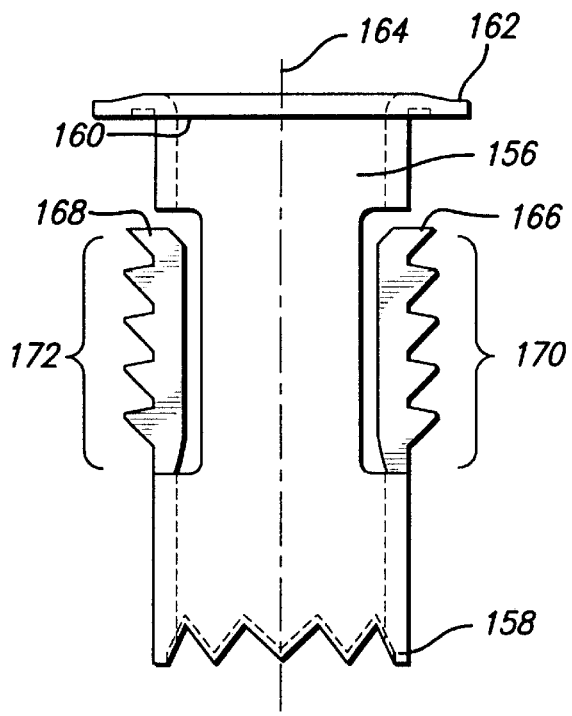
FIG. 36 is a front elevational view of an alternative embodiment of a fastener constructed in accordance with the principles of the present invention with the body of the fastener being in cylindrical form.
Figure 37:
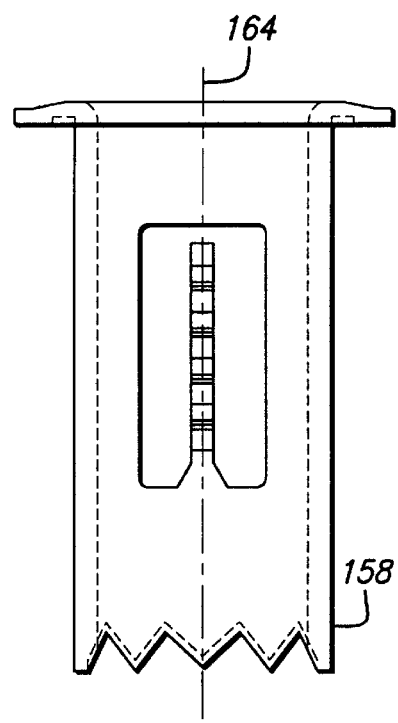
FIG. 37 is a side view of the fastener illustrated in FIG. 36.
Figure 38:
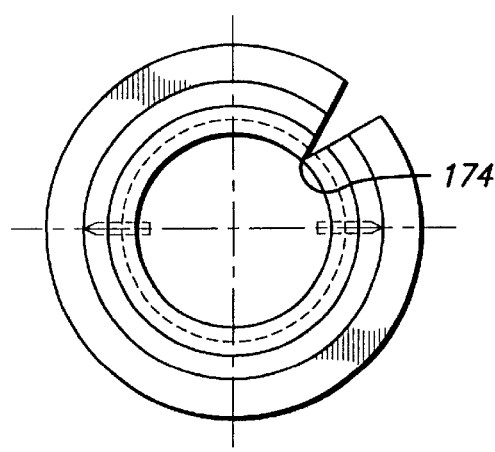
FIG. 38 is a top view of the fastener illustrated in FIG. 36.
Figure 82:
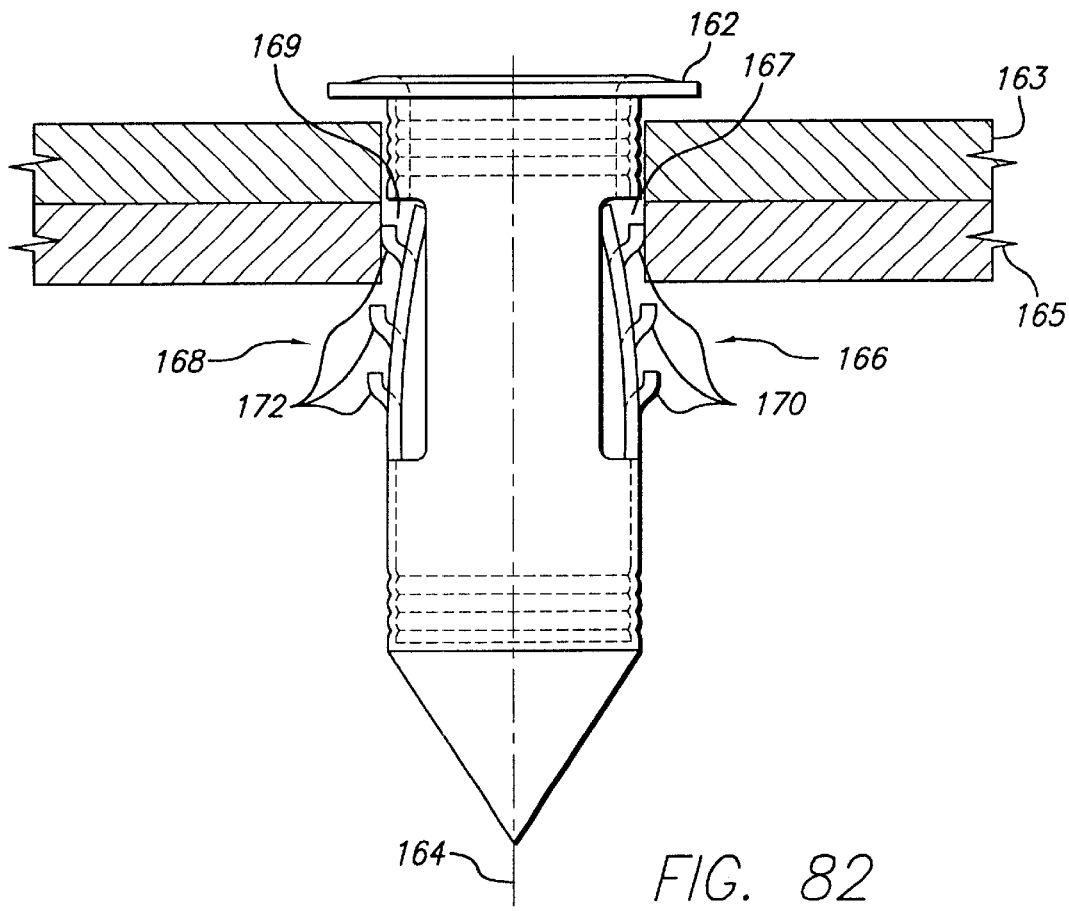
FIG. 82 shows the fastener of FIG. 36 having penetrated a plurality of substrates in accordance with the principles of the present invention.

Under certain circumstances where greater strength is desired than that provided by the blade structure, the fastener can be formed to provide a cylindrical or tubular body. Such a fastener is generally illustrated in FIGS. 36–38 and in FIG. 82 to which reference is hereby made. The fastener as illustrated in FIGS. 36 through 38 comprises a body 156 having a first end 158 and a second end 160. The first end 158 is formed to provide a cutting surface and in the configuration as shown in FIGS. 36 and 37 is a serrated cutting surface which may have a single bevel point edge. A crown 162 is formed on the opposite end 160 and as illustrated is bent to provide a slightly less than a 90-degree angle to a longitudinal axis 164 of the body. This provides the same type of spring loading function that was described with respect to the blade-like fastener structure above discussed. Disposed between the ends 158 and 160 are tines 166 and 168 capable of being rendered resilient. The tine 166 includes a plurality of protruding gripping and clamping elements 170 while a tine 168 includes a plurality of protruding gripping and clamping elements 172. The tines 166 and 168 along with their respective protruding gripping and clamping elements function in precisely the same manner as that described above. In constructing the fastener as shown in FIGS. 36 through 38, the structure is stamped from a single strip of spring steel utilizing a stamping press as is the case with the blade type structure. The crown is formed while the fastener is still in a flat plate format. Subsequently thereto, the flat plate is then rolled in a forming dye to bring opposite end edges thereof together in a butt joint as is illustrated at 174. Subsequent to forming the butt joint 174, the tines are turned so that the protruding gripping and clamping elements face outward from the outer surface of the fastener as illustrated in the drawings. The tubular fastener as illustrated in FIGS. 36 through 38 may be utilized for attaching metal to metal or for attaching plywood to a metal substrate for roofing or siding or to also apply cement fiberboard to a metal substrate. Such cement fiberboard is used extensively in construction in any geographical location having high humidity environment. The utilization of the cement fiberboard eliminates the problem normally associated with dry rot. The tubular fastener as shown in FIGS. 36 through 38 is sufficiently strong that it may be utilized to penetrate metal substrates up to 12 gauge or alternatively two layers of 16 gauge sheet metal as a substrate. FIG. 82 shows the fastener of FIGS. 36–38 having pierced two substrate layers 163, 165 and how protruding gripping and clamping elements 170, 172 are being deflected in their corresponding voids 167, 169, respectively.

Figure 39:
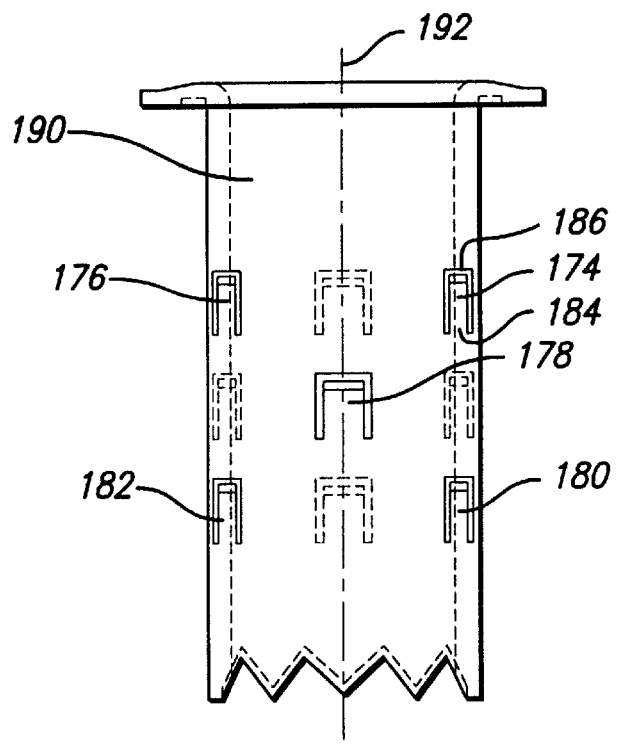
FIG. 39 is a side sectional view of a cylindrical body fastener in an alternative embodiment to that as shown in FIG. 36.
Figure 40:
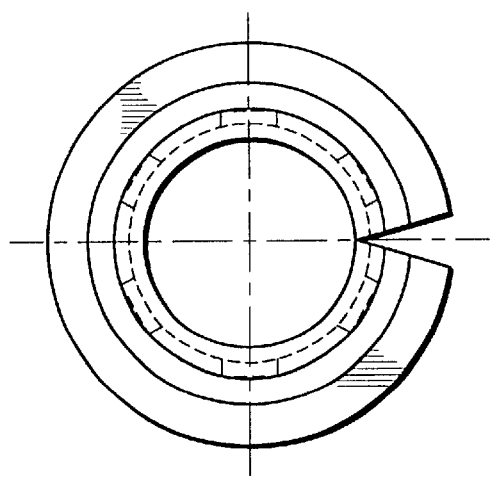
FIG. 40 is a top elevational view of the fastener illustrated in FIG. 39.

By reference to FIGS. 39 and 40, there is shown an alternative embodiment of a tubular or semi-tubular fastener similar to that shown in FIGS. 36 through 38. However, the structure shown in FIGS. 39 and 40 utilizes tines capable of being rendered resilient which are constructed by piercing the flat stock during formation of the fastener in spaced apart positions to provide tines as illustrated at 174 through 182. Each of these tines is bent outwardly about its base such as illustrated at 184 with respect to tine 174 in such a manner that the upper end 186 of the tine 174 is displaced outwardly from the surface 188 of the tubular body 190 of the fastener. As is illustrated by the dashed lines in FIG. 39, additional tines are provided on the surface of the body 190 not visible in FIG. 39 and are disposed in such a manner that they are angularly displaced around the body 190 by approximately 120 degrees apart. As is shown in FIG. 39, there are three rows or tiers of tines spaced longitudinally along the axis 192. There may be less or more tiers of such tines depending upon the particular application under consideration. It is also noted that the position of the tines at each vertical tier position is rotated 60 degrees about the longitudinal axis 192 from the tier of tines immediately above or below. Although the tines may be bent outwardly from the surface 188 by various amounts, it has been found that an outward bend of approximately 15 degrees is preferable. The outward bend of approximately 15 degrees is in the finished form of the fastener as shown in FIGS. 39 and 40. The tines are formed while the material is still in the flat stock configuration and is passing through the stamping press. Subsequently, the tubular fastener is formed as above described in a forming dye. Since such is done in this fashion, it has been found that where the tines are formed prior to rolling of the material into the tubular form, they should be bent slightly further out than the desired 15 degree bend in the finished product. It has been found that an outward bend of approximately 30 degrees before rolling will provide a desired 15 degree outward bend. This results because of the resilience of the material from which the fastener is formed. That is by bending the tines approximately 30 degrees, they will retain a 15 degree outward bend even though they have been returned to the plane of the material when it is rolled into the tubular format.

The structure as shown in FIGS. 39 and 40 is useful in fastening heavy gauge metal material to light gauge metal material or light gauge metal material to light gauge metal material. For example, one specific application into which the fastener as shown in FIGS. 39 and 40 is particularly adaptable is in the application of heavy metallic straps to hold air conditioning ducts in place in high rise buildings.

Figure 41:
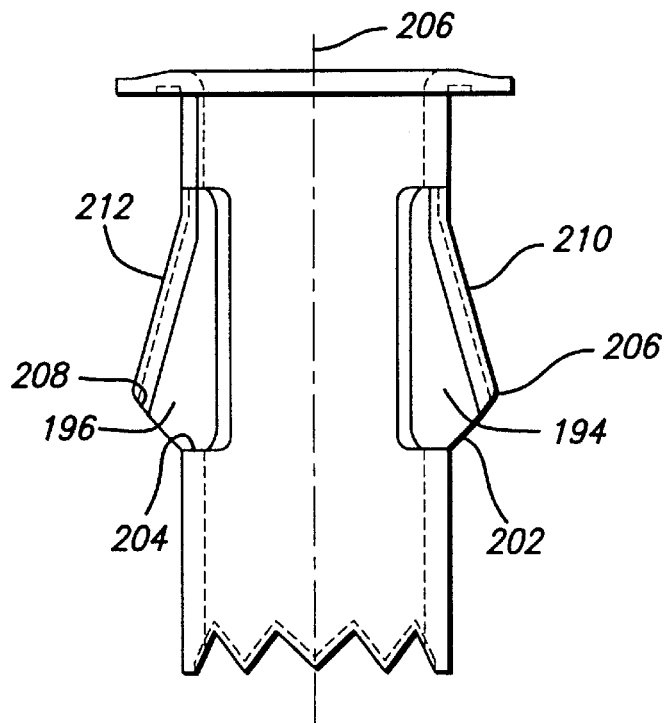
FIG. 41 is yet another alternative embodiment of a cylindrical body fastener constructed in accordance with the principles of the present invention.
Figure 42:
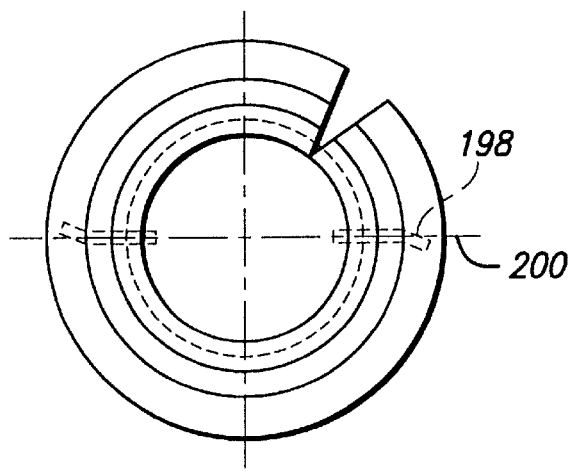
FIG. 42 is a top elevational view of the fastener shown in FIG. 41.

Referring now to more particularly to FIGS. 41 and 42, there is shown a tubular or semi-tubular fastener which is constructed in a manner slightly different than those previously described. The structure as illustrated is formed in the manner described with regard to FIGS. 36 through 40. However, the tines as illustrated at 194 and 196 have no protruding gripping and clamping elements. The holding function of the structure as shown in FIGS. 41 and 42 is accomplished through utilization of a torsional spring load. As is illustrated, the tines after rolling are bent outwardly and then the outer edge of the tines are then further bent as is illustrated at 198 so that the tip is angularly displaced from the axis 200 passing through the main portion of the tines 194 and 196. As the fastener passes through the work pieces, the cam surface 202 and 204 of the tines 194 and 196, respectively, contacts the metal substrate, and the tines rotate inwardly toward the longitudinal axis 206 and then as a result of the resilient material will be urged outwardly as the camming surfaces 202 and 204 pass through the opening in the metal substrate. That is, the opening passes the point 206 and 208 on the tines. When this occurs, the tines then rotate outwardly and provide an infinite gripping along the surfaces 210 and 212, respectively.

Referring now more particularly to FIGS. 43 through 45, there is shown yet another alternative embodiment for a fastener having tines capable of being rendered resilient and constructed in accordance with the principles of the present invention. As is shown in FIGS. 43 through 45, the fastener 214 includes a body portion 216 having a first end 218 and a second end 220. The first end 218 is provided with a single bevel cutting surface 222 as above described. The second end 220 is provided with a crown 224 which is angularly displaced from the body 216 as above described and functions for the same purpose. The basic distinction between the fastener as shown in FIGS. 43 through 45 are those described above is that there are provided by stamping from the body 216 a plurality of tines with longer tines 226 and 228 disposed outboard and shorter tines 230 and 232 being disposed inboard. As is noted particularly in FIG. 44, the tines are bent so that alternate ones of the long tines are bent in opposite directions and that the smaller tines are also bent in opposite directions from the body 216 of the fasteners 214. Having the longer and shorter tines provides two levels for gripping when the fastener is positioned in place. The shorter tines are provided for gripping thicker materials and the longer tines for gripping thinner materials to be fastened together. The structure as shown in FIGS. 43 and 45 is particularly adapted for framing applications.

Figure 46:
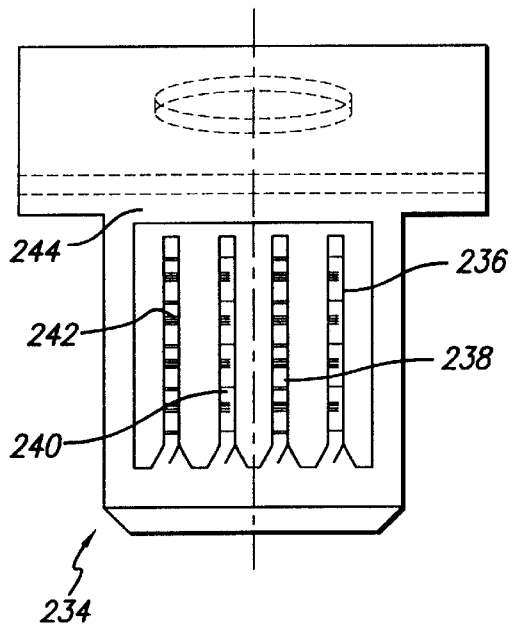
FIG. 46 is a front elevational view of an alternative embodiment of a fastener similar to that illustrated in FIG. 43.
Figure 47:
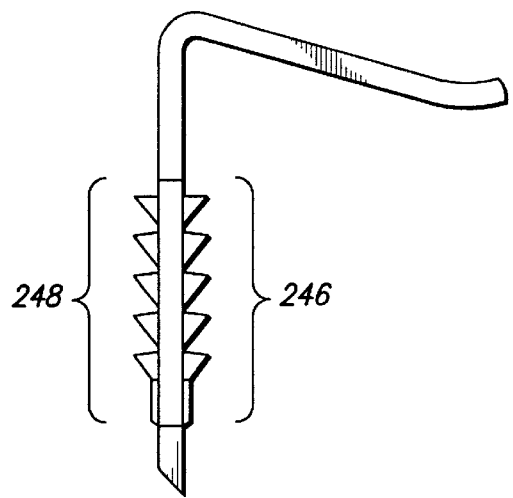
FIG. 47 is a side view of the fastener illustrated in FIG. 46.
Figure 48:
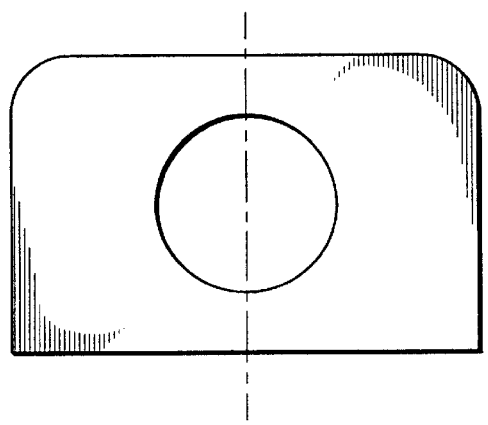
FIG. 48 is a top view of the fastener shown in FIG. 46.

Referring now more particularly to FIGS. 46 through 48, there is illustrated a fastener which is constructed in somewhat the same manner and for the same purposes shown in FIGS. 43 through 44. However, the tines in FIGS. 46 through 48 include protruding gripping and clamping elements and the tines after being stamped are rotated 90 degrees so that the protruding gripping and clamping elements extend on opposite surfaces from the body. As is illustrated in FIGS. 46 through 48, the fastener 234 includes a plurality of tines 236, 238, 240 and 242 disposed centrally of the body 244. The tines each include protruding gripping and clamping elements as shown at 246 and 248 in FIG. 47. The tines are rotated 90 degrees from the plane of the body 244 so that the protruding gripping and clamping elements extend in opposite directions from the body 244. That is, the tines 242 and 238 are rotated 90 degrees in such a way that the protruding gripping and clamping elements thereon are visible in FIG. 46. That is, they extend outwardly from the plane of the paper while the tines 236 and 240 are rotated in the opposite direction so that the protruding gripping and clamping elements thereon extend away from the paper. This is clearly illustrated in FIG. 47. Through the utilization of this type of structure, the camming surfaces on the protruding gripping and clamping elements cause the tines to rotate as above described and the resilient deformability of the material causes the tines and the protruding gripping and clamping elements to return to the position as shown in FIG. 47 to accomplish locking of the work pieces together.

Figure 49:
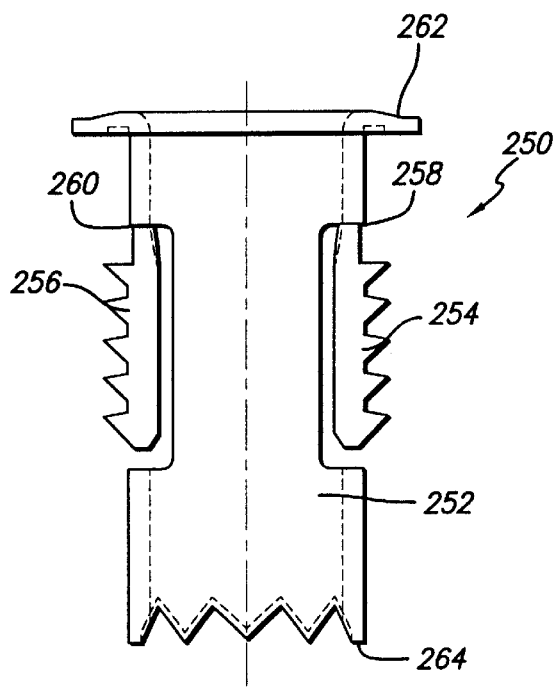
FIG. 49 is a front view of a fastener similar to that illustrated in FIG. 46 but with the tine extending from the upper portion of the body.
Figure 50:
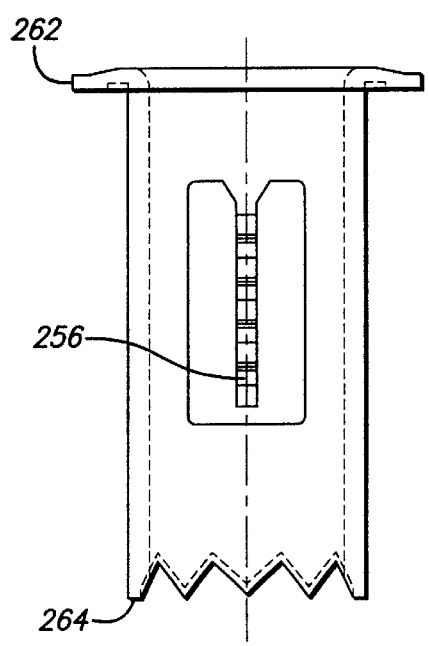
FIG. 50 is a side view of the alternative fastener as shown in FIG. 49.

As will be recognized, the various fasteners as above illustrated and described comprise tines which have a single point attachment area connecting them to the body of the fastener. This area constitutes the spring hinge function as above described. In accordance with the most preferred embodiment of the invention, the point of attachment and thus the spring hinge function is as close to the penetrating point of the fastener as possible with the tine facing in an upward orientation. It should, however, be understood by those skilled in the art that the tine may have the single point of attachment at the upper end of the fastener disposed away from the penetrating point of the fastener. Under these circumstances, the tine would be facing in a downward orientation. Such a structure is illustrated in FIGS. 49 and 50 to which reference is hereby made. As is therein shown, the fastener 250 includes a tubular body portion 252 having tines 254 and 256 formed therein, each of the tines is formed with protruding gripping and clamping elements as described and which function in the same manner as above described. The primary distinction and difference is that the point of attachment of the tine to the body is at 258 and 260, respectively, and as illustrated is adjacent the crown 262 as opposed to the penetrating end 264 of the fastener.

Figure 51:
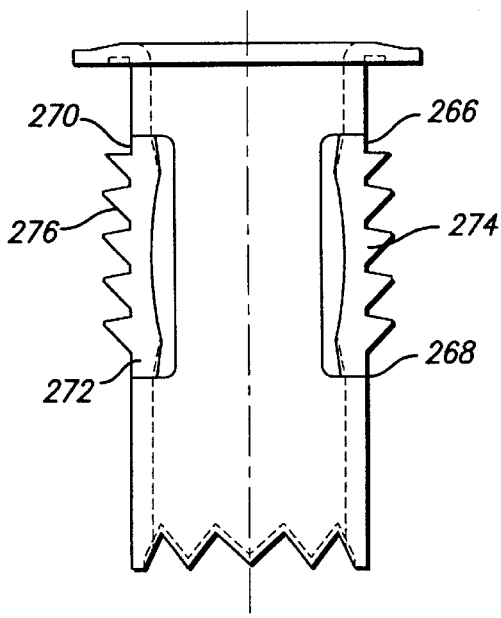
FIG. 51 is a front elevational view of a fastener similar to that shown in FIG. 46 but with the tine attached at both ends to the body of the fastener.
Figure 52:
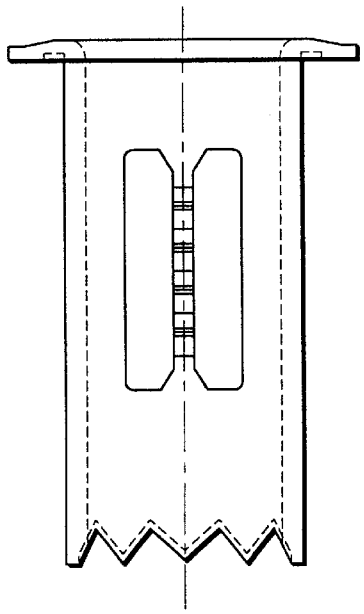
FIG. 52 is a side view of the fastener as shown in FIG. 51.

An additional alternative arrangement for the tines is to attach each end of the tine to the body with the middle portion thereof bent slightly outwardly to provide the resilient deformability of the tines as the fastener is caused to penetrate the work pieces. Such a structure is shown in FIGS. 51 and 52. These fasteners are substantially the same as shown in FIGS. 49 and 50 except that each end of the tines 274 and 276 are attached to the body of the fastener such is as illustrated at 266 and 268 for the tine 274 and at 270 and 272 for the tine 276.

Figure 53:
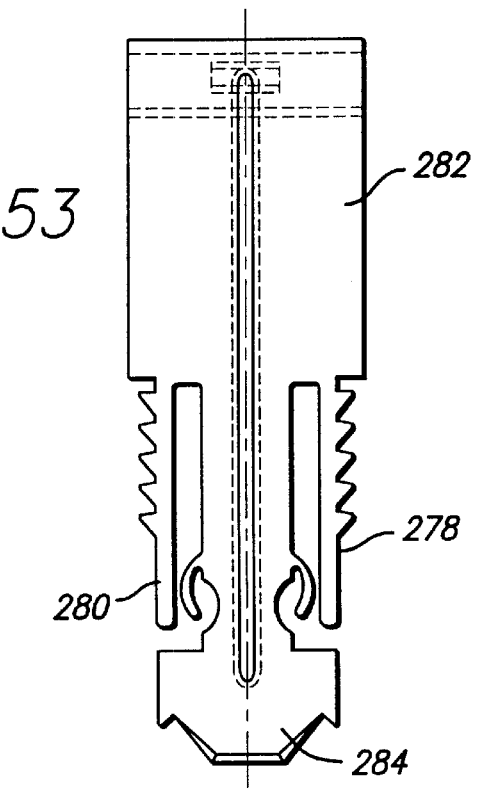
FIG. 53 is a front elevational view of a fastener similar to that illustrated in FIG. 21 but with the tines affixed to the upper portion of the body.
Figure 54:
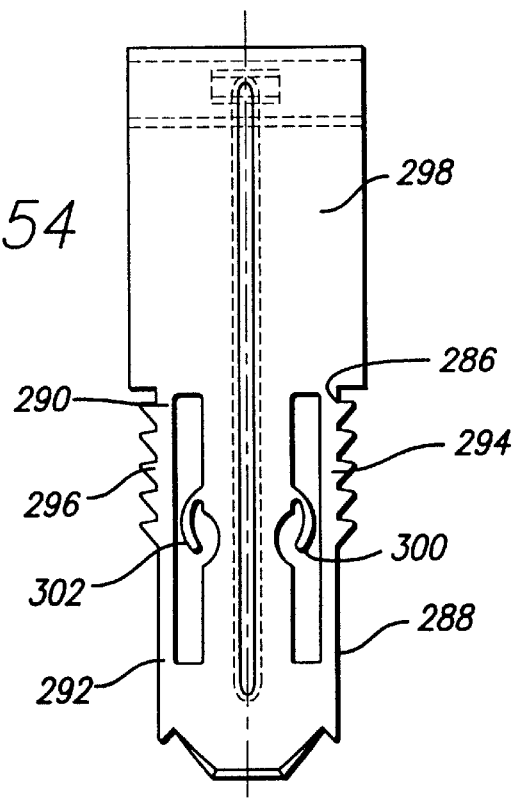
FIG. 54 is an additional alternative embodiment of a fastener similar to that shown in FIG. 21 but with the tines attached at both ends thereof to the body.

Similar structures thus shown with regard to the tubular fasteners may also be applied to the blade type fasteners and such alternatives are shown in FIGS. 53 and 54 to which reference is hereby made. As shown in FIG. 53, the tines 278 and 280 are attached to the body portion 282 of the fastener at a point displaced substantially from the penetrating end 284 thereof. As shown in FIG. 54, opposite ends of tines are affixed to the body of the fastener. For example, the ends 286 and 288 of the tine or 294 are affixed to the body 298 of the fastener while the ends 290 and 292 of the tine 296 is affixed to the body 298 of the fastener. It is also noted in the structure shown in FIG. 54 that the additional spring elements 300 and 302 are provided to give additional spring action to the tines 294 and 296.

Figures 55, 56, 57A, 57B, 57C:
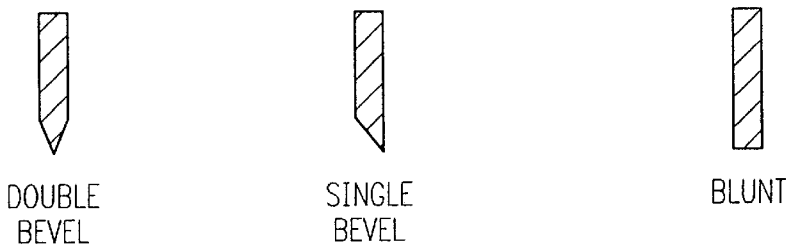
FIG. 55 illustrates at sub-figures A through G various types of points which may be formed on the metal penetrating portion of the fastener constructed in accordance with the principles of the present invention as formed from a single or dual axis flat sheet metal.
FIG. 56 at sub-figures A through C thereof illustrate the points which may be formed on the metal penetrating portion of the fastener constructed in accordance with the present invention which is constructed in a cylindrical form.

It should be understood that those skilled in the art that the points on the blade type fasteners may be formed in various ways in order to accomplish the desired penetration of the workpieces under various applications. FIGS. 55A–55G illustrate various types of points which may be utilized. The points on the tubular fasteners which may be utilized are shown in FIGS. 56A–56C. The edges on the points which may be utilized in order to penetrate particularly the metal may be, as illustrated in FIGS. 57A–57C, either single bevel, double bevel or under certain applications a completely blunt point depending upon the force which may be applied to the fastener when it is directed against forward pieces.

In accordance with yet another preferred embodiment of the present invention, a metal piercing fastener, generally referred by a reference numeral 500, is disclosed for securing at least one metal layer to one or more metal/non-metal layers and retaining the secured layers in their positions permanently under adverse conditions (FIG. 58). The metal layer(s) may be galvanized steel substrate sheet metal layers with a gauge range similar to fastener 300 of FIG. 1. Fastener 500 may be used, for example, to secure gypsum drywall board to metal studs, plywood to metal studs, cement fiberboard to metal studs or any other non-metal material to a metal material. In general, the preferred use of fastener 500 is in fastening light gauge sheet metal (LGSM) layers ranging from 14 GA–30 GA. Fastener 500 may also be used with metals of different gauges or even to fasten low density materials such as wood to wood.

Fastener 500 is preferably fabricated from a single piece of sheet metal having a single axis with the sheet metal capable of being rendered resilient. The sheet metal is preferably carbon spring steel such as ASTM C1045 to C1085 or a fully hardened spring stainless steel such as 300 or 400 series stainless steel. In either instance, the metal is capable of being rendered resilient which is needed to securely fasten the work pieces together.

Figure 58C:
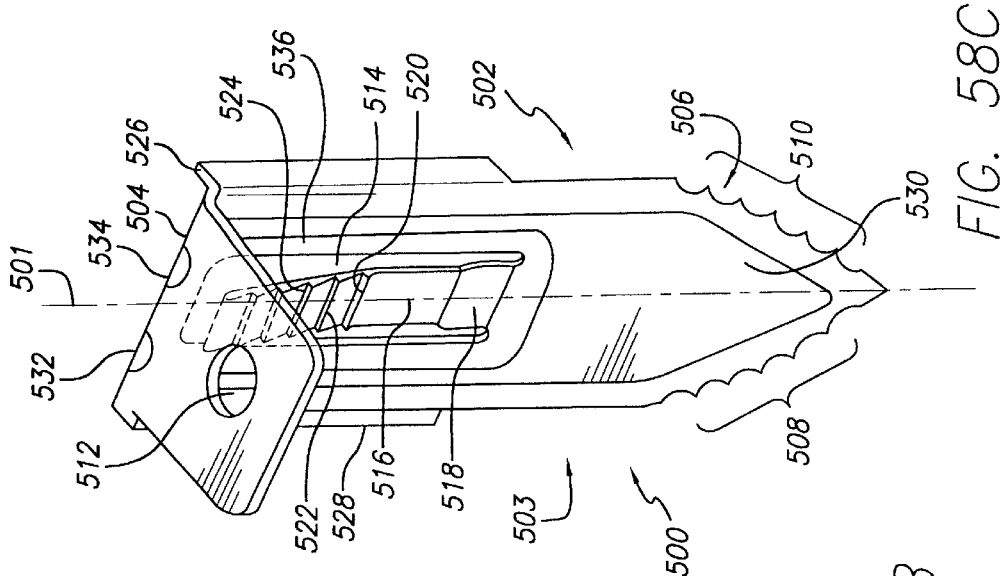
FIG. 58 at sub-figures A–C shows front and back perspective views and a side view of a fastener constructed in accordance with the principles of the present invention and having a single axis.
Figure 58B:
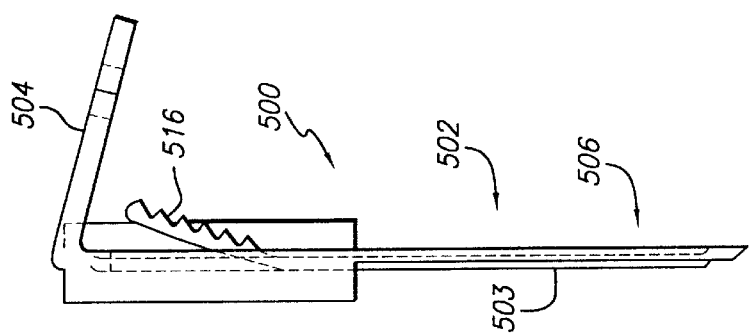
Figure 58A:
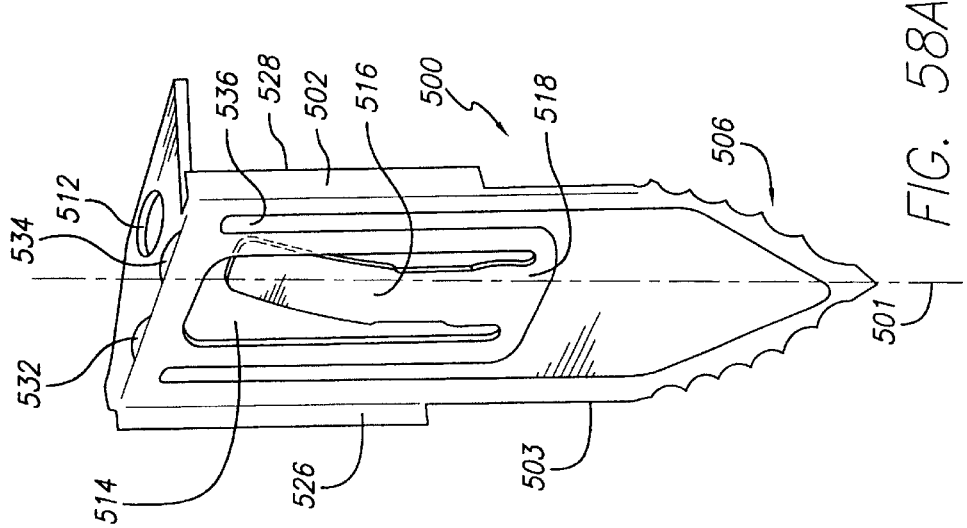

As shown in FIGS. 58A–58C, fastener 500 includes a generally elongated metal body 502 having a longitudinal axis 501, a crown portion 504 at one end for receiving the force of impact from an appropriately configured tool used for driving fastener 500 through the work pieces and a spade-type tip or point portion 506 sharpened at the end for layer penetration. Crown 504 is preferably disposed at an acute angle to an elongated portion 503 of body 502 and includes an aperture 512 to allow for part indexing during manufacturing and can be used to allow, for example, drywall plaster to bond to the top substrate in the area under crown 504. Elongated body portion 503 may be provided with a 'coined' pattern 536 (FIGS. 58A, 58C) along its entire length to increase its rigidity and stability. When fully seated against a LGSM layer a slight upward taper (about less than 1 degree) due to the coining process serves to optimize the vertical stability of fastener 500. Crown 504 is formed by bending the upper portion of elongated body portion 503 forward (FIG. 58C) and may be provided with a pair of gussets 532, 534 to prevent undesirable 'spring back' of crown 504 when it is forced against the top work piece substrate. Crown 504 may be shaped (e.g. rectangular with or without radiused corners, oval, square, etc.) or bent relative to elongated body portion 503 in a variety of ways and aperture 512 may be circular or of any other configuration suitable for practicing the present invention.

Tip 506 is preferably equipped on each side with scalloped or serrated cutting edges 508, 510, respectively, having beveled surfaces adapted for easily piercing the work pieces (metal and non-metal) that need to be fastened. Top surface 530 of tip 506 is preferably concave to increase rigidity of tip 506 so that tip 506 is sufficiently strong to pierce a 16 GA LGSM substrate with little or not "tip curl". The concave shape of top surface 530 is formed through a 'coining' process to ensure that tip 506 cut or slice through a metal substrate without causing crushing or excessive dimpling of the top surface of the substrate.

Elongated body portion 503 is preferably provided somewhat centrally with a void 514 for accommodating a generally resilient tine 516 formed as an integral part of body 502. The width of void 514 is preferably larger than the width of tine 516 in accordance with the general principles of the present invention. Tine 516 has generally thinner mass than elongated body portion 503 and a base 518 preferably integral with elongated body 503 (as shown in FIGS. 58A, 58C) and elevated in a vertical plane intersecting axis 501 to ensure resiliency. Specifically, tine 516 is elevated at an acute angle (about 10–15 degrees, see also FIG. 63) away from axis 501 so as to protrude out of void 514 facing the underside of crown 504 as shown in FIGS. 58A–58C. Tine 516 is provided on its top side with a plurality of gripping and clamping ribs such as, for example, ribs 520, 522, 524, etc. spaced from each other to enhance the gripping and clamping action of fastener 500 during layer penetration. The bottom side of tine 516 is preferably left flat to lower any possibility of engagement with the pierced opening during the penetration process in accordance with the general principles of the present invention. The location of each rib and spacing between ribs is designed to accommodate different grip range requirements. During penetration of the work pieces, tine 516 is deflected (unwound) backwards, i.e. towards axis 501 which allows tine 516 to easily penetrate through an LGSM layer. When portions of the ribs on tine 516 are no longer constrained by the LGSM layer, tine 516 tends to return (re-wind) to its preset elevated orientation. At the end of the piercing process, tine 516 is disposed approximately parallel to axis 501 pressing against the inner surface of the work piece slit (pierced by tip 506), i.e. acting as a spring to fully grip and clamp body 502 of fastener 500 via the ribs inside the work pieces being fastened.

Fastener 500 is also preferably provided in its upper (near crown 504) portion with a pair of stiffeners 526, 528 on each side of elongated body 503, respectively. Stiffeners 526, 528 lend a considerable degree of strength to the upper portion of elongated body 503 and transfer most of the impact forces along axis 501 away from crown 504. Each stiffener is formed by bending a portion of elongated body 503 sideways approximately 90 degrees whereby stiffener 526 is oriented opposite from the orientation of stiffener 528 with the angles of bending/orientation being approximately equal and opposite in direction as shown in FIGS. 58A, 58C. Furthermore, the oppositely oriented stiffeners serve to restrict fastener 500 from leaning or rocking backwards or forwards with the length of each stiffener designed to allow for precise control or countersinking of crown 504 into the top work piece substrate.

FIG. 59 depicts fastener 500 in three stages (FIGS. 59A–59C) of penetrating a work piece made up of a top gypsum drywall board 540 loosely set against a 25 GA interior galvanized non-load bearing LGSM stud 542. Resilient tine 516 is coupled at its base to elongated body 503 and is preset or twisted at the base around its longitudinal axis (not shown) and elevated in a vertical plane intersecting a body axis (not shown) at an acute angle (about 10–15 degrees) relative to the body axis to ensure resiliency of tine 516. As shown in FIGS. 59B–59C, fastener 500 penetrates and exits drywall board 540 without causing excessive 'spalling' of its back surface, yet easily slicing LGSM stud 542 to provide a firm bond between the two layers.

FIG. 60 depicts fastener 500 in three stages (FIGS. 60A–60C) of penetrating a work piece made up of a top (approximately 7/16" thick) exterior wood grain plank style embossed cement fiberboard substrate 544 loosely set against a 16 GA exterior galvanized load bearing LGSM stud 546. Substrate 544 is a composite material of Portland Cement and cellulose without a top paper laminate providing a denser (than the gypsum board in FIG. 59) top surface layer. In this particular configuration, crown 504 is bent at an acute angle relative to elongated body portion 503, with most of its inner area removed except for an inverted 'V' (shown, for example, in FIG. 88F), rectangular frame around its outer edges, to allow optimal countersinking and pull over resistance required for this type of relatively dense material. FIG. 60B shows fastener 500 pulling cement fiberboard substrate 544 forward as it penetrates LGSM stud 546. FIG. 60C shows fastener 500 in a fully clamped mode with its crown 504 seated almost flush with the top surface of dense cement fiberboard substrate 544.

FIG. 61 depicts fastener 500 in three stages (FIGS. 61A–61 C) of penetrating a work piece made up of a top (approximately ½" thick) exterior plywood shear panel 548 loosely set against a 16 GA exterior galvanized load bearing LGSM stud 550. FIG. 60B shows fastener 500 pulling panel 548 forward as it penetrates LGSM stud 550. FIG. 60C shows fastener 500 in a fully clamped mode with its crown 504 seated almost flush with the top surface of plywood panel 548, both layers securely fastened.

Figure 62A:
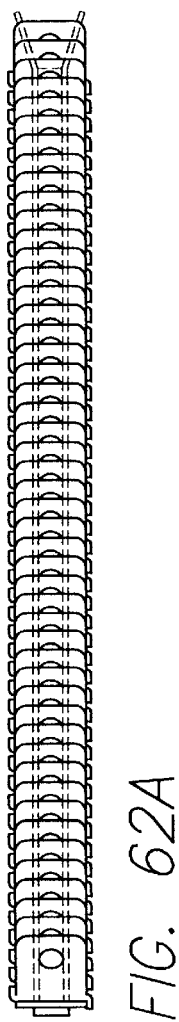
FIG. 62 shows a front elevational view of a collated stick of fasteners prepared for use with a power tool such as the power tool of FIG. 5.
Figure 62B:
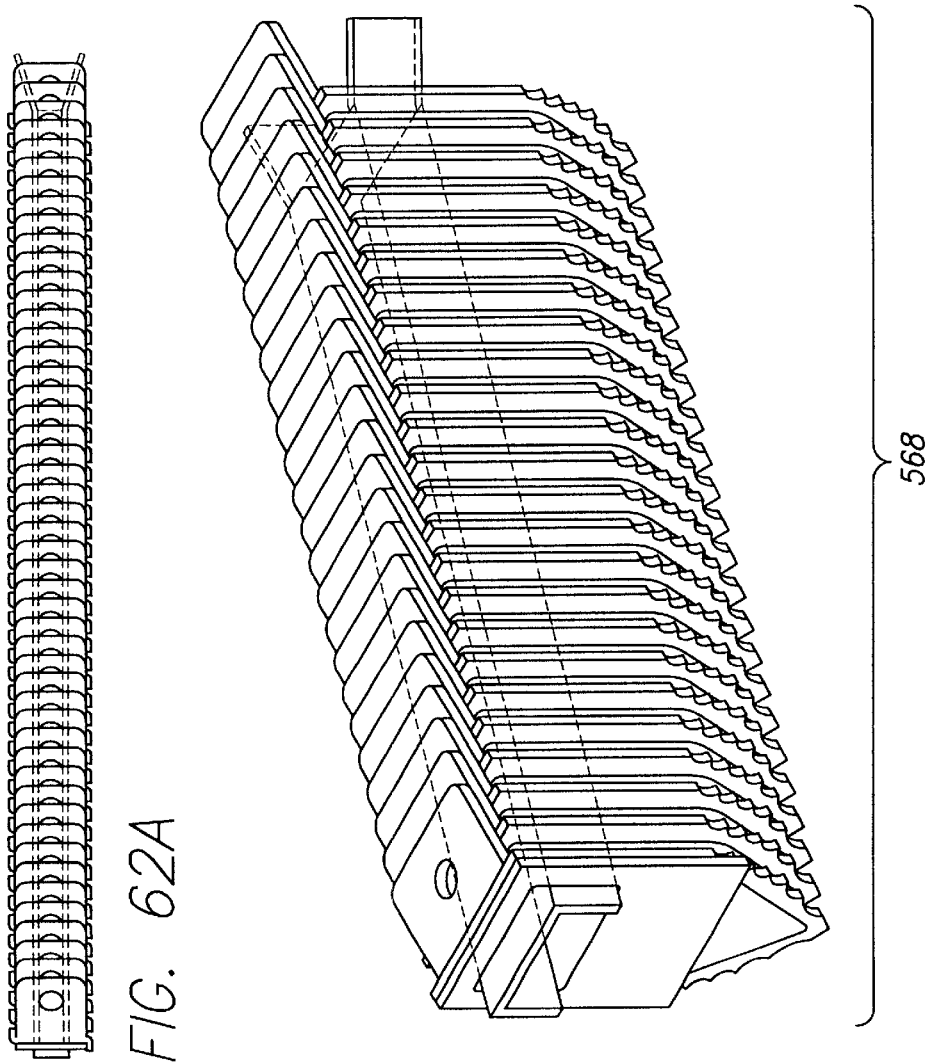

FIG. 62 depicts a plurality of fasteners 568 in a 'collated stick' configuration in accordance with the present invention. Fasteners 568 are preferably bonded together side by side using an elastomeric styrene polymer bonding agent similar to the bonding agent of FIG. 6.

FIG. 64 illustrates the effect of the clamping force "f" exhibited by a fastener 600 as it gets seated firmly in a plurality of substrates under an impact force "i".

FIG. 65 shows fastener 500 in three stages (FIGS. 65A–65C) of penetrating a work piece made up of a top interior 28 GA LGSM framing track 700 loosely set against an interior 25 GA LGSM stud 702. Crown 504 of fastener 500 preferably has a thin profile to reduce spacing between LGSM and the to-be-applied gypsum drywall sheets. Framing track 700 is attached to a concrete sub-floor 704 via pins 706. FIG. 65B shows fastener 500 pulling framing track 700 forward as it penetrates LGSM stud 702. FIG. 65C shows fastener 500 in a fully clamped mode with its crown 504 seated almost flush with the top surface of framing track 700, both layers securely fastened.

In accordance with still another preferred embodiment of the present invention and as shown in FIGS. 66A–66E, a metal piercing fastener, generally referred by a reference numeral 800, is disclosed for fastening at least one metal (e.g., LGSM) layer to one or more metal/nonmetal layers. Fastener 800 includes a generally elongated metal body 802 having a crown portion 804 at one end for receiving the force of impact from an appropriately configured tool (manual or power tool—not shown) used for driving fastener 800 through two or more work pieces and a spade-type tip or point portion 806 substantially sharpened at the end for layer penetration. Crown 804 is preferably disposed at an acute angle 'a' (FIG. 66E) relative to an elongated portion 803 of body 802 and includes an aperture 812 to allow for part indexing during manufacturing and can be used to allow, for example, drywall plaster to bond to the top substrate in the area under crown 804. Elongated body portion 803 is preferably provided with a stiffener on each side such as side stiffeners 801, 805, respectively. Crown 804 is formed by bending the upper portion of elongated body portion 803 forward (i.e., out of the page in FIGS. 66B–66C) and may be provided with a pair of gussets (not shown) to prevent undesirable 'spring back' of crown 804 when it is forced against the top work piece substrate. Crown 804 may be shaped (e.g. rectangular with or without radiused corners, oval, square, etc.) or bent relative to elongated body portion 803 in a variety of ways and aperture 812 may be circular or of any other configuration suitable for practicing the present invention.

Sharpened tip 806 is preferably equipped on each side with a plurality of single bevel serrated cutting edges 808, 810, respectively, adapted for easy penetration of work pieces (metal and non-metal) to be fastened. Top surface 830 of tip 806 is preferably provided with a gusset 807 to strengthen the fastener's penetrating point area (FIGS. 66A, 66B, 66D).

Elongated body portion 803 is also provided with a void or clearance area 814 shaped to accommodate a resilient tine 816 equipped with serrated edges 832 on each side (FIG. 66A) for effective clamping and gripping during substrate penetration. During the blanking set of the progressive die stamping process, tine 816 is generated by blanking its shape and discarding the clearance scrap around it. Resilient tine 816 has a generally tapered configuration as shown in FIG. 66A and is preferably preset or twisted at each end in a vertical plane (not shown) intersecting a longitudinal metal body axis 811 about 270 degrees relative to its longitudinal axis (not shown). If resilient tine 816 is centrally located within the fastener body, the tine will be twisted around metal body axis 811 (FIGS. 66A, 66B), i.e., torsion bar style, to optimize its gripping and clamping capability (FIGS. 66B–66E). A person skilled in the art would readily appreciate that even though resilient metal tine 816 is shown (in FIGS. 66A, 66B, 66D) as an integral part of body 802, tine 816 may alternatively be attached at each end to lower and upper tine attachment body portion 831, 833, respectively, in a variety of ways such as crimping or swaging the parts together.

In accordance with the best mode for practicing the present invention, the preset tine configuration is substantially unwound as fastener 800 passes through a pierced slot (not shown) in the LGSM substrate(s) being fastened and then tends to rewind when tine 816 is no longer constrained by the LGSM substrate(s) effectively gripping and clamping surrounding LGSM substrate material. Since tine 816 is preset in a twisted manner, it cannot pass through the pierced opening in the LGSM substrate until it is forced straight or flat. Immediately after tine 816 is no longer constrained by the pierced hole and it tends to return to its preset position. In doing so, it is rotating around the longitudinal axis of the metal body of the fastener. The gripping and clamping members actually swing under the bottom surface of the bottom LGSM layer in an arc pattern. This arc pattern combined with the upward facing gripping and clamping member pushes up on the bottom surface of the LGSM layer.

Furthermore, resilient tine 816 may be configured with smooth (rather than serrated) side edges—see FIGS. 66D, 66E depending on application. If the possibility exists that tine 816 may become engaged with the substrate prior to completion of the fastening process, it would be advisable to use a smooth side-edged tine.

In accordance with a different preferred embodiment of the present invention and as shown in FIGS. 67A–67F, a metal piercing fastener, generally referred by a reference numeral 900, is disclosed for fastening a non-metal porous type layer 908 (which can be wood or other suitable porous/fibrous material) to a 18 GA LGSM stud 910. Fastener 900 is of substantially the same configuration as fastener 214 of FIG. 44 except that a crown 902 of fastener 900 is fabricated with a crown-to-metal body bend angle 904 preset generally in the range of 30 degrees to 15 degrees. Furthermore, a disposable retention band 906 made of low carbon steel of the type used for steel banding or strapping applications is applied to crown 902 to bring the crown-to-metal body bend angle 904 as close to 0 degrees as possible before use. With bend angle 904 substantially at 0 degrees, fastener 900 may be easily driven into non-metal porous layer 908.

FIGS. 67B–67E depict fastener 900 in four stages of piercing a porous (wood) top layer 908 set against a 18 GA LGSM stud 910. As retention band 906 makes contact with the top surface of porous layer 908, it is stripped away from crown 902 and may be discarded after use. Fastener 900 is driven to a countersinking depth at which point the now unrestrained crown 902 attempts to return (unwind) to its factory-preset bend angle effectively clamping and gripping the body of fastener 900 against the pierced walls of the top substrate (porous layer 908). Unrestrained crown 902 acts as a one-way barb resisting withdrawal of the seated fastener 900 from the pierced porous layer 908.

FIG. 67F depicts in perspective a wooden plank-style decking member 918 being attached to a 18 GA LGSM flooring joist 911 using fastener 900.

In accordance with another different preferred embodiment of the present invention and as shown in FIGS. 68A–68C, a metal piercing fastener, generally referred by a reference numeral 1000, is disclosed for fastening a metal/nonmetal layer 1002 to a 16 GA LGSM layer 1004. Fastener 1000 includes a generally elongated, resilient metal body 1006 rolled from flat spring steel stock and having a crown portion 1008 at one end for receiving the force of impact from an appropriately configured tool (manual or power tool—not shown) for driving fastener 1000 through two or more layers. Crown 1008 is preferably disposed at an acute angle 'a' (FIG. 68C) relative to an elongated resilient portion 1010 of metal body 1006. Elongated portion 1010 includes preferably a central resilient portion 1022 (FIG. 68C) which is provided at each side with a resilient side edge such as side edges 1012, 1014, respectively, adapted to slide over each other relative to a longitudinal metaa body axis 1016 (FIGS. 68A, 68C) in an overlapping concentric fashion as depicted in FIG. 68B. Each side edge is preferably provided with an integral protruding gripping and clamping element such as protruding gripping and clamping elements 1018, 1020, respectively (FIGS. 68A, 68C). After the tip (not shown) pierces layers 1002, 1004 and gripping and clamping protruding gripping and clamping elements 1018, 1020 make contact with a top surface 1028 of top layer 1002, concave portion 1022 bends radially inward allowing resilient side edges 1012, 1014 to slide over each other (FIG. 68B) which reduces the diameter of elongated resilient body portion 1010 permitting gripping and clamping protruding gripping and clamping elements 1018, 1020 to pass through a pierced substrate slot 1024 (FIG. 68C). As soon as gripping and clamping protruding gripping and clamping elements 1018, 1020 are no longer restrained by layer 1004, gripping and clamping protruding gripping and clamping elements 1018, 1020 snap back out to their original factory preset orientation effectively gripping and clamping the body of fastener 1000 against bottom side 1026 of bottom layer 1004 as depicted in FIG. 68C.

Figure 69:
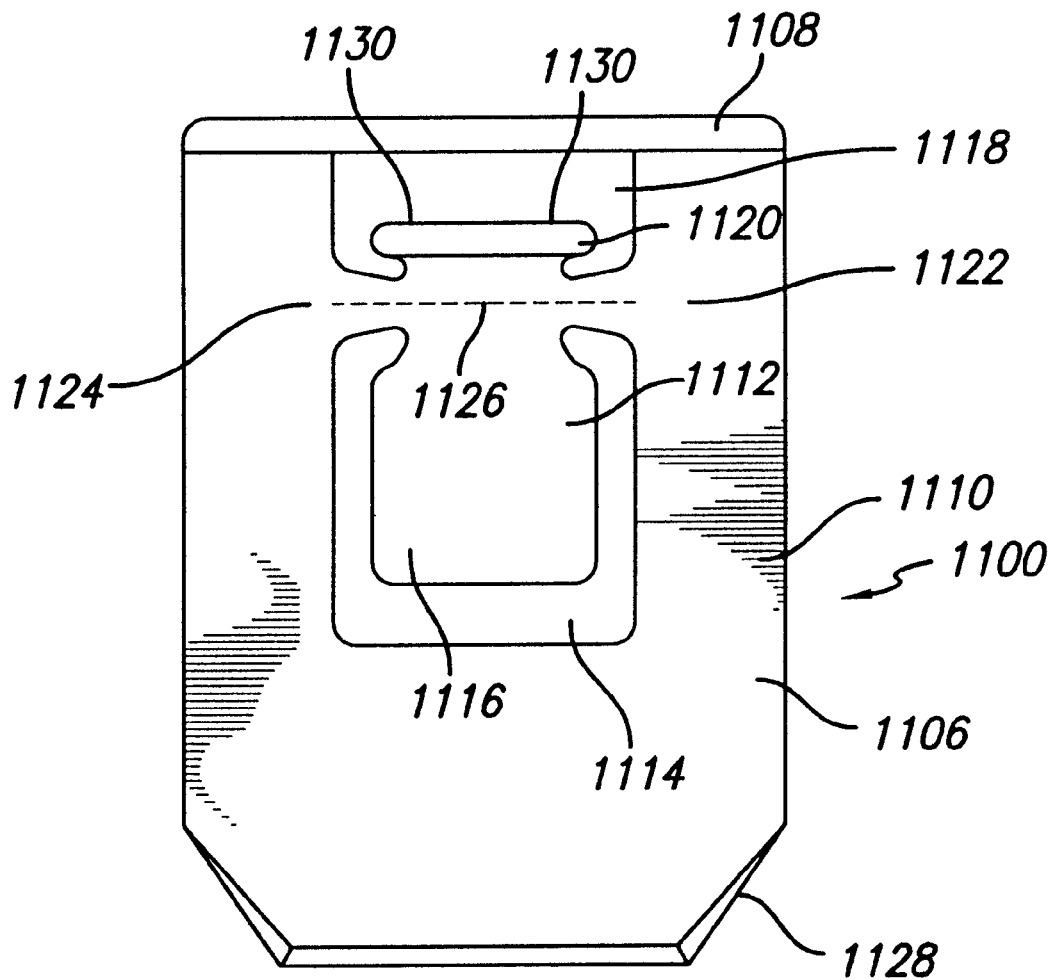
FIG. 69 shows a front elevational view of a fastener of the present invention.

In accordance with still another different preferred embodiment of the present invention and as shown in FIGS. 69, 70A–70D, a metal piercing fastener, generally referred by a reference numeral 1100, is disclosed for fastening a up to 14 GA LGSM layer 1102 to a up to 14 GA LGSM layer 1104. Fastener 1100 includes a generally elongated metal body 1106 having a crown portion 1108 at one end for receiving the force of impact from an appropriately configured tool (manual or power tool—not shown) for driving fastener 1100 through two or more metal layers via a hardened guillotine-type point 1128. Crown 1108 is preferably bent at an acute angle 'b' (FIG. 70A) relative to an elongated body portion 1110 of metal body 1106. Elongated portion 1110 includes preferably a tine assembly 1112 which is formed by cutting out a clearance area 1114 around a lower (toggle) tine portion 1116 and a clearance area 1118 around an upper tine portion 1120 during blanking by the manufacturer as shown in FIG. 69. Tine assembly 1112 also includes a pair of torsion bar hinges 1122, 1124 which help rotate upper tine portion 1120 about a hinge axis 1126 (FIG. 69). Upper tine portion 1120 is preferably provided with locking ridges 1130 on its backside and is generally bent forward (or preset) approximately 30 degrees to 45 degrees (out of the plane of the drawing) about hinge axis 116 at the time of manufacture (FIG. 70A).

The fastening sequence is depicted in FIGS. 70A–70D. Specifically, point 1128 pierces LGSM layers 1102, 1104 (FIG. 70A) and as fastener 1100 travels through the LGSM layers (1102, 1104), underside 1132 of upper tine portion 1120 engages top surface 1134 of LGSM layer 1102 (FIG. 70B). FIG. 70C shows lower (toggle) tine portion 1112 in the process of rotating about hinge axis 1122 during substrate piercing. FIG. 70D shows crown 1108 as it bottoms out on top surface 1134 of LGSM layer 1102 and a bottom front edge 1136 of lower tine portion 1112 clamping against a bottom surface 1138 of bottom LGSM layer 1104. Also shown in FIG. 70D are locking ridges 1130 engaging and locking onto bottom surface 1138 of bottom LGSM layer 1104. The fastening process is now complete with fastener 1100 having securely fastened both LGSM layers.

In accordance with a further alternative preferred embodiment of the present invention, a metal tine 2000 shaped generally like a 'gate' and having a couple of resilient protruding gripping and clamping elements 2002, 2004, respectively, is depicted in several stages of penetrating two LGSM layers 2006, 2008 (each layer can be 14 gauge or less) separated by a gap 2010 in FIGS. 71A–71E. Tine 2000 is preferably fabricated with its metal grain direction 2012 running across a longitudinal axis 2014 of a thin gauge metal body 2016. Tine 2000 has a coined area 2026 serving as a hinge for tine 2000. A clearance area 2013 is provided around protruding gripping and clamping elements 2002, 2004. A thin curled tine portion 2007 is shown in FIG. 71E functioning in effect as a leaf spring, i.e. pushing up and against a bottom surface 2009 of bottom LGSM layer 2008 and effectively clamping the substrates against the bottom surface of the crown (not shown) of fastener 2000.

FIGS. 71F–71H illustrate a tine 2030 having a pair of very thin and extremely resilient clamping and gripping protruding gripping and clamping elements 2032, 2034 with each protruding gripping and clamping element accommodated within a clearance area such as clearance areas 2036, 2038, respectively. FIG. 71G shows protruding gripping and clamping element 2032 extending forward (outside of the plane of paper) at about 90 degrees relative to a metal body 2037 and protruding gripping and clamping element 2034 extending in the reverse direction at about 90 degrees relative to metal body 2037. FIG. 71H depicts thin curled tine portion 2036, 2038 functioning as a leaf springs, i.e. pushing up and against a bottom surface 2040 of bottom LGSM layer 2042 and effectively clamping the substrates against the bottom surface of the fastener crown (not shown).

It is anticipated that a tine of the type shown in FIGS. 71A–71E or in FIGS. 71F–71H would be fabricated as a separate element and then installed into a modified fastener body 2020 (FIG. 71I) with body 2020 having its metal grain direction 2022 running substantially parallel to a longitudinal body axis 2024 as shown in FIG. 71. In general, parts or components of the fastener of the present invention caould be fabricated as discrete parts and then assembled through processes such as crimping and swaging. Such parts could be a 'point', 'body', 'tine', side stay/stiffener' or 'crown'.

Figure 72A:
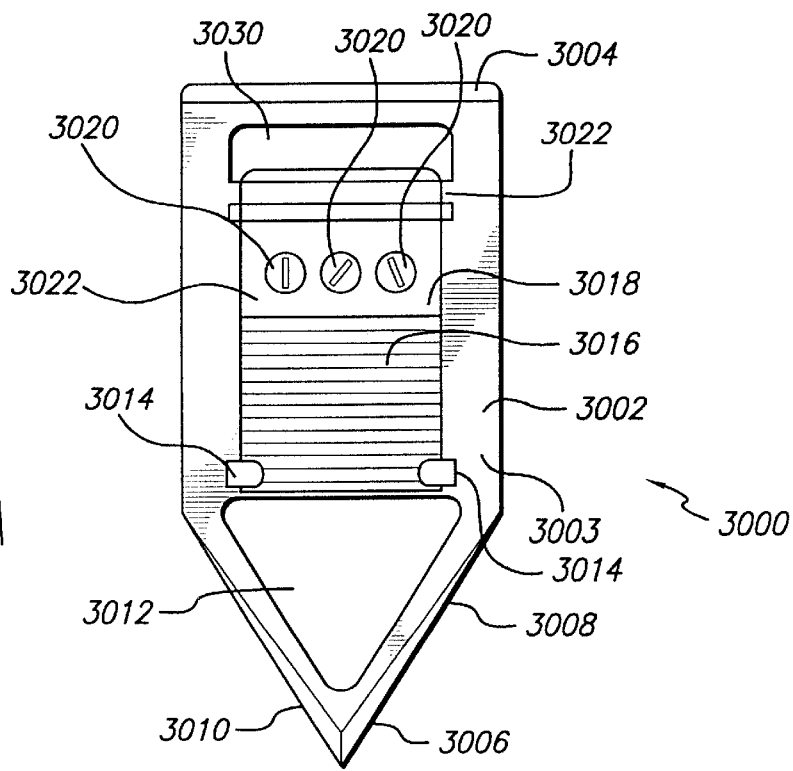
FIG. 72 at sub-figures A–C shows a front elevational view and a side view of a fastener of the present invention.
Figure 72B:
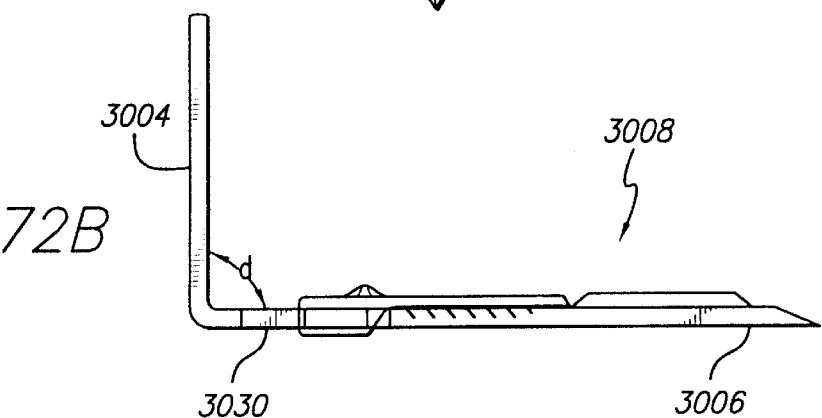
Figure 72C:
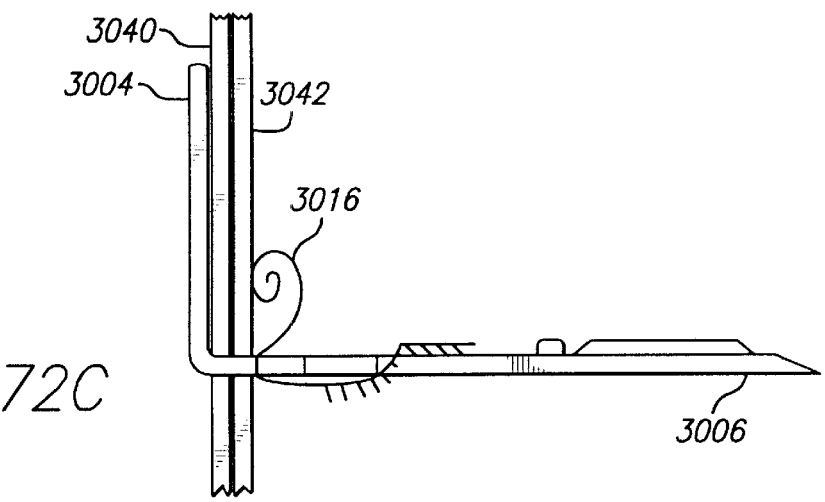

In accordance with another preferred embodiment of the present invention and as shown in FIGS. 72A–72C, a metal piercing fastener 3000 includes a metal body 3002 having a crown portion 3004 at one end for receiving the force of impact from an appropriately configured tool used for driving fastener 3000 through work pieces and a spade-type point 3006 sharpened at the end for layer penetration. Crown 3004 is preferably disposed at an acute angle 'd' relative to an elongated portion 3003 of metal body 3002. Point 3006 has on each side a single tapered bevel cutting edge such as side edges 3008, 3010, respectively, and a nose gusset 3012. This style of fastener is a two part or component type. One part is the tine which is a volute or clock spring that wants to coil upon itself. The tine has (3) punched holes near its end closest to the crown. The other part is all of the other requisite parts as found in other embodiments of the fastener of this invention. The body of the fastener has (3) raised nibs, which, when the tine is assembled onto the fastener's body, they correspond to the (3) holes in the tine. One end of the tine has one-way barbs and the other end is smooth. Going from the barbed end to the smooth end, one would find a 'pusher ridge' running the width of the tine, followed by the (3) punched holes, described above. During assembly, the tine must be uncoiled and restrained to allow the barbed end to be slid into guide tabs on the fastener's body backside. Next, the smooth end of the tine is brought toward the crown and through a slot provided in the fastener's body, thereby allowing the smooth end to be inserted under the two 'hold-down' tabs, near the point. At this time, the (3) punched holes in the tine would be residing over the (2) raised nibs in the fastener's body and create a 'trigger-release' mechanism. All tabs and raised elements are to be of such low profile not to interfere with said fastener from piercing the LGSM. Therefore, as the fastener is forced through the upper substrate materials or the LGSM, none of these elements would act as a driving stop. When the top surface of the pierced LGSM makes contact with the pusher ridge formed in said tine, the tine is physically pushed a short distance toward the crown, through the fastener's body and down the backside of the fastener's body, while staying within the guide tabs. In doing so, the tine (3) punched holes cam over the (3) raised nibs in the fastener's body. Now, the volute tine is no longer restrained in a flat orientation and immediately coils. The coiling process now clamps the substrates against the crown. The one-way barbs ensure the coiling does not cause the upper end of the tine to be pulled from the fastener's body, thereby destroying the clamping process. Tine 3018 includes a volute or clock spring 3016 (shown in restrained configuration in FIG. 72A), collapsible pusher nibs 3020 (FIG. 72A) and wrap-around portion 3020 of volute spring 3016. An open slot 3022 is also provided to allow wrap-around portion 3020 to be returned to the front (front is crown facing the observer) side of the fastener yet under the coiling portion of volute spring 3016. Metal body 3002 also contains an open slot 3030 to allow wrap-around portion 3020 to wrap to the back side of fastener 3000. Additionally, open slot 3030 provides a clearance area to allow volute spring 3016 to be pushed toward crown 3004 during LGSM substrate penetration thereby allowing the volute spring's tabs to become free of uncoiling tabs 3014.

During assembly of tine 3018, its volute spring 3016 is unwound and specially formed locking tabs are set behind uncoiling tabs 3014 into metal body 3022. The assembly process and to a large extent the installation penetration process restrains tine 3018 in a substantially flat orientation relative to elongated portion 3003. As the top surface of a top substrate 3040 (FIG. 72C) impacts resilient protrusions incorporate into the side of tine 3018, not against metal body 3002, the entire tine 3018 is pushed toward the underside of crown 3004. This event is timed to occur after the back side of a bottom LGSM layer 3042 has cleared the constrained end of volute spring 3016 which allows the restrained retention tabs on volute spring 3016 to be released from uncoiling tabs 3014 at which point volute spring 3016 recoils against the back side of bottom LGSM layer 3042 (FIG. 72C) to thereby effectively grip and clamp the substrates against the underside of crown 3004.

Figure 73:
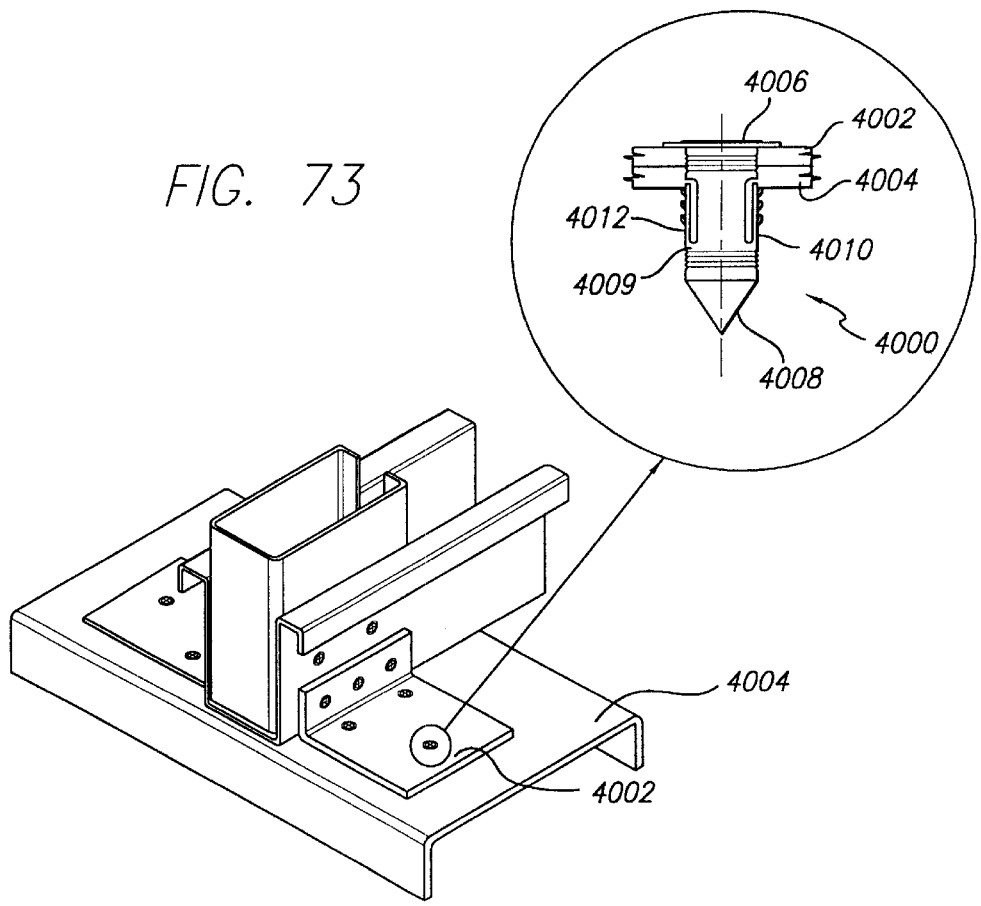
FIG. 73 shows a front elevational view of a fastener of the present invention in conjunction with a perspective view of a typical metal framing application for the fastener of the present invention.

FIG. 73 shows a metal piercing fastener 4000 having a crown 4006, a metal piercing point 4008 and a metal body 4009 having a tine with protruding gripping and clamping elements on each side (tines 4010,4012) of the type described hereinabove in reference to FIG. 51. Specifically, FIG. 51 depicts the tines having both ends attached to the fastener's body. The tines could be attached at both end, at the bottom, or at the top of the tine. The tubular or significantly tubular configuration has the structural integrity to pierce the combination of these thick LGSM substrates. The 'flat' body style, tends to stress fracture during piercing. Fastener 4000, as shown in FIG. 73) is being used to attach multiple LGSM layers, such as LGSM layers 4002, 4004, which can be accomplished in about less than ⅓ the time normally required using conventional self-piercing screws (not shown) used in similar fastening applications.

Figure 25:
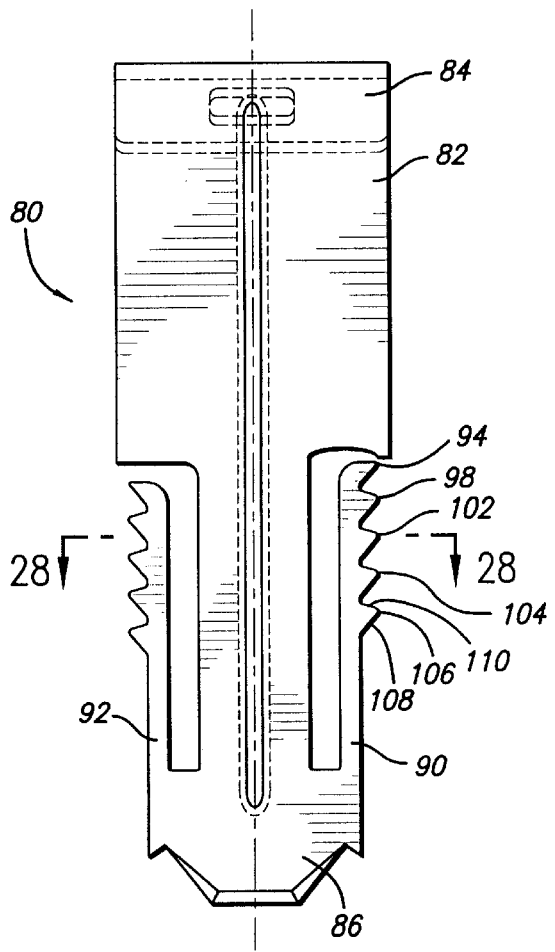
FIG. 25 is a front elevational view of an alternative embodiment of a fastener similar to that illustrated in FIG. 24.
Figure 26:
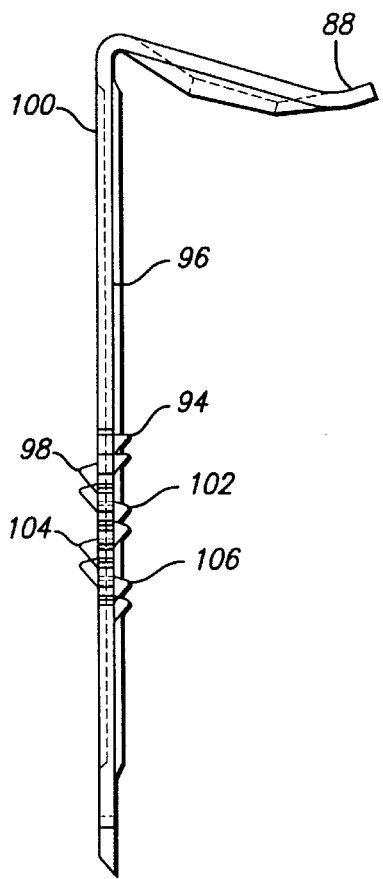
FIG. 26 is a side view of the fastener illustrated in FIG. 25.
Figures 74A, 74B, 74C:
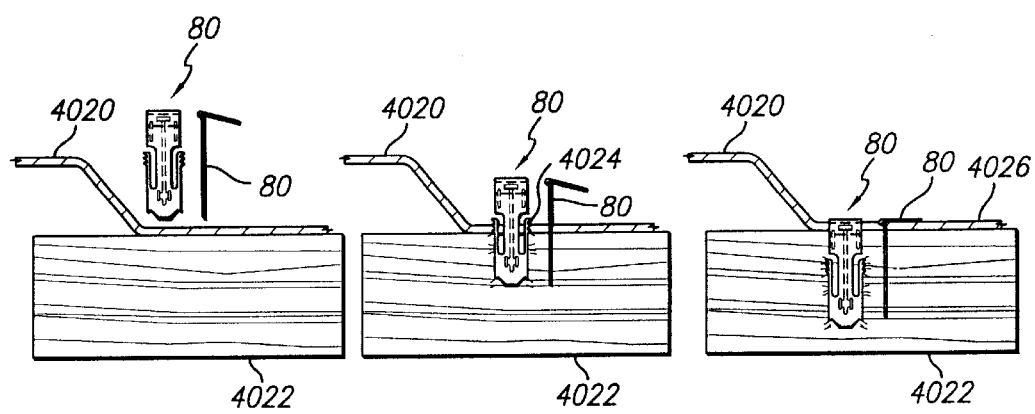
FIG. 74 at sub-figures A–C shows a front elevational view and a side view of a fastener of the present invention in the process of penetrating a plurality of substrates in accordance with the present invention.
Figure 75A:
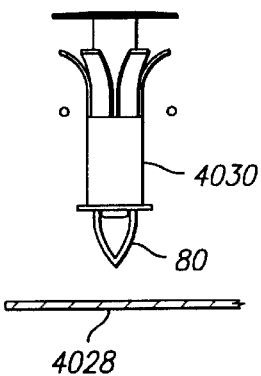
FIG. 75 at sub-figures A–F shows a front elevational view of the fastener of FIG. 25 in the process of passing through a plastering expanded wire and then piercing two different types of substrates in accordance with the present invention.
Figure 75B:
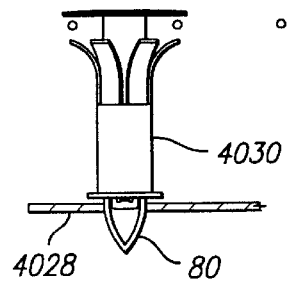
Figure 75C:
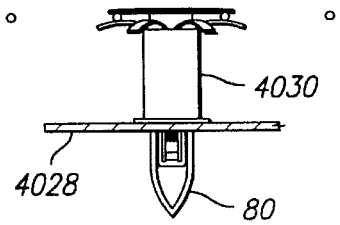
Figure 75D:
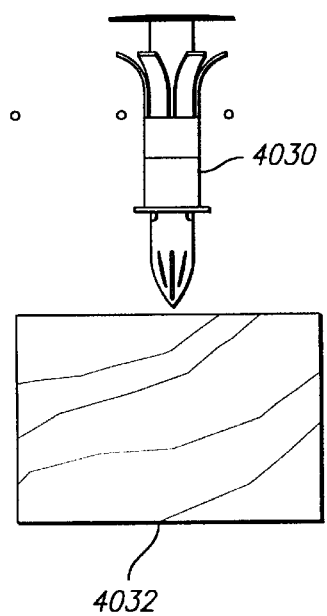
Figure 75E:
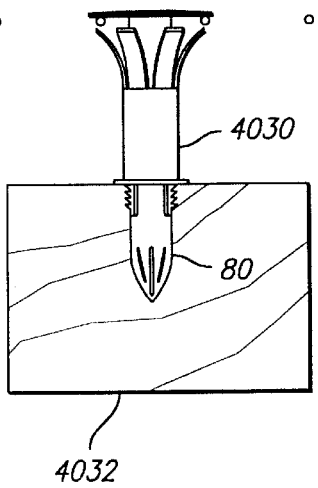
Figure 75F:
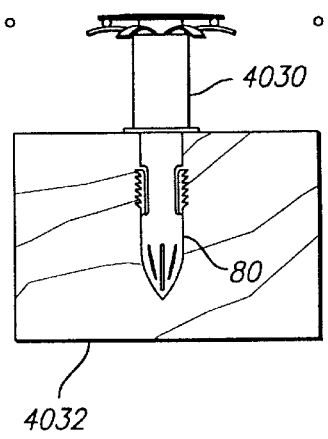

FIG. 74 depicts fastener 80 of FIG. 25 in three stages (FIGS. 74A–74C) of securing a 20 GA LGSM firing strip

4020 to a wooden stud 4022. FIG. 74B shows fastener 80 penetrating both layers and producing a pierced opening 4024. FIG. 4C shows fastener 80 in a fully clamped mode with its crown 84 seated almost flush with a top surface 4026 of LGSM firing strip 4020, both layers being now securely fastened.

FIG. 75 depicts fastener 80 of FIG. 25 in three stages (FIGS. 75A–75C) of securing a wooden substrate 4028 via a 'k-lath' plastering expanded wire 4030. Specifically, fastener 80 passes through wire 4030 and then penetrates, grips and finally clamps into a fibrous substrate such as wooden substrate 4028. FIGS. 75D–75F show the same process except that fastener 80 is used to penetrate a 20-GA LGSM stud 4032.

FIG. 76 shows a metal piercing fastener 4040 having a crown 4042 being under the impact of a driving force 'i', a metal piercing point 4044 and a metal body 4046 equipped with a tine 4048 which has protruding gripping and clamping elements 4049 of the type described hereinabove, for example, in reference to FIG. 58B. Fastener 4040, as shown in FIGS. 76A–76C, is being used to attach multiple LGSM layers, such as LGSM layers 4050, 4052 and 4054 with point 4044 having generated a clean, superior pierced opening 4056. In contrast, as depicted in FIGS. 76D–76 H, inclusive, conventional fasteners such as threaded piercing fasteners 4058, 4060 (FIGS. 76D, 76E) produce inferior quality pierced openings 4062, 4064. Similar results apply when conventional fasteners 4066, 4068, 4070 (FIGS. 76F–76H) pierce LGSM layers 4050, 4052 and 4054.

In FIGS. 76A–C, the fastener of the present invention is capable of piercing or penetrating much thicker LGSM substrates than all of the other conventional examples, except 76E and H. Further, the engagement of the projecting elements of the tine, on both sides of the fastener, with the bottom surface of the bottom LGSM substrate provides far superior 'withdrawal' and 'back-out' resistance values than any conventional fastener described in this figure. Further, its installation time is in tenths of a second and operator fatique is minimal.

FIG. D is a 'self-piercing', thread fastener. Through significant operator pressure, the screw is 'burning' its way through the LGSM substrate. These fasteners can consistently only penetrate 25 gauge LGSM or thinner. When attempting to penetrate multiple LGSM sheets with this type of fastener, usually causes the fastener to fail before all penetration is complete.

FIG E is a 'self-drilling' fastener, having drill points with flutes and rake angles. They are capable of drilling through thicker materials (the material thickness can never exceed the depth of their drilling flutes). However, their cost is 2× to 3× that of a 'self-piercing' screw. As they are drilling, their installation is very slow and very labor intensive. Additionally, when attempting to start the drilling process, these types of fasteners tend to 'walk' on the surface of galvanized LGSM sheets. It takes considerable operator pressure against the electric screw gun to stop the 'walking'. These types of screws are case-hardened as are 'self-piercing' screws and are susceptible to surface hardness fatigue if over heated during the drilling process.

Both 'self-piercing' and 'self-drilling' threaded fasteners have a tendency to 'sheet jack' (a term used in the trades whereby the piercing or drilling process has not been completed in all LGSM substrate sheets, before their threads begin to engage previously drilled, upper LGSM sheets.

Self-piercing and self-drilling threaded screws are usually installed with hand-held electric screw guns. They are slow to install and the process is very fatiguing to the operator.

FIG. F is a brad, or to the layman, a 'nail'. Brads are very soft, as they are usually made from low carbon steels. Therefore, they are really useless when attempting to penetrate LGSM substrates. The advantage is that they are pneumatically fired in, and are fast and effortless to install, when compared to the threaded fasteners mentioned above. If brads could penetrate most LGSM substrates, they still do not have an effective means to grip and clamp the backside of the bottom surface of the bottom LGSM substrate.

FIG. G is a staple. Prior art designs abound for metal penetrating staples. However, they were never commercially accepted because their 'withdrawal' and 'back-out' resistance values were very low. This was especially true if they had only smooth-surface legs. Prior art attempts included adding barbs, opposing-angled legs, protrusions which only acted as reamers or broaches and gutted the LGSM they were attempting to grip and clamp.

FIG. H is a 'drive pin', which is nothing more than hardened, high carbon nails with some type of frictional knurling on their outer surfaces. They can penetrate all the gauges defined for the fastener of the present invention, however, their 'withdrawal' and 'back-out' resistance values do not meet most building codes. Companies selling this kind of fastener have instructed users to 'toe' these fasteners toward each other, to create a binding force between opposing fastener, 'toed' toward each other. This does not meet codes and is nothing more than cover-up for the poor performance of these types of fasteners. These types of fasteners rely on lateral surface friction to achieve any degree of holding.

Brads, Staples and Drive Pins are usually installed using pneumatic actuated impact tools. They are fast, easy to use, and require little operator training.

FIGS. 77A–77B show a metal piercing fastener 4072 generally of the type described for example hereinabove in reference to FIG. 1 having a point 4074 for generating a pierced opening 4076 in LGSM substrates 4078, 4080. FIGS. 77C–77D depict a conventional threaded piercing fastener 4082 piercing an opening 4084 in LGSM substrates 4078, 4080. A person skilled in the art would readily appreciate that the area of substrate engagement shown in FIG. 77B is much smaller than the area of conventional substrate engagement shown in FIG. 77B. A threaded fastener has a relatively small area of engagement with the LGSM substrate. With a standard thread, it is at only one relatively small point. With a twin-fast style thread, it is at only two relatively small points. What is more important is these points of contact for threaded fasteners are mostly on the inside wall of the opening created in the very thin LGSM substrate. The fastener of the present invention is depicted as having a much greater locking area on both sides of the pierced opening in the LGSM substrate. However, what is more important is that the gripping and projecting elements of the resilient tine are locking against the bottom surface of the bottom LGSM substrate. 'Withdrawal' and 'back-out' values are in most applications, are much superior when compared to the other conventional fasteners depicted in this figure.

Figure 78A:
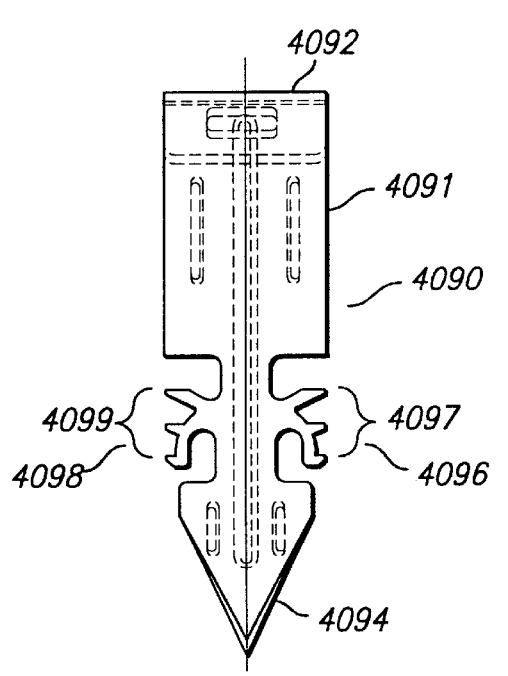
FIG. 78 at sub-figures A–C shows in front elevational view three different tine embodiments for use with a fastener of the present invention.

FIG. 78A illustrates another preferred embodiment of the present invention, namely a metal piercing fastener 4090 having a metal body 4091 which includes a crown 4092 at one end and a sharp metal piercing point 4094 at the opposite end. Metal body 4091 is provided a resilient barbed-style tine on each side, i.e. tines 4096, 4098, respectively. Each tine is provided in turn with clasp-type protruding gripping and clamping elements 4097, 4099, respectively to aid fastener 4090 in achieving effective dripping and clamping of pierced substrates (not shown).

Figure 78B:
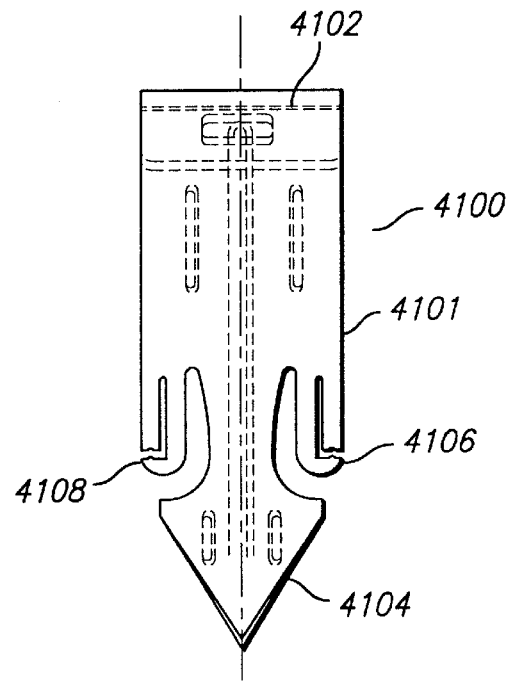

FIG. 78B illustrates yet another preferred embodiment of the present invention, namely a metal piercing fastener 4100 having a metal body 4101 which includes a crown 4102 at one end and a sharp metal piercing point 4104 at the opposite end. Metal body 4101 is provided a resilient clasp-type gripping and clamping tine on each side, i.e. tines 4106, 4108, respectively, to aid fastener 4100 in achieving effective dripping and clamping of pierced substrates (not shown).

Figure 78C:
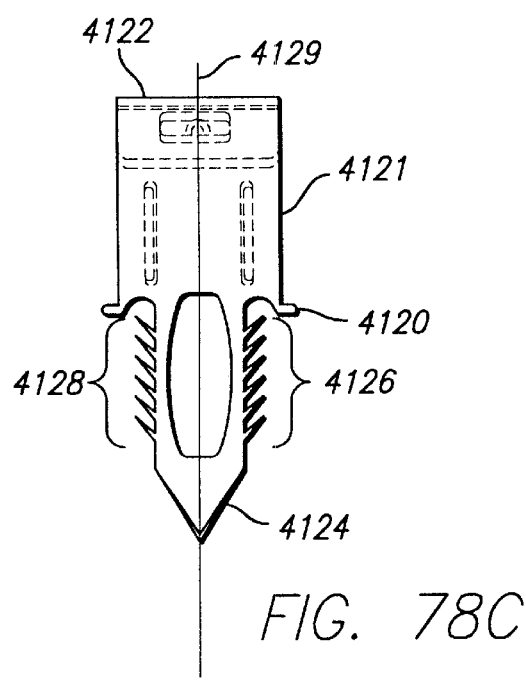

FIG. 78C illustrates still another preferred embodiment of the present invention, namely a metal piercing fastener 4120 having a metal body 4121 including a crown 4122 at one end and a sharp metal piercing point 4124 at the opposite end. Metal body 4121 is provided on each side with multiple resilient tines 4126, 4128, respectively. Each set of resilient tines is formed on the lateral side of metal body 4121 and extends outward (away from metal body 4121). Each tine is preferably extremely resilient to allow inward deflection toward longitudinal axis 4129 as fastener 4120 penetrates fibrous yet low density substrates.

FIG. 79A depicts a metal piercing fastener 4130 of the type described hereinabove for example in reference to FIG. 25. Fastener 4130 has a metal body 4132 equipped with a resilient tine 4134, 4136 on each side. Each resilient tine may be deflected during substrate penetration into a surrounding void such as voids 4131, 4133, respectively. Each tine is provided with generally straight barb-shaped protruding gripping and clamping elements 4138, 4140 facing out and away laterally from metal body 4132.

FIG. 79B depicts an alternative metal piercing fastener 4140 of the type described hereinabove for example in reference to FIG. 52. Fastener 4140 has a metal body 4142 equipped with resilient smooth surface clamping and gripping tines, such as tine 4144, with one tine on one side and offset forward relative to metal body 4142 and another tine on the other side offset backwards relative to metal body 4142 (not shown).

FIG. 79C shows a metal piercing fastener 4150 similar to fastener 4130 of FIG. 79A except for a different tine configuration, i.e., smooth surface resilient tines 4152, 4154, respectively. Each resilient smooth surface tine may be deflected during substrate penetration into a surrounding void such as voids 4151, 4153, respectively.

FIG. 79D is a side view of metal piercing fastener 4150 of FIG. 79C illustrating a crown 4156 bent at an acute angle 'a' relative to a metal body 4158 of fastener 4150. A crown configuration of this type is preferably used in fastening applications where the top substrate is made of wood-like material (not shown).

FIG. 79E shows a metal piercing fastener 4160 similar to fastener 4150 of FIG. 79C except for a different tine configuration, i.e., resilient tines 4162, 4164 provided with barb-type protruding gripping and clamping elements 4163, 4165, respectively. Furthermore, in accordance with the best mode for practicing the present invention, resilient tines 4162, 4164 have been permanently bent about 90 degrees from the tine disposition shown in FIG. 79A.

FIG. 79F is a side view of metal piercing fastener 4160 of FIG. 79E depicting the outward facing orientation of barb-type protruding gripping and clamping elements 4163, 4165, respectively, with one set of barb-type protruding gripping and clamping elements facing forward away from a metal body 4168 and another set facing backwards away from metal body 4168. Fastener 4160 is also shown with a crown 4166 bent at an acute angle 'a' relative to metal body 4168 of fastener 4160. A crown configuration of this type is preferably used when attaching LGSM to wood and other lower density substrates.

Figure 80A:
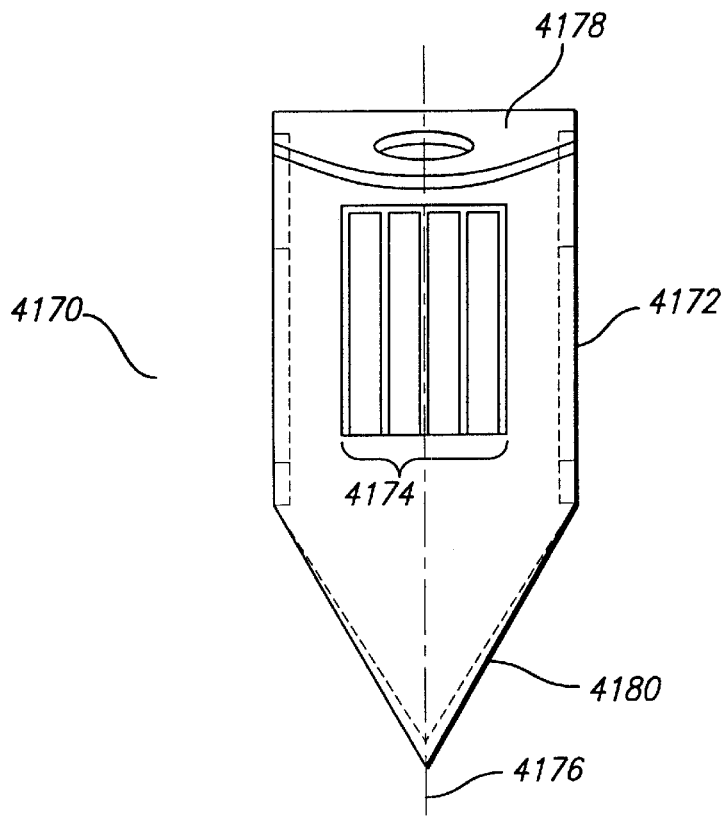
FIG. 80 at sub-figures A–B shows in front and side elevational views another alternative embodiment of a fastener constructed in accordance with the principles of the present invention similar to the embodiment shown in FIG. 43.
Figure 80B:
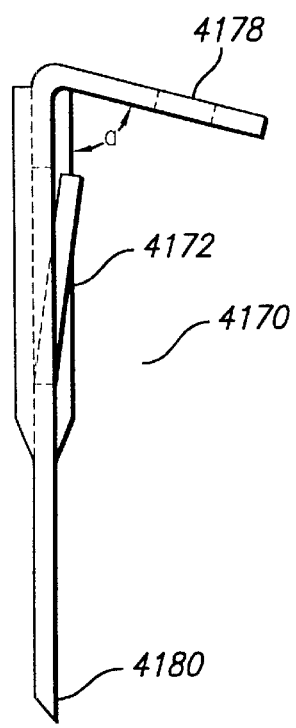

FIG. 80A shows a metal piercing fastener 4170 which is similar in construction to the fastener embodiment shown in FIG. 43. Specifically, fastener 4170 has a metal body 4172 provided with multiple resilient clamping and gripping tines 4174 of equal height and disposed generally parallel to a longitudinal body axis 4176 with the resilient tines preferably symmetrically spaced in pairs on each side of axis 4176. As shown in FIG. 80B, fastener 4170 also has a crown 4178 bent at an acute angle 'a' relative to metal body 4172 and a metal piercing point 4180.

FIG. 81A depicts the nose portion of a 'coined' spade style metal piercing point 4190 having beveled cutting serrations 4192, 4194 on each side, a coined edge 4196 to strengthen the nose portion of point 4190 and a substantially concave embossed or coined area 4198 provided to strengthen point 4190 and to facilitate its penetration into LGSM substrates. Concave coined area 4198 on one side of point 4190 corresponds to a convex area 4200 on the other side of point 4190 as shown in FIG. 81B. FIG. 81C shows the additional amount of substrate material 4202 displaced during penetration of point 4190 due to concave coined area 4198. The normal pattern of a pierced opening from a fastener of the present invention employing point 4190 but without a concave coined area is depicted at 4204 in FIG. 81C which also shows a louver-style protruding gripping and clamping element 4206 of a resilient tine (not shown) of the type described hereinabove in reference for example to FIG. 12.

Figure 83:
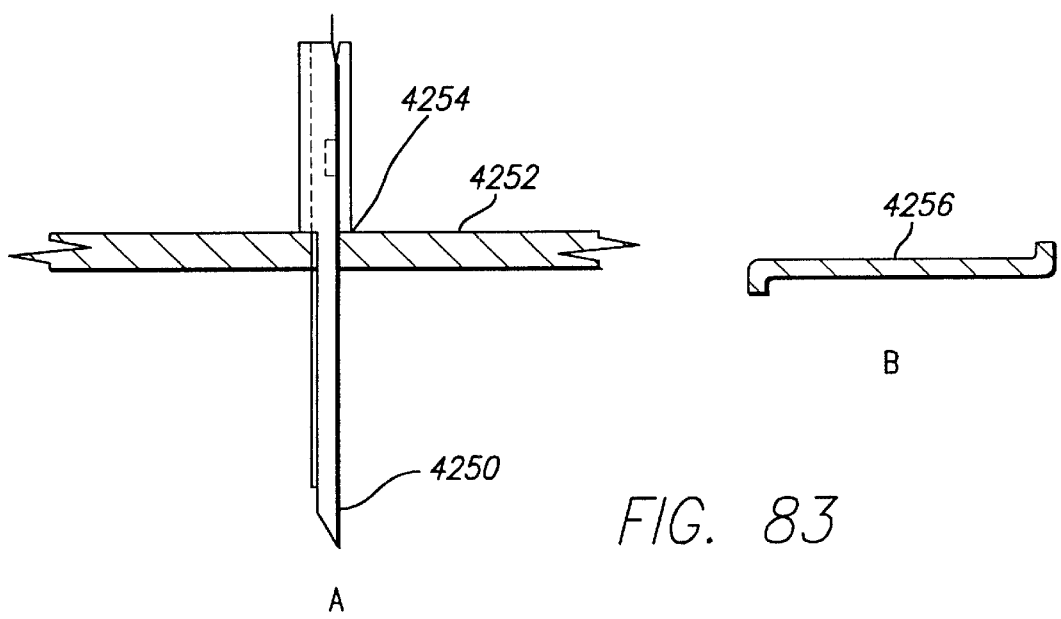
FIG. 83 at sub-figures A–B shows in side and top elevational views side stiffeners for use with a fastener of the present invention acting as predetermined drive stops in accordance with the principles of the present invention.
Figure 87A:
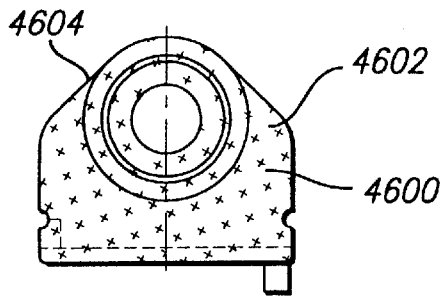
FIG. 87 shows at sub-figures A–E in top view various pierced opening configurations and texturing patterns for use within a crown of a fastener of the present invention.
Figure 87E:
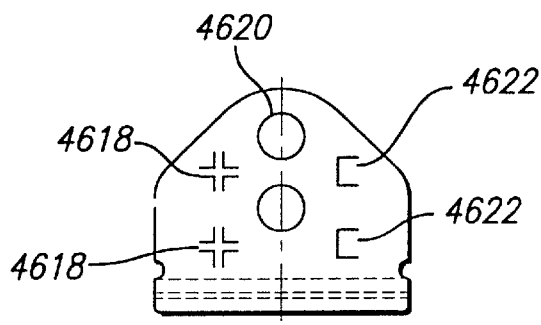
Figure 87B:
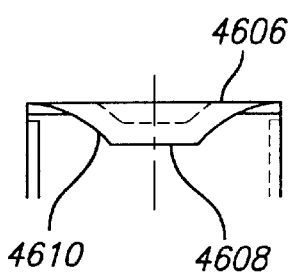
Figure 87D:
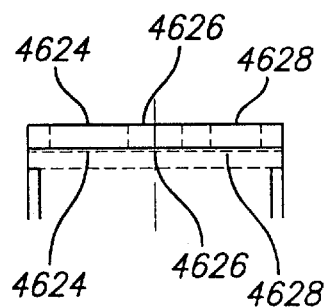
Figure 87C:
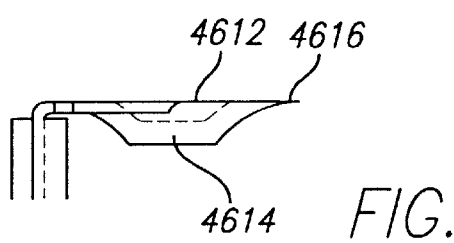

FIG. 83A shows how a metal piercing point 4250 for use with the fastener of the present invention deforms a LGSM substrate 4252 to form a gripping and clamping tine void 4254. FIG. 83B shows in top view a typical pierced opening 4256 created in LGSM substrate 4252 by point 4250.

FIG. 84 depicts a metal body 4300 for use by a fastener of the present invention fabricated from relatively thick stock material to provide significant structural integrity to the inventive fastener yet having a resilient gripping and clamping tine 4302 with associated ramp-lock style protruding gripping and clamping elements 4304. Tine 4302 is preferably thinned or 'coined' at area 4306 to a thickness which renders tine 4302 resilient. Protruding gripping and clamping elements 4304 are provided with ramp-lock catch surfaces 4308 as shown in FIG. 84.

FIG. 85A shows a metal piercing fastener 4400 including a metal body 4402 provided with a resilient gripping and clamping tine 4404 having a coined area 4406 at its base (which is integral with metal body 4402) to render tine 4404 considerably more resilient in accordance with the present invention. Metal body 4402 is provided on each side with opposing side stiffeners 4408, 4410, respectively, and a body gusset 4412 to strengthen the fastener. Each side stiffener is preferably provided with a drive stop, e.g., drive stop 4414 on side stiffener 4408, designed to stop the penetration of point 4416 into a LGSM layer at precisely configured depths. Such functionality is useful in exterior foam insulation systems (EFIS) where it is desirable that the top foam sheets being fastened to the LGSM layer are not crushed or over-compressed. Fastener 4400 may also be used with most low density top substrates being fastened to a LGSM layer such as for attaching roof insulation to a LGSM layer. FIG. 85B shows in top view a typical pierced opening 4418 generated in a LGSM layer by point 4416. FIG. 85C illustrates a cup-shaped crown 4420 having a center aperture 4422 for plaster patch bonding to the top surface of a gypsum drywall board and a double bend area 4424 (to prevent parts from stress fracture) between crown 4420 and metal body 4402. A drive stop 4426 is also shown on a side stiffener 4410. FIG. 85D depicts two different configurations for drive stops such as drive stops 4428, 4430 fabricated by lance piercing.

FIGS. 85E–85G depict fastener 4400 having penetrated a top substrate 4440 made of gypsum drywall board set against a bottom LGSM layer 4442. FIG. 85F shows in top view a typical pierced opening 4444 generated in LGSM layer 4442 by point 4416. FIG. 85G illustrates ramp-lock style protruding gripping and clamping element 4446 fully gripped and clamped against a bottom side 4448 of LGSM layer 4442. Also, crown 4420 is shown fully installed and covered by a plaster patch 4450.

FIG. 86 depicts a metal piercing fastener having a bend angle 'a', defined between a cup-shaped crown 4502 and a longitudinal body axis 4506 of metal body 4504, almost equal to 90 degrees. This type of bend angle is preferably incorporated in fasteners (of the present invention) which are used on relatively soft substrates such as gypsum drywall. As will be appreciated by a person skilled in the art, this setup reduces the possibility of tearing the top paper laminate of the gypsum substrate. A plaster patch may be applied to a cup portion 4508 of crown 4502 after fastening.

FIG. 87 illustrates various pierced opening configurations and texturing patterns which may be incorporated into or through an exposed crown surface of a fastener of the present invention. For example, FIG. 87A shows an embossed texture 4600 on a top surface 4602 of a crown 4604 to allow for improved adhesion of covering materials. FIG. 87B illustrates an example of a dish-shaped crown 4606 with an aperture 4608 at its bottom 4610 to receive and retain covering materials. Bottom 4610 is preferably smooth radiused to reduce impact forces against substrates such as gypsum drywall board. FIG. 87C shows in side view another variation on a dish-shaped crown, in this case a crown 4612 which is provided with a bottom aperture 4614. A relatively thin edge 4616 is shown on the flange of crown 4612 to provide optimal countersinking in certain materials. FIG. 87E illustrates different types of piercing patterns which may be introduced through a crown of a fastener of the present invention. A 'cross through cuts' pattern 4618 is shown and used to provide retention for covering materials. A 'circle through cuts' pattern 4620 is shown and used to provide retention for covering materials and a 'tab through cuts' pattern 4622 is shown and also used to provide retention for covering materials. FIG. 87D illustrates different types of piercing patterns which may be introduced through a crown of a fastener of the present invention. A side view of a 'cross through cuts' pattern 4624 in a fastener crown of the present invention is shown and used to provide retention for covering materials. Also, a 'circle through cuts' pattern 4626 is shown and used to provide retention for covering mate rials. Furthermore, a 'tab through cuts' pattern 4628 is shown and used to provide retention for covering materials.

Figure 88A:
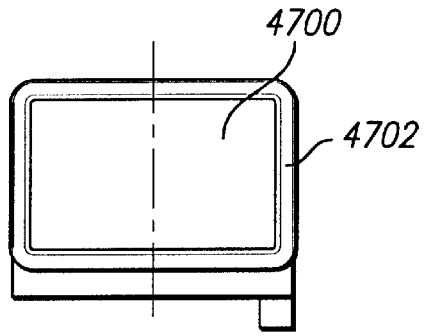
FIG. 88 shows at sub-figures A–F in top and side views various crown configurations for use with a fastener of the present invention.
Figure 88D:
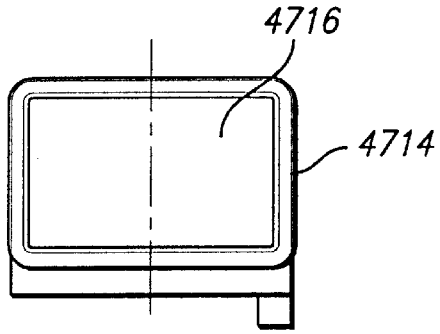
Figure 88B:
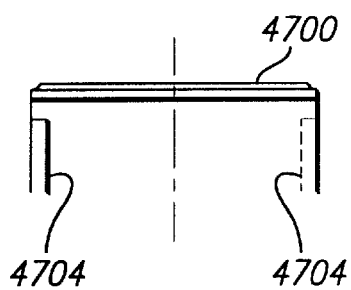
Figure 88E:
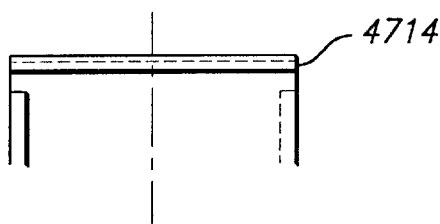
Figure 88C:
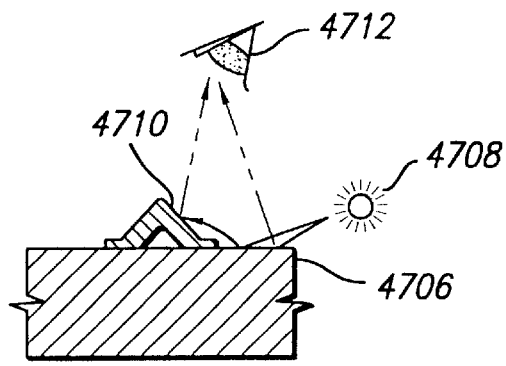

FIGS. 88A–88C show a frame-style crown 4700 having an opening 4702 to allow most of the top surface of the top layer/substrate to be exposed for use with a fastener of the present invention. This type of crown is designed for use on colored coated and textured siding panels often used in the metal building industry. A load bearing base 4704 is provided to ensure that the crown does as little damage as possible to the top substrate surface such as surface 4706 (FIG. 88C) when a fastener of the present invention is clamped against it. Preferably, a 300 Series full hard material may be used to fabricate such a fastener. Crown 4700 may be electro-polished to a very high reflective finish. Additionally, a highly reflective coating or finish (i.e., chromium) may be applied to a carbon steel fastener to achieve the same reflectivity. The side angles and top filleted radii are designed to provide maximum reflection of visible light coming from a sun 4708 or other light sources reflecting first off substrate surface 4706, then off the fastener's angled and reflective crown surface 4710 and finally out to be observed by a human eye 4712 (FIG. 88C).

Figure 88F:
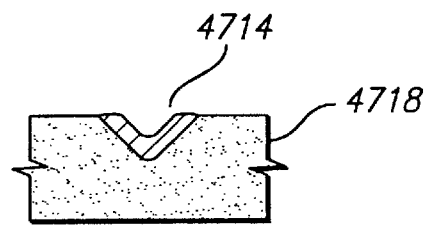

FIGS. 88D–88F show a "V"-shaped peripheral style framed crown 4714 with most of the are within framed crown 4714 devoid of crown material as shown at 4716 in FIG. 88D. This crown style is preferably used to fasten very dense substrate materials such as dense substrate 4718 (FIG. 88F) to different types of other substrate materials. Also, this crown style is used whenever a very low profile crown and countersinking is required.

Figure 89:
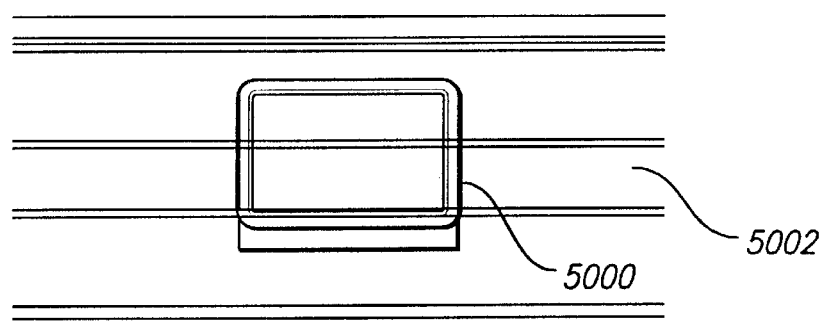
FIG. 89 is a top view of the crown of FIG. 88 for use with a fastener of the present invention.

FIG. 89 shows a framed crown 5000 to be used on colored and/or textured top substrate panels such as substrate panels 5002 and which camouflages itself by blending surrounding and top substrate reflected light.

Figure 90:
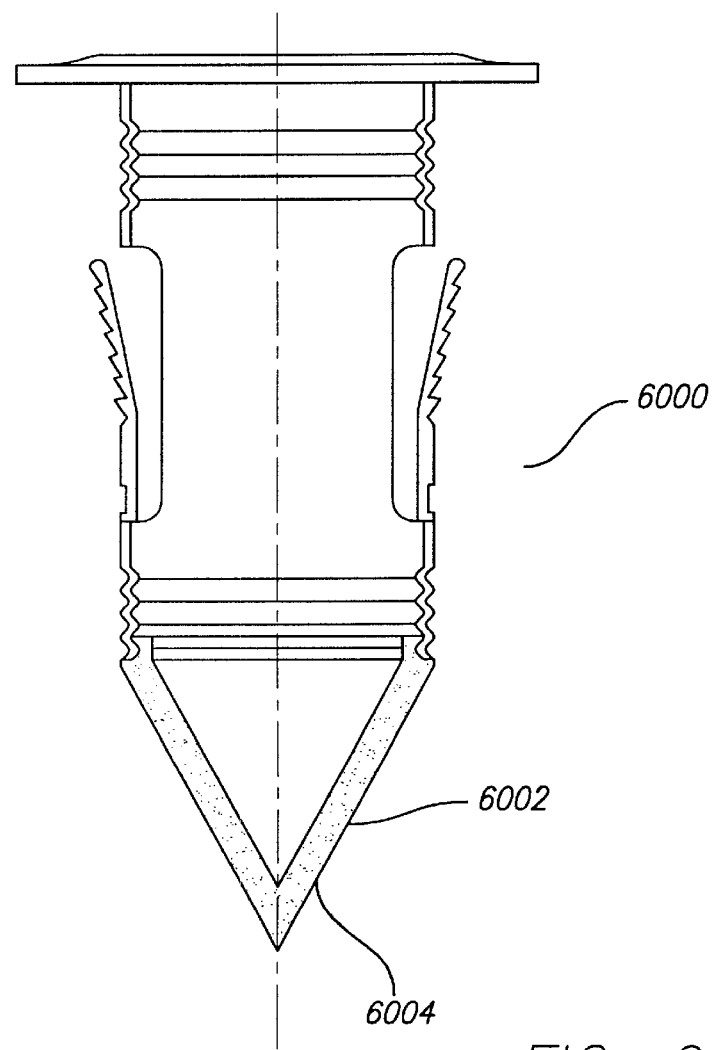
FIG. 90 is a front elevational view of a fastener of the present invention.

FIG. 90 depicts a metal piercing fastener 6000 similar to the metal piercing fastener described hereinabove in reference to FIG. 25 except for a protective 'jacketed' metal point cap 6002 for attachment over a point 6004 prior to fastening. Cap 6002 is designed to provide enhanced LGSM substrate piercing capability for fastener 6000.

The novel metal piercing fastener may be formed from a single strip of sheet material through the utilization of a stamping press which can provide single or multiple axes fasteners capable of easily penetrating metal substrates to which various work pieces are to be attached. The various fasteners illustrated in the appended drawings and described hereinabove provide effective penetration, clamping and locking capability not heretofore realized with prior art fasteners. The resilient tine of the present invention is capable of deflection to conform to the physical constraints of the pierced substrate opening when passing through the pierced opening. The resilient tine of the present invention is also capable of returning to its factory preset state of orientation when no longer constrained within the pierced substrate opening so as to grip and clamp the substrate layers being fastened between itself and the crown of the fastener. To summarize the wide range of applicability, functionality and various manufacturing and installation features associated with the various embodiments of the novel fastener, a table A is provided hereinbelow as follows:

TABLE A

| MANU-FAC-TURING MATE-RIALS | MANUFACTURING PROCESS | FASTENER FEATURES | INSTAL-LATION METHOD |
| --- | --- | --- | --- |
| A. High carbon steel alloys | A. Stamping via Die forming: 1. Blanking. 2. Bending. 3. Punching. 4. Piercing or lancing. 5. 'Coining' (extreme work-hardening of | A. Crown: 1. Shapes: a. Rectangular. b. Polygon. c. Rectangular with radiused corners. d. Round or oval. e. Semi-round. f. Combination of above. | A. Fas-teners collated into single strip attached via adhesive. |

TABLE A-continued

| MANUFACTURING MATERIALS | MANUFACTURING PROCESS | FASTENER FEATURES | INSTALLATION METHOD |
|---|---|---|---|
| | material to create a stronger area). 6. Rolling. h. Angles creating raised | g. With or without relief openings or depressions. pyramids to reflect light and color from surrounding fastened materials. i. Angles creating depressed troughs to countersink and create crown wedging into denser materials such as cementation products. j. Small semi-circular depressions across or along the perimeter of the crown (produced through coining) can provide required rigidity and strength to crown. 2. Angle to body: a. 90-degrees to body or less. b. Provides opposing resiliency to that of tine. c. Acuteness determines force of resiliency: i. Less resiliency for softer materials like drywall where protection of top paper is critical. ii. Moderate resiliency (more acute) for denser materials such as plywood or cementation products. iii. Maximum resiliency (most acute) for densest materials such as steel to steel. iv. With or without resilient bends within or around perimeter. 3. Functions: a. Crown provides compression and clamping of top substrate while in cases of soft or moderately dense materials countersinking an appropriate depth. b. Crown provides contrary resiliency to bottom gripping/clamping resiliency of tine. | |
| B. Stainless steel. | 3. Heat-treated or work-hardened. | B. Body: 1. Shapes: a. Flat. b. Polygon. c. Round. d. Semi-round. e. Can include semi-circular depressions (formed via 'coining') parallel to its sides to increase bending yield against forces required for installation. 2. Side or centered stops: a. If on side-both facing in one direction, or in opposing directions. b. If around center of fastener can be cone shaped as a solid or can be split into multiples connected at top, bottom or both. a. Act as stops for depth-sensitivity. b. Part of bottom or top can be resilient to oppose resiliency of tine. c. Can be formed at any angle. d. Semi-round. | B. Actuated tool with feed mechanism fires fastener thru top materials and bottom attachment piece in less than a second. |
| C. Titanium and titanium (nickel alloys). | C. Made from one-piece or multiple pieces combined. | C. Tine: 1. Shape: a. Rectangle. b. Polygon. c. Radiuses. d. Curved, straight, coiled, twisted. 2. Area of attachment to body: a. Top of center relief area. b. Top and bottom of center relief area. c. One or both sides of center relief area. d. Top, bottom, side or combination thereof to outside of body and corresponding relief area 3. Nature of resiliency: a. Formed from material of internal body or from body edge. b. Bent at an angle: i. Straight. ii. Curved. iii. Twisted. c. Heat-treated or work-hardened to create memory. 4. Function: a. Protrudes from body prior to installation. b. Folds back to plane of body when entering pierced opening created by the point. c. Does not elongate opening in any direction d. Attempts to return to pre-set memory position. e. Fastens against bottom material via: i. Edge protruding gripping and clamping elements twisting into and underneath bottom material. | |

TABLE A-continued

| MANUFACTURING MATERIALS | MANUFACTURING PROCESS | FASTENER FEATURES | INSTALLATION METHOD |
|---|---|---|---|
| | | ii. Face protrusions locking into bottom material. | |
| | | iii. Face friction wedge against the side with the opening. | |
| | | iv. Bowed tine pulling partially or completely underneath bottom material. | |
| | | v. Cam designed top arm rotating title bottom underneath the bottom material and pushing upwards. | |
| | | vi. Clamping of opposing tines underneath bottom material. These tines are restrained via a secondary piece until top or bottom material is contacted. Then, the restraint is immobilized, allowing tines to continue through bottom material whereby they fold together or apart upwards to clamp against bottom. | |
| | | 5. Thickness: a. Same as body material from which it is relieved, or b. Thinned from original thickness via 'coining' (extreme work hardening of the material). | |
| | | 6. Shape of outer edge: a. Smooth. b. Barbed. | |
| | | 7. Shape of face: a. Smooth. b. Ramp-Locks. c. Louvers. d. Grooves or depressions. e. Protrusions. | |
| | | 8. Angle in relationship to body: a. If fastened at bottom, 90 degrees or less. b. If fastened at one side, 90 degrees or less. c. If fastened at top and bottom, center bowed at any degree greater than the plane orientation of the body. d. If fastened at two sides, bottom of tine shall be within same plane of body while middle and top maybe in same plane or may be bent outward from body. | |
| | | 9. Number of tines: a. Can be a single tine or multiple tines per fastener. | |
| D. Composite type materials. | D. Several made at one time. | D. Point: 1. Shape: a. Oval. b. Blunt. c. Guillotined. d. Polygon. e. Diamond. f. Half-mooned. 2. Edge: a. Scalloped to saw through less dense material without compacting soft material between substrate and bottom piece. b. Blunt/Smooth. c. 'Coined' on one side. d. 'Coined' on both sides. 3. Gusset & coining depressions. | |
| | E. Material grain perpendicular to tine/body connection with exception of toggle design. | | |

It should be appreciated by a person skilled in the art that other components and/or configurations may be utilized in the above-described embodiments, provided that such components and/or configurations do not depart from the intended purpose and scope of the present invention.

For example, the fastener of the present invention may be manufactured from a titanium or titanium/nickel alloy in austenite state to allow increased (compared to carbon steel) penetration of thick or denser materials. Titanium or titanium/nickel alloys in marstinite state allows forming of more curvaceous forms for increased clamping and holding power. This type of material exhibits memory which is activated through heat generated by frictional contact between the fastener body and the substrate layers during penetration.

A person skilled in the art would appreciate that fact that tine, point, body and crown designs may be configured as single units that are press-fitted, soldered, welded, adhered or wrapped completely around another fastener.

While the present invention has been described in detail with regards to the preferred embodiments, it should be appreciated that various modifications and variations may be made in the present invention without departing from the scope or spirit of the invention.

It is important to note that practicing the invention is not limited to the applications described hereinabove. Many other applications and/or alterations may be utilized provided that they do not depart from the intended purpose of the present invention. It should be appreciated by a person skilled in the art that features illustrated or described as part of one embodiment can be used in another embodiment to provide yet another embodiment such that the features are not limited to the specific embodiments described above. Thus, it is intended that the present invention cover such modifications, embodiments and variations as long as they come within the scope of the appended claims and their equivalents.

What is claimed is:

1. A fastener for securing a plurality of laminar work pieces together, said fastener comprising:
   (a) an elongated substantially flat body having first and second oppositely facing surfaces;
   (b) a crown formed at one end of said elongated body;
   (c) a piercing tip formed at an opposite end of said elongated body for generating an opening through the plurality of laminar work pieces; and
   (d) at least one laminar work piece gripping and clamping member on said elongated body adapted to be accommodated in at least one void provided within said elongated body between said crown and said piercing tip, said at least one gripping and clamping member having first and second side edges with said first side edge protruding in a direction outwardly from said first surface of said elongated body and said second side edge protruding in a direction outwardly from said second surface of said elongated body for engaging a surface defining said opening to lock the pierced laminar work pieces together.

2. The fastener of claim 1, wherein said piercing tip comprises first and second side cutting edges converging into said point, each of said first and second side edges being beveled to pierce the plurality of laminar work pieces.

3. The fastener of claim 1, wherein said crown is bent at an acute angle relative to a longitudinal body axis passing through said elongated body, said at least one gripping and clamping member being elevated in a vertical plane intersecting said longitudinal body axis at an acute angle relative to said longitudinal body axis.

4. The fastener of claim 3, wherein said crown is provided with at least one aperture.

5. The fastener of claim 4, wherein said crown is provided with at least one gusset for preventing undesirable spring back of said crown when said crown is forced against a top laminar work piece.

6. The fastener of claim 5, wherein said elongated body is further provided with a coined pattern to increase body rigidity and stability.

7. The fastener of claim 1, wherein said elongated body is provided with a first side stiffener oriented substantially away from said bent crown and a second side stiffener oriented substantially toward said bent crown, said first and second side stiffeners adapted to transfer most fastener impact forces along said longitudinal body axis away from said crown.

8. The fastener of claim 1, wherein said at least one laminar work piece gripping and clamping member is resilient.

9. A fastener for securing a plurality of laminar work pieces together, said fastener comprising:
   (a) an elongated body;
   (b) a crown formed at one end of said elongated body;
   (c) a tip formed at an opposite end of said elongated body and adapted to pierce the plurality of laminar work pieces; and
   (d) at least one resilient tine on said elongated body adapted to grip and clamp the pierced laminar work pieces together,
      said at least one resilient tine including a base coupled to said elongated body between said crown and said piercing tip and having a longitudinal axis,
      said at least one resilient tine being at least partially twisted at said base around said longitudinal axis to ensure resiliency.

10. The fastener of claim 9, wherein said at least one resilient tine is adapted to be accommodated in at least one void provided within said elongated body between said crown and said piercing tip.

11. The fastener of claim 10, wherein said at least one resilient tine further includes at least one side protruding gripping and clamping element for locking the pierced laminar work pieces together.

12. The fastener of claim 11, wherein said crown is bent at an acute angle relative to a longitudinal body axis passing through said elongated body, said at least one resilient tine being elevated in a vertical plane intersecting said longitudinal body axis at an acute angle relative to said longitudinal body axis.

13. The fastener of claim 12, wherein said at least one protruding gripping and clamping element includes a first surface facing substantially toward said tip and being adapted to cam over a sharp top edge of an opening pierced by said tip.

14. The fastener of claim 13, wherein said at least one protruding gripping and clamping element further includes a second surface facing substantially toward said crown and being adapted to function as a leaf spring.

15. The fastener of claim 14, wherein said elongated body is provided with a first side stiffener oriented substantially away from said bent crown and a second side stiffener oriented substantially toward said bent crown, said first and second side stiffeners adapted to transfer most fastener impact forces along said longitudinal body axis away from said crown.

16. A fastener for securing a plurality of laminar work pieces together, said fastener comprising:
   (a) an elongated body;
   (b) a crown formed at one end of said elongated body;
   (c) a tip formed at an opposite end of said elongated body and adapted to pierce the plurality of laminar work pieces; and
   (d) at least one resilient tine on said elongated body adapted to grip and clamp the pierced laminar work pieces together,
      said at least one resilient tine including a base integral with said elongated body and being disposed between said crown and said piercing tip,
      said at least one resilient tine having a longitudinal axis and being at least partially twisted at said integral base around said longitudinal axis to ensure resiliency.

17. The fastener of claim 16, wherein said at least one resilient tine is adapted to be accommodated in at least one void provided within said elongated body between said crown and said piercing tip.

18. The fastener of claim 17, wherein said at least one resilient tine further includes at least one side protruding gripping and clamping element for locking the pierced laminar work pieces together.

19. The fastener of claim 18, wherein said crown is bent at an acute angle relative to a longitudinal body axis passing through said elongated body, said at least one resilient tine being elevated in a vertical plane intersecting said longitudinal body axis at an acute angle relative to said longitudinal body axis.

20. The fastener of claim 19, wherein said at least one protruding gripping and clamping element includes a first surface facing substantially toward said tip and being adapted to cam over a sharp top edge of an opening pierced by said tip.

21. The fastener of claim 20, wherein said at least one protruding gripping and clamping element further includes a second surface facing substantially toward said crown and being adapted to function as a leaf spring.

22. The fastener of claim 21, wherein said elongated body is provided with a first side stiffener oriented substantially away from said bent crown and a second side stiffener oriented substantially toward said bent crown, said first and second side stiffeners adapted to transfer most fastener impact forces along said longitudinal body axis away from said crown.

23. A fastener for securing a plurality of laminar work pieces together, said fastener comprising:
 (a) an elongated body;
 (b) a crown formed at one end of said elongated body;
 (c) a tip formed at an opposite end of said elongated body and adapted to pierce the plurality of laminar work pieces; and
 (d) at least one resilient tine on said elongated body adapted to grip and clamp the pierced laminar work pieces together,
  said at least one resilient tine including a base coupled to said elongated body between said crown and said piercing tip and having a longitudinal axis,
  said at least one resilient tine being at least partially twisted around said longitudinal axis to ensure resiliency.

24. A fastener for securing a plurality of laminar work pieces together, said fastener comprising:
 (a) an elongated body;
 (b) a crown formed at one end of said elongated body;
 (c) a tip formed at an opposite end of said elongated body and adapted to pierce the plurality of laminar work pieces; and
 (d) at least one resilient tine on said elongated body adapted to grip and clamp the pierced laminar work pieces together,
  said at least one resilient tine including a base integral with said elongated body and being disposed between said crown and said piercing tip,
  said at least one resilient tine having a longitudinal axis and being at least partially twisted around said longitudinal axis to ensure resiliency.

* * * * *